(12) United States Patent
Samosir et al.

(10) Patent No.: US 12,790,728 B1

(45) Date of Patent: Nov. 10, 2026

(54) GENERATION OF KNITTING INSTRUCTIONS FOR KNITTED ARTICLES WITH FINISHED EDGES

(71) Applicant: Global Apparel Partners, Inc., Malibu, CA (US)

(72) Inventors: William Samosir, Brooklyn, NY (US); Mark Bruce, Woodland Hills, CA (US)

(73) Assignee: Global Apparel Partners, Inc., Malibu, CA (US)

( * ) Notice: Subject to any disclaimer, the term of this patent is extended or adjusted under 35 U.S.C. 154(b) by 0 days.

(21) Appl. No.: 19/557,670

(22) Filed: Mar. 5, 2026

Related U.S. Application Data

(60) Provisional application No. 63/904,760, filed on Oct. 24, 2025.

(51) Int. Cl.
*D04B 15/70* (2006.01)
*D04B 15/78* (2006.01)
*G06T 11/26* (2026.01)

(52) U.S. Cl.
CPC ............. *D04B 15/70* (2013.01); *D04B 15/78* (2013.01); *G06T 11/26* (2026.01)

(58) Field of Classification Search
CPC ........ D04B 15/66; D04B 15/70; D04B 15/78; G05B 2219/45194
USPC .......................................... 700/130–132, 141
See application file for complete search history.

(56) References Cited

U.S. PATENT DOCUMENTS 7,272,462 B2 * 9/2007 Smedley ................ D04B 37/02 700/141
12,361,644 B1 * 7/2025 Samosir ................. D04B 37/02
2019/0368085 A1 * 12/2019 Morgan ................... D04B 1/24
2023/0250567 A1 * 8/2023 Harwood ................ A61F 13/08 66/232
2023/0332340 A1 10/2023 Sterman et al.
(Continued)

FOREIGN PATENT DOCUMENTS

JP 2008274485 A 11/2008

OTHER PUBLICATIONS

Popescu; et at., "Automated Generation of Knit Patterns for Non-developable Surfaces", Humanizing Digital Reality, Sep. 16, 2017, pp. 271-284.

*Primary Examiner* — Nathan E Durham
(74) *Attorney, Agent, or Firm* — Ascenda Law Group, PC

(57) ABSTRACT

A computer-implemented method generates knitting instructions for fabricating a knitted article with finished edges from a digital surface. A UV parameterization is stored in which Vis locally parallel to a knitting direction and U is orthogonal to V. Based on stitch-density information, isolines of the parameterization are extracted and discretized into stitch-location elements. For at least a boundary portion of a zone designated for finished-edge treatment, non-crossing coursewise connections between adjacent isolines are selected by minimizing an energy objective that includes a distance term, a non-crossing constraint, and a finished-edge reward term that decreases cost for connections proximate to and substantially parallel with the boundary. A two-dimensional knitgraph is formed from the selected connections, transformed into a two-dimensional knitmap preserving vertical adjacency and course ordering, and compiled into machine-executable knitting instructions.

20 Claims, 45 Drawing Sheets
(25 of 45 Drawing Sheet(s) Filed in Color)

(56) References Cited

U.S. PATENT DOCUMENTS

| | | | | |
|---|---|---|---|---|
| 2023/0357968 | A1* | 11/2023 | Samosir ................. | D04B 15/70 |
| 2023/0357969 | A1* | 11/2023 | Samosir ................. | D04B 15/70 |

* cited by examiner

300

302

300

602

302

700

702

92

804

95

99

66

1200

1200

1302

1304

```
# For a mesh with a given UV field, derive an isoline network on U as a directed acyclic network.

For every pair of isolines iso_m (left) and iso_n (right):

    # Candidate lists
    cls = candidates on the left isoline
    crs = candidates on the right isoline

    # Cardinalities (counts) of the candidate lists
    ln = number of elements in cls
    rn = number of elements in crs

    # Allocate energy matrix
    Create energy matrix E of size (ln x rn)

    # Populate energy matrix with potential energy differences
    For i in 0..ln-1:
        For j in 0..rn-1:
            E[i, j] = PotentialEnergyDifference(cls[i], crs[j])

    # Identify candidates that are:
    #   - transitioning between zones (current_zone != next_zone or current_zone != previous_zone)
    #   - within a zone marked finished_edges = True
    For each candidate in cls and crs:
        Determine whether the candidate is transitioning between zones
        Determine whether the candidate is in a zone with finished_edges = True
```

Fig. 16A

```
    # Apply finished-edge reward
    For each pair (ci = cls[i], cj = crs[j]):
      If ci and cj are both transitioning between zones
        AND both are in a zone with finished_edges = True:
          E[i, j] = E[i, j] - finished_edge_reward

    # Derive candidate connections
    # Select, for each row i, the j that minimizes E[i, j]
    For i in 0..ln-1:
      j_min = index j that gives the minimum value of E[i, j]
      Record connection between cls[i] and crs[j_min]

    # Post-process to enforce non-crossing
    Remove or adjust connections as needed to produce a non-crossing bipartite set
    between iso_m and iso_n

# Aggregate all non-crossing connections from all isoline pairs
# to produce the intermediate knitgraph K'.

Construct knitgraph K' from all selected connections

# Each candidate is then given both a leftward and rightward edge
# to generate the fully parity-enforced knitgraph K.

Add parity-enforcing leftward and rightward edges to produce K
```

Fig. 16B

GENERATION OF KNITTING INSTRUCTIONS FOR KNITTED ARTICLES WITH FINISHED EDGES

RELATED APPLICATIONS

This application is a non-provisional of, claims priority to, and incorporates by reference U.S. Provisional Application No. 63/904,760, filed 24 Oct. 2025.

FIELD OF THE INVENTION

The present invention relates to computer-implemented systems and methods for generating machine-executable knitting instructions for fabricating knitted articles from digital surface representations, and more particularly to selecting non-crossing coursewise connections within a UV-parameterized domain using an energy objective that applies a finished-edge reward term along zone boundaries.

BACKGROUND

Knitting machines are widely used to fabricate textile articles based on digital instructions. Conventional approaches for preparing knitting instructions often involve manual design processes or the use of predefined templates. These methods may limit the ability to efficiently produce customized or complex knitted structures from digital models. There is ongoing interest in improving the automation and flexibility of workflows for generating knitting instructions from digital designs.

In knitted articles, finished edges are boundary treatments intended to produce smooth, continuous transitions at zone perimeters. Conventional practice typically relies on manual, stitch-level adjustments by a knit engineer, which is time-consuming and difficult to scale or standardize across designs, sizes, and production environments. Techniques are described herein to address these challenges.

SUMMARY OF THE INVENTION

In accordance with one embodiment of the invention, a computer-implemented design and manufacturing platform may be provided, enabling users to author knitted articles by specifying geometric, structural, and material intent at a high level, while automatically generating machine-ready knitting instructions that respect constraints of industrial knitting systems. The platform may be developed by an interdisciplinary team with expertise spanning knit engineering, fashion design, additive manufacturing, aerospace, furniture, smart textiles, computational modeling, cloth simulation, motion graphics, game design, audio engineering, human-computer interaction, and immersive media. The system may be designed to make knitting more accessible while increasing its power and reliability by translating designer inputs into machine-feasible outputs without requiring the user to have prior knit engineering knowledge. In some embodiments, a workflow may be provided in which drawing or modeling actions can be directly materialized as knitted products.

Contemporary flatbed knitting machines may exhibit mechanical and topological limitations that constrain curvature, short-row techniques, tubular single-jersey pathways, intarsia scheduling, and yarn/needle reliability envelopes. Traditional knit engineering may leverage a large body of heuristics, including tension adjustments, bed racking, boundary regularization, structure mixing for visual effects, and rule-of-thumb practices for various machine-yarn-structure combinations. These heuristics may be siloed and difficult to scale across projects. Engineers may often program in two dimensions while anticipating three-dimensional results with specific texture and material properties, requiring per-project curation of abstractions that resist reuse and generalization. Designers may be unfamiliar with machine limits and lack haptic intuition about physical structures; consequently, prototypes may often be knitted before intended outcomes are visible. The cumulative viscosity between design and engineering may result in numerous iterations, and late changes in materials, design, or factory capability may frequently reset work to an earlier stage. In one embodiment, the central bottlenecks may include a language discrepancy, where designers seek to specify precise qualities at precise locations, and an expectations/limitations discrepancy, where development houses need to communicate feasibility and required compromises.

In some embodiments, the platform may address these bottlenecks by centering the design language on spatial and geometric intuition using curves and fields rather than low-level knit actions. A user may specify qualities across surfaces, such as knitting direction, goring placement, zone partitioning, stitch density, and pattern assignments, while the system's kernel may enforce topological correctness, manufacturability, and policy constraints. The platform may couple designer intent ("target") with a topologically accurate representation ("actual") and may provide robust visualization for real-time feedback, enabling rapid negotiation between aesthetic goals and machine feasibility. The software may automate advanced knit engineering and make custom knit workflows mainstream by significantly reducing manual translation and iteration.

The system may be implemented as a web-based CAD platform with cloud processing. In one embodiment, the system may ingest arbitrary three-dimensional surfaces, including imports from mainstream CAD systems, and may support interactive authoring of seam placement, knitting direction, and goring using curves. Images and rich data may be used as procedural drivers for structure generation. Internally, knitting instructions may be expressed in a platform abstraction, which may be at a higher level than vendor-specific code and may be readily transpiled to knitout and other formats. This abstraction may enable multiple downstream pipelines into specific machine ecosystems, where vendor constraints may be handled late in the flow. The platform may export legacy bitmap representations to interoperate with prevailing CAD environments and may offer a generative language for pattern texturing, including integration with implicit modeling on curved surfaces and indexed texturing with dithering in three dimensions with multiple yarns. The platform may accommodate computational design workflows and may be architected for extensibility across machine types and production settings.

In one embodiment, two historically labor-intensive processes—calibration and grading—may be automated. Calibration may proceed by knitting an initial sample, automatically deriving its measurements, and adjusting parameters so that the second sample achieves the desired fit, avoiding numerous trial iterations. Grading may allow a base design to be parameterized across multiple sizes while preserving design intent and rules; the system may compute new models and parameterizations to generate machine-ready assets through the kernel. This approach may remove combinatorial complexity and compress time-to-manufacture for products such as footwear uppers, which traditionally undergo long design cycles.

Beyond code generation, the platform may enable orchestration of multiple hardware components in a unified workflow, including three-dimensional printers for lasts and reference models, knitting machines for fabric output, and three-dimensional scanners for automated calibration. The system may provide operational instructions for technicians, including machine setup, yarn-feeder assignments, and finishing directives. By front-loading iteration in software with faithful visualization, prototype volume may be reduced, minimizing waste. The geometrically driven output pipeline may support objective-driven compilation, allowing prioritization of operational efficiency or aesthetic integrity, with further objective controls targeted subsequently. The overall system may be intended to scale from rapid prototyping to full production while maintaining precision and material efficiency.

The platform may be designed for integration with computational pipelines and may welcome collaboration with practitioners in fields, implicits, texture generation, and structured design automation. In one embodiment, the system may target enterprise deployments for footwear uppers and related applications and may contemplate private beta access with the ability to adapt software to organizational contexts. The development organization may have substantial accumulated practice in knit engineering, positioning the platform for collaboration with innovators advancing textile manufacturing.

In one aspect, a computer-implemented platform receives a digital surface and high-level design directives (e.g., knitting direction, zones, stitch density, and pattern assignments) and automatically produces validated, machine-specific knitting instructions. A parameterization module constructs an orthogonal UV field aligned to the knitting direction. Based on stitch-density information, the system may extract isolines with constant values of U, discretize them into stitch candidates, and select non-crossing coursewise connections using an energy objective that encodes geometric distance, manufacturability constraints, and policy terms (including finished-edge handling and goring/no-goring regions). A mapper may row-straighten the resulting knitgraph into an abstract knitmap that preserves vertical adjacency, after which a compiler pipeline (yarn pather, structure compiler, knitcode compiler, and converter) may enforce feeder continuity and knitcell adjacency rules and emit machine-agnostic knit code and vendor-specific instructions. Alternative embodiments may omit isolines and generate stitch candidates directly from field hatching. The platform may further support automated calibration to align digital intent to physical output and automated grading across sizes using correspondences between normalized UV parameterizations.

In one aspect, a computer-implemented method may generate knitting instructions for fabricating a knitted article from a digital surface representation partitioned into zones. A UV parameterization may be stored in which a V parameter is locally parallel to a knitting-direction indication and a U parameter is orthogonal to V. Based on stitch-density information, isolines of the parameterization may be extracted and discretized into stitch-location elements on the surface. For at least a boundary portion of a first zone designated for finished-edge treatment, the method may select non-crossing coursewise connections between stitch-location elements on adjacent isolines by minimizing an energy objective. The energy objective may include a distance term, a non-crossing constraint, and a finished-edge reward term that decreases cost for connections proximate to the boundary portion and oriented substantially parallel to the boundary. Proximity and orientation may be determined with respect to predetermined thresholds or tolerances.

The method may form a two-dimensional knitgraph comprising vertices based on the stitch-location elements and directed edges based on the selected coursewise connections, and may transform the knitgraph into a two-dimensional knitmap that preserves vertical adjacency and course ordering. The knitmap may then be compiled to generate machine-executable knitting instructions for fabrication of the knitted article. In some embodiments, discretizing the isolines may include distributing packets according to local stitch density and deriving quantization points from the packets; in other embodiments, stitch-location elements may be defined directly at stitch resolution without packets. In further embodiments, the finished-edge reward term may be applied within a boundary band of specified width (e.g., a distance from the boundary or a number of courses), may have a value that is user-tunable, and may be a constant value or a variable value that varies along the boundary according to a spatial weight function.

Although much of the present discussion pertains to flatbed knitting machines, this is for convenience only and the present invention is equally applicable to other knitting machines and to computer-controlled textile machines (e.g., warp knitting, circular, jacquard variants) in general. These and other embodiments of the invention are described in more detail in the description below.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is illustrated by way of example, and not limitation, in the figures of the accompanying drawings, in which:

FIGS. 16A-16B depict pseudocode of a process for selecting non-crossing coursewise connections between stitch-location elements on adjacent U-V isolines of a surface representation, in accordance with one embodiment of the invention.

DETAILED DESCRIPTION

Figure 1A:
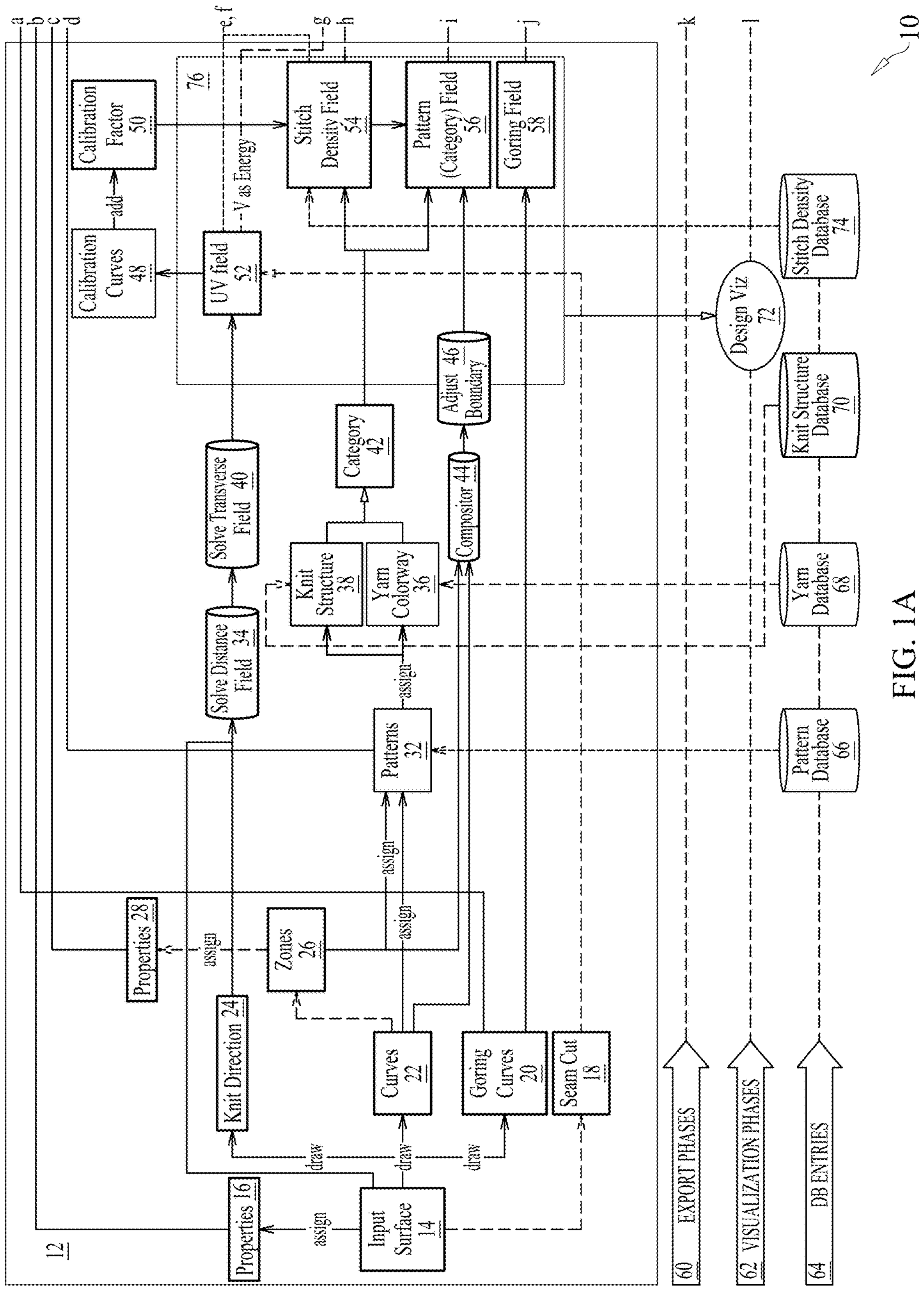
FIGS. 1A-1D depict a data flow model, in accordance with one embodiment of the invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/ steps. While the sequence diagrams each present a series of steps in a certain order, the order of some of the steps may be changed without departing from the scope of the present invention.

DEFINITIONS

UV field: an orthogonal parameterization on the surface where Vis locally parallel to the knitting-direction curve and U is orthogonal to V.

Isoline: a level set of U corresponding to a candidate wale.

Packet: a grouping of one or more stitch candidates placed along an isoline based on local stitch density; each packet can expand to k quantization points for parity-aware course connections.

Finished edge: a boundary segment subject to required or forbidden links to realize selvedge, bind-off, or equivalent edge treatments in the compiled instructions.

Intarsia boundary: a policy-inserted boundary that separates regions with different yarn feeders to prevent cross-feeding and preserve region separation.

The data flow model 10 may include two major components: a frontend module 12 and a kernel 86. Due to the large size of the data flow model 10, it has been divided into FIGS. 1A-1D, with these four sheets representing four screenshots of the data flow model 10 taken from left to right. It should be understood that certain signal connections (e.g., a-l) span from FIG. 1A to FIG. 1B, and so on. The frontend module 12 may provide an interface for user input, parameterization, and early visualization, allowing a user to specify design intent through curves, zones, patterns, and calibration data. The frontend 12 may accept a variety of user-defined inputs, including curves 22, zones 26, knitting direction 24, stitch-density and pattern selections 32, and optional calibration information 48, 50. In some embodiments, the frontend module 12 may also include a seam cut tool 18 that enables the user to cut the surface into a representation that is topologically canonical to a plane with a single boundary loop, facilitating robust parameterization and fabrication. The kernel 86 may receive the outputs of the frontend 12 and may perform discretization, optimization, policy enforcement, compilation, and conversion, ultimately generating machine-agnostic knit code and converting it into machine-specific instructions suitable for a variety of knitting machine ecosystems.

FIG. 1A depicts the frontend module 12 of the data flow model 10. The frontend module 12 may provide an interface for user input, authoring, parameterization, and early visualization. An input surface 14 may be presented, on which a user may assign properties 16, draw a seam cut 18 to cut the mesh so that it is topologically canonical to a plane with a single boundary loop, and author goring curves 20, general curves 22, and a knitting direction 24. Curves 22 may delimit zones 26, to which the user may assign per-zone properties 28 and patterns 32. Patterns 32 may also be assigned to curves 22, and reference a pattern database 66. In turn, yarn colorway 36 (which may reference yarn database 68) and knit structure 38 (which may reference knit structure database 70) may be assigned to the respective patterns 32. Pattern database 66, yarn database 68, knit structure database 70 and stitch density database 74 may collectively be denoted as database entries 64.

From the input surface 14 and knitting direction 24, a distance field solver 34 and a transverse field solver 40 may produce a UV field 52. The UV field 52 may be computed using the output of the transverse field solver 40 and the seam cut 18, and may serve as the basis for downstream discretization. Generation of UV fields on three-dimensional surfaces is a well-known issue in computer graphics. Example solver choices for this process include eikonal or fast-marching methods for distance field computation, and Poisson, Helmholtz, or conjugate-gradient integration for transverse field computation. Boundary conditions may be specified at seam cuts and non-integrable regions. Tolerances (e.g., residual less than $10^{-3}$) and discretization resolution (e.g., per-triangle sampling) may be provided to ensure solution quality.

Additional fields may include a stitch density field 54 (which may reference stitch density database 74 and be derived from category subsystem 42), a pattern category field 56 (which may be derived from category subsystem 42 and boundary adjustment subsystem 46), and a goring field 58 (which may be derived from goring curves 20). These fields may be grouped into a UV field aggregate 76 that may support early design visualization 72 within visualization phases 62. Calibration curves 48 and a user-provided calibration factor 50 may be available for downstream alignment and device-specific compensation. It is further noted that a compositor module 44 may formulate boundary information from zones 26 and the user specified curves and provide such boundary information to boundary adjustment subsystem 46.

The frontend module 12 may represent all aspects of the system that are directly controlled or authored by the user, including the specification of design intent, assignment of properties, and initial visualization. In one embodiment, if a first knit sample measures M and the target is T, the system may compute a correction tensor C. This tensor may be applied to the stitch density field 54 for each zone 26, thereby adjusting the UV field to compensate for discrepancies and achieve the desired output. All subsequent automated processing may be performed by the kernel 86, as depicted in FIGS. 1B-1D.

Figure 1B:
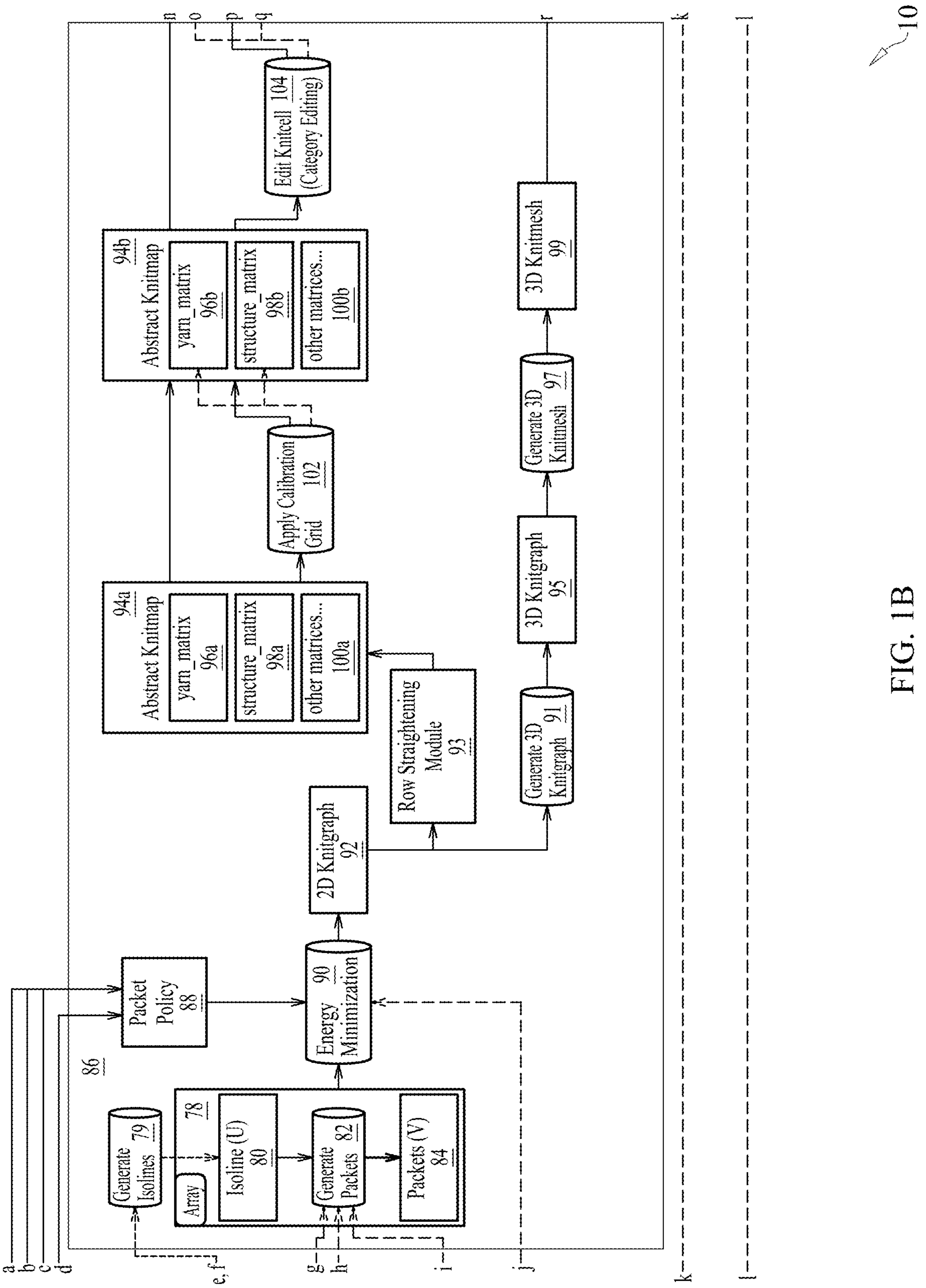
Figure 1C:
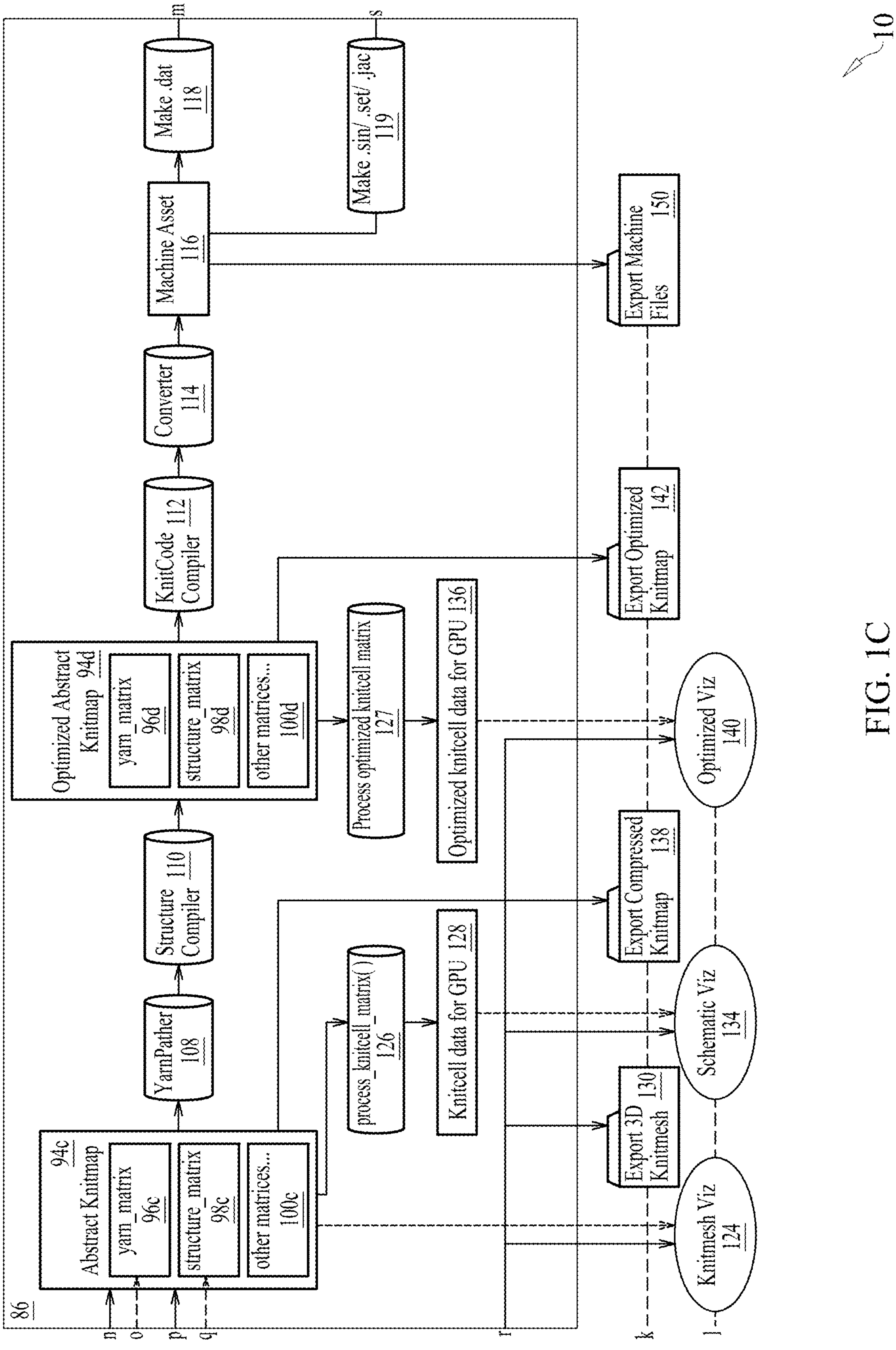
Figure 1D:
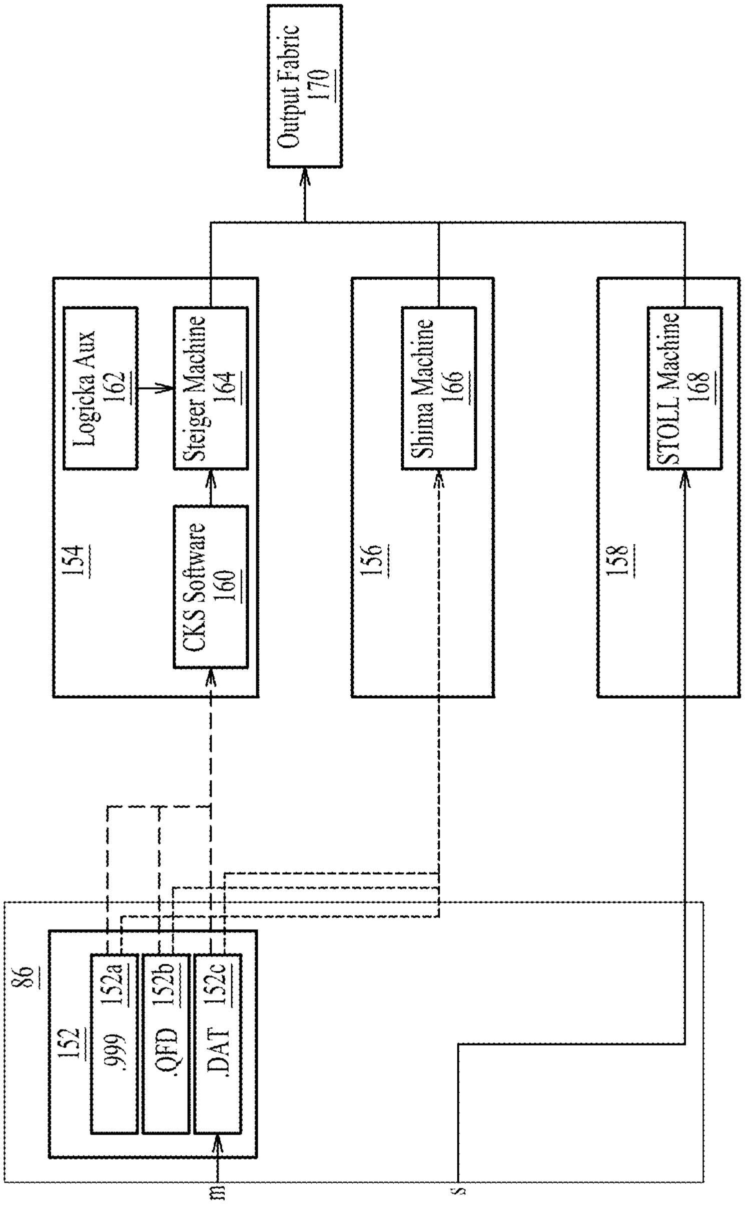

FIG. 1B depicts the initial stages of the kernel 86, which may perform automated discretization and computational processing without user input. The kernel 86 may receive outputs from the frontend module 12 and organize discretized inputs in an array 78 comprising isolines 80 and packets 84. The generate isolines module 79 may receive the U field of the UV field 52 and the stitch density field 54, and may output isolines 80 at constant U values. In the UV map, these isolines may run parallel to the V axis and may correspond to wales. The generate packets module 82 may use the V field of the UV field 52, together with the stitch density field 54, the pattern category field 56 and the isolines 80, to produce packets 84 that may lie on each isoline at various values of V. Each packet may correspond to one or more stitch locations. In some embodiments, each packet may be transformed into two quantization points, and each quantization point may represent a stitch location.

A packet policy 88 may be parameterized by user properties 16 (assigned to the input surface 14), user properties 28 (assigned to the zones 26), goring curves 20, and patterns 32. The energy minimization module 90 may operate on the array 78, together with the goring field 58 and the packet policy 88, to select non-crossing, policy-compliant horizontal connections between adjacent isolines. The result of this process may be 2D knitgraph 92, a data structure comprising quantization points, in which adjacent quantization points may be connected by directed edges. These edges may represent coursewise connections between stitch locations, determined by minimizing an energy objective that may include geometric distance, non-crossing constraints, and policy terms such as finished edges, goring regions, and no-goring zones. The term "finished edges" may refer to boundaries of the knitted article where a specific edge treatment is required, such as a bind-off, selvage, or other finishing technique that secures the edge and prevents unraveling. In the context of the 2D knitgraph 92, finished edges may be represented by required or forbidden links at the boundaries of the grid, ensuring that the edge stitches are handled according to the desired finishing method. For example, the system may enforce that certain connections are present or absent at the periphery of the 2D knitgraph to produce a clean, stable edge in the final article. These policy constraints may be encoded in the energy objective, so that the optimization process yields a set of horizontal connections that not only avoid crossings and minimize geometric distortion, but also respect the designer's intent for edge finishing and other structural requirements.

The 2D knitgraph 92 may encode the topology and connectivity of the knitted structure, serving as the foundation for subsequent row straightening and grid formation. FIG. 1B may further include a branch that performs an early mapping from the knitgraph to three-dimensional space for visualization and geometry generation. The generate 3D knitgraph module 91 may receive the 2D knitgraph 92 and, using the stored parameterization derived from the UV field 52 (connection between generate 3D knitgraph 91 and UV field 52 not depicted for ease of illustration), may map each stitch location and its edges to corresponding three-dimensional coordinates on the input surface 14. The output of generate 3D knitgraph module 91 may be the 3D knitgraph 95, which preserves the connectivity of the 2D knitgraph 92 while conforming to the surface geometry. Downstream of 3D knitgraph 95, the generate 3D knitmesh module 97 may construct a 3D knitmesh 99 in which each stitch location is realized as a quad face and goring or short-row features may be represented by triangular faces. The 3D knitmesh 99 may provide an immediate three-dimensional representation suitable for early visualization and may be supplied to knitmesh visualization module 124, enabling comparison of geometric realization with the schematic derived from the abstract knitmap. This three-dimensional path may operate in parallel with the row straightening module 93, which may receive the 2D knitgraph 92 to yield the abstract knitmap 94*a* for downstream schematic processing.

Abstract knitmap 94*a* may contain yarn matrix 96*a*, structure matrix 98*a* and other matrices 100*a*. A calibration grid 102 may be applied to abstract knitmap 94*a* to form abstract knitmap 94*b* containing yarn matrix 96*b*, structure matrix 98*b* and other matrices 100*b*. Edit knitcell 104 may enable users to assign and refine stitch-level categories of the abstract knitmap 94*b* and form abstract knitmap 94*c* containing yarn matrix 96*c*, structure matrix 98*c* and other matrices 100*c*.

FIG. 1C depicts the continuation of automated processing within kernel 86, following the initial user-directed input, parameterization, and discretization steps outlined in FIGS. 1A and 1B. At this stage, the abstract knitmap 94*c* has already been produced through row straightening and category editing, with the edit knitcell module 104 enabling users to assign and refine stitch-level categories prior to manufacturability enforcement. The yarn matrix 96*c*, structure matrix 98*c* and other matrices 100*c* are contained within abstract knitmap 94*c*, representing the evolving data artifacts as the design advances. Yarn pather 108 may process the abstract knitmap 94*c* to compute feederwise paths that satisfy continuity and feeder constraints, preserving the category intent at stitch resolution. Structure compiler 110 may then consume abstract knitmap 94*c* and produce an optimized abstract knitmap 94*d* by enforcing knitcell adjacency rules, substituting knittable structures where needed, and introducing policy-driven boundaries such as Intarsia boundaries to separate feeders. The optimized yarn matrix 96*d*, structure matrix 98*d* and other matrices 100*d* are contained within optimized abstract knitmap 94*d*. Knitcode compiler 112 may receive optimized abstract knitmap 94*d* and generate machine-agnostic knit code, which may then be provided to converter 114. Converter 114 may output a machine asset 116 that characterizes device-level capabilities and supplies converted, machine-ready representations to make .dat 118 and make .sin/.set/.jac 119, supporting vendor-specific instruction files. Process knitcell matrix 126 may process abstract knitmap 94*c* and produce knitcell data for graphics processing unit (GPU) 128, used by schematic visualization module 134 (explained below). In a similar manner, process optimized knitcell matrix 127 may process optimized abstract knitmap 94*d* and produce optimized knitcell data for GPU 136, used by optimized visualization module 140 (explained below).

Knitmesh visualization module 124 may present a three-dimensional rendering of the generated knit geometry so that a reviewer can assess how schematic intent maps back to the surface at garment scale, and it may be used as the earliest geometric checkpoint after the generation of 3D knitmesh 99 upstream. Because knitmesh visualization module 124 receives as input the 3D knitmesh 99 and the abstract knitmap 94*c*, it may display a quad-dominant surface with triangular faces indicating goring or short row features while overlaying zone or category coloration drawn from the abstract knitmap 94*c* to reveal design intent on the 3D article. This stage may offer per-layer toggles that can show or hide UV guides derived from the UV field 52, isolines 80 placed at constant U, and optionally packet or quantization overlays to diagnose anomalies introduced during discretization or energy-based connection selection. It may also provide view-synchronized clipping and curvature-based shading to help verify whether wale and course orientations conform to the knitting direction 24 and whether seam cut 18 placement results in clean boundary loops suitable for fabrication. In some embodiments, knitmesh visualization module 124 may highlight finished edges where required or forbidden links have been enforced at the periphery to honor desired edge treatments such as bind offs or selvages, thereby confirming policy observance in a geometric context. The view may further support linked selection with schematic visualization module 134 such that selecting a region on the 3D knitmesh 99 highlights the corresponding pixels in the row straightened domain, making discrepancies between geometry and schematic immediately apparent. Because knitmesh visualization module 124 is driven by 3D knitmesh 99 and abstract knitmap 94*c*, it may serve as the natural place to validate color or structure separation in designs that include Intarsia boundaries by showing feeder segmented regions on the 3D article. This combination of geometric and categorical overlays may allow designers and engineers to make rapid, visual checks before moving to more detailed schematic or optimized views. An example output of knitmesh visualization module 124 is provided in FIGS. 12A and 12B.

From 3D knitmesh 99 and knitcell data for GPU 128, schematic visualization module 134 may generate a three-dimensional visualization in which a simulated stitch is presented at the location of each polygon of the 3D knitmesh 99. For each polygon in the 3D knitmesh 99, the schematic visualization module 134 may decode the corresponding knitcell data to assign the appropriate stitch type and yarn assignment, rendering a graphical representation that reflects the user's target design at stitch resolution. This output is fully three-dimensional, matching the geometry of the 3D knitmesh 99, and provides a direct preview of how the intended stitch pattern and category assignments will appear on the fabricated article. The visualization supports clarity of topology, category assignment, and policy effects, and may include zone-consistent colors or fill patterns to distinguish regions, as well as overlays or legends to clarify the mapping from abstract patterns to knitcell types and yarn feeders. By presenting simulated stitches in 3D, schematic visualization module 134 enables designers and engineers to visually verify the target design prior to manufacturability corrections by downstream modules such as the yarn pather and structure compiler. This approach bridges schematic intent and geometric realization, supporting interactive review and refinement of stitch-level details in a machine-agnostic context. An example output of schematic visualization module 134 is provided in FIGS. 13A-13D.

Optimized visualization module 140 may present the state of the design after manufacturability constraints have been applied, and it may focus on the implications of feeder continuity, adjacency enforcement, and policy-driven rewrites on the stitch-level plan. Because optimized visualization module 140 receives as input the 3D knitmesh 99 and the optimized knitcell data for GPU 136, it may render the same row straightened coordinate system while highlighting where the structure compiler 110 has altered categories, inserted or reinforced Intarsia boundaries to keep feeders confined to their regions, or adjusted edge behavior to honor finished edge policies. The view may support diff-style modes that compare the pre-optimization schematic against the optimized state, with per-stitch or per-region annotations indicating the rationale for a change such as adjacency rule enforcement or feeder-safe substitution. The system may visualize feeder continuity decisions by coloring carrier lanes or by overlaying directional glyphs that reflect left-to-right parity enforcement, as derived from an alternating carriage heuristic. In some embodiments, parity alternation may be enforced according to machine-specific or design-specific constraints. The specific rules for left/right carriage alternation may vary depending on the knitting machine architecture and implementation details.

In some embodiments, optimized visualization module 140 may expose warnings or soft constraints, for example highlighting regions where optimization succeeded but margins are tight with respect to machine capabilities captured in the machine asset 116. The ability to pivot between the 3D knitmesh 99 baseline and the optimized knitcell data for GPU 136 may encourage iterative refinement, as users can determine whether schematic edits are likely to survive manufacturability-driven rewriting. Where designs rely on finished edges or specific boundary treatments, optimized visualization module 140 may confirm that required or forbidden links have been preserved and that the edge will knit cleanly under the targeted machine profile. This stage may therefore bridge schematic clarity and execution realism without committing to a fully simulated pass sequence.

FIG. 1C further depicts several export modules that facilitate the transition from validated design artifacts to machine-ready outputs and downstream manufacturing processes. The export 3D knitmesh module 130 may receive the generated 3D knitmesh 99 and may prepare it for visualization or external use. The export compressed knitmap module 138 may operate on the abstract knitmap 94*c*, providing a compressed representation suitable for efficient storage or transmission. The export optimized knitmap module 142 may process the optimized abstract knitmap 94*d*, enabling delivery of manufacturability-aware design data to external systems or machine interfaces. The export machine files module 150 may receive the machine asset 116 and may generate vendor-specific instruction files, such as .dat, .sin, .set, or .jac, for execution by supported knitting machines. These export modules may be invoked once the design has satisfied both creative intent and machine feasibility, ensuring that all necessary data and instructions are available for fabrication, validation, or further analysis. The modular architecture may allow for flexible sequencing and selection of export pathways, supporting a broad range of output formats and integration scenarios as the technology evolves.

FIG. 1D depicts the terminal delivery of machine instructions to various knitting machine ecosystems, illustrating how the system may support flexible deployment and output generation for multiple hardware platforms. Knit instructions 152, which may include files such as .999 (152*a*), .qfd (152*b*), and .dat (152*c*), may be generated and provided to different machine systems for execution. The Logicka system 154 may receive knit instructions 152 and may incorporate auxiliary modules such as Logicka Aux 162, which may be used to support output to the Steiger machine 164. CK Software 160 may be contained within the Logicka system and may facilitate conversion and delivery of instructions to the appropriate hardware. The Shima system 156 may receive knit instructions 152 for output to the Shima machine 166, while the Stoll system 158 may receive files such as .sin, .set, and .jac, generated by module 119, for output to the Stoll machine 168. The output fabric 170 may be produced by one or more of the supported machines, depending on the selected export pathway and target hardware. The system architecture may be generalizable beyond the illustrated examples, allowing future machine types and formats to be accommodated without significant modification. The machine asset 116 may support conversion to multiple machine formats, and the system may not be limited to the three examples shown, but rather may be extensible to other machines as needed. As described above, the Stoll machine may receive its instructions via a distinct pathway, utilizing files generated by module 119 rather than the .dat file. The examples provided are illustrative and not limiting, and the system may be intended to support a broad range of machine types and output formats as the technology evolves.

Figure 2:
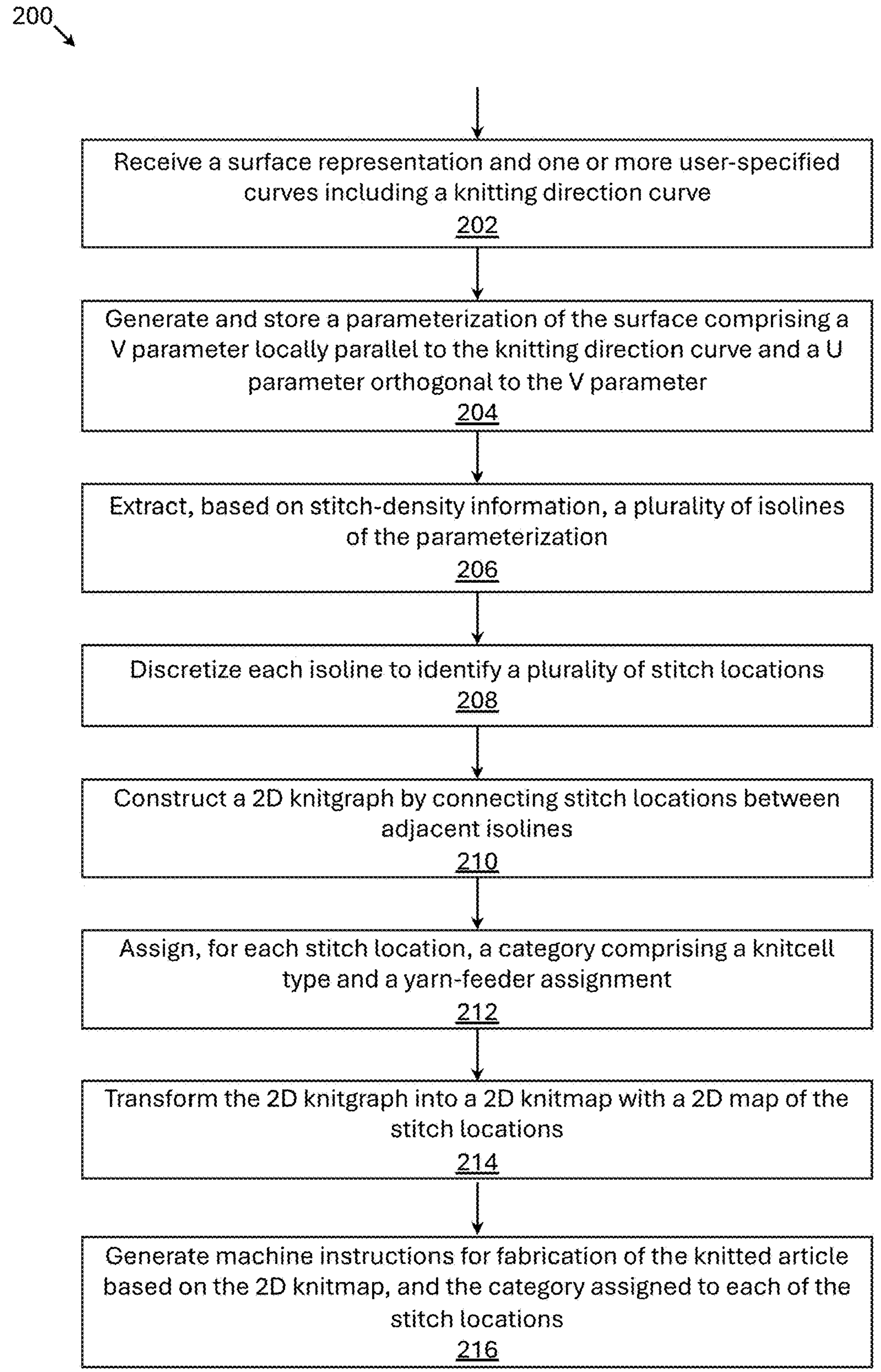
FIG. 2 depicts a flow chart of a process for generating knitting instructions for fabrication of a knitted article from a user-defined surface, in accordance with one embodiment of the invention.

FIG. 2 depicts a flow chart 200 of a process for generating knitting instructions for fabrication of a knitted article from a user-defined surface. In step 202, the process may receive a surface representation together with one or more user-specified curves including a knitting direction curve 24. The surface may be a triangular mesh, a spline or parametric surface, or an equivalent representation. The user may also provide curves 22 and define zones 26 to carry pattern, stitch-density, knit-structure, and yarn-feeder assignments that may be referenced from databases 66, 68, 70 and 74.

In step 204, the system may generate and store a parameterization of the surface in which a V parameter is locally parallel to the knitting direction curve 24 and a U parameter is orthogonal to V. The parameterization may yield a UV field 52 that establishes a stable correspondence between the surface and parameter space for downstream discretization and mapping. In one embodiment, this parameterization may be constructed by the distance field solver 34 and transverse field solver 40, optionally integrating course-direction curves as constraints and introducing parametric discontinuities along non-integrable regions to facilitate robust solving.

In step 206, based on stitch-density information, the system may extract a plurality of isolines 80 of the parameterization. Each isoline may correspond to a candidate wale, and its spacing may reflect local density determined from the stitch density field 54 or per-zone settings. In some embodiments, the level-set spacing for isoline extraction may be derived from the target wale density, for example, ΔU=f(target wale/cm), where ΔU denotes the interval between isolines in the U parameterization, where f is some function. The spacing between isolines may vary according to local density, and section curves may be used to partition the surface so that isoline extraction and discretization are aligned within sections. In one embodiment, the generate isolines module 79 may perform this extraction. Isolines may be constrained to avoid merging or branching, resulting in monotonic wales, or, in alternative embodiments, may be permitted to branch and merge to accommodate more complex knit structures. In such cases, branching and merging may be resolved by topological sorting or other suitable algorithms to maintain the integrity of the parameterization and downstream processing.

In step 208, the system may discretize each isoline 80 to identify a plurality of stitch locations. In one embodiment, the generate packets module 82 may distribute packets 84 along V, which may be expanded to quantization points at stitch resolution to serve as stitch-location candidates with persistent UV coordinates. Packets may be distributed non-uniformly along each isoline according to local stitch density, and may be grouped or expanded as needed to support downstream energy minimization and mapping.

In step 210, the system may construct a 2D knitgraph 92 by connecting stitch locations between adjacent isolines 80 to form coursewise connectivity. For each pair of adjacent isolines, candidate horizontal connections between packets may be evaluated using an energy minimization module 90 (e.g., an optimization engine)—a scoring function that may assign a numerical cost to each proposed configuration and may be minimized to select the final set of connections. In one embodiment, the energy minimization module 90 may perform this selection, incorporating geometric distance, non-crossing constraints, and policy terms such as finished edges, goring placement, and no-goring zones.

In one embodiment, energy minimization module 90 constructs coursewise connections by minimizing an energy function of the form:

$$E = \sum_{e \in \mathcal{E}} [w_d \| p_i - p_j \|_2 + w_c CrossPenalty(e, \mathcal{E}) = w_p PolicyCost(e)]$$

where e denotes a candidate connection between stitch locations $p_i$ and $p_j$, and ε is the set of all candidate edges. The minimization is subject to (i) non-crossing constraints, (ii) feeder parity alternation across rows, and (iii) boundary masks for finished edges and no goring zones. Exemplary weights for one embodiment may include:

$$^{\circ}w_d \in [0.1, 10]$$

$$^{\circ}w_c \in [1, 100]$$

-continued $$^{\circ}w_p \in [1, 200]$$

Candidate assignments between adjacent isolines may be solved per row using the Hungarian algorithm, or globally as a minimum cost flow on a bipartite graph.

The term "finished edges" may refer to boundaries of the knitted article where a specific edge treatment is required, such as a bind-off, selvage, or other finishing technique that secures the edge and prevents unraveling. In the context of the 2D knitgraph 92, finished edges may be represented by required or forbidden links at the boundaries of the grid, ensuring that the edge stitches are handled according to the desired finishing method. For example, the system may enforce that certain connections are present or absent at the periphery of the knitgraph to produce a clean, stable edge in the final article. These policy constraints may be encoded in the energy objective, so that the optimization process yields a set of horizontal connections that not only avoid crossings and minimize geometric distortion, but also respect the designer's intent for edge finishing and other structural requirements. Goring curves may encourage localized skipped connections or short rows where indicated, while no-goring zones may penalize or forbid skips to maintain continuous fabric in designated regions. By minimizing the total energy, the system may yield a non-crossing, policy-compliant set of horizontal connections that matches the designer's intent.

In step 212, the system may assign, for each stitch location in the 2D knitgraph 92, a category comprising a knitcell type and a yarn-feeder assignment. Categories may be sampled from a pattern category field 56 or per-zone pattern specifications 32 and may be rewritten by policy to maintain manufacturability, including optional insertion of Intarsia boundaries between regions that use different feeders. As part of this process, the system may compute feeder-wise paths that realize the schematic while ensuring physical knittability, which may include maintaining continuity, avoiding illegal crossings, and respecting feeder limits. Intarsia boundaries may be introduced to address the specific requirements of Intarsia knitting, a technique that uses separate yarn feeds to create distinct color or structure regions within a knitted article. In Intarsia, each region may be knitted with its own yarn feeder, and the boundaries between regions may be managed to prevent unintended cross-feeding and to maintain clean separation. To achieve this, the system may insert an Intarsia boundary between adjacent regions assigned to different yarn feeders. This boundary may act as a guard rail, ensuring that each feeder remains in its designated region and that the intended separation of color or structure is preserved. The introduction of an Intarsia boundary may occur when a provisional feeder path would otherwise violate separation or create problematic crossings between regions. In such cases, a policy module may rewrite the affected cells or edges in the abstract knitmap, inserting an Intarsia boundary and adjusting categories accordingly. The outcome may preserve designer intent while guaranteeing feeder-safe traversal and manufacturability. Throughout the pipeline, Intarsia boundaries may be inserted as needed to ensure that each feeder remains in its designated region, and that the final knitted article reflects the intended color and structure separation. This approach may allow the system to support complex designs with multiple color or structure regions, while maintaining the physical constraints required for successful fabrication on a knitting machine.

In step 214, the system may transform the 2D knitgraph 92 into a 2D knitmap, producing a two-dimensional map of the stitch locations. In one embodiment, the row straightening module 93 may perform this transformation, assigning coherent row indices while preserving vertical adjacency and inserting empty positions where skips or short rows occur, yielding an abstract knitmap 94*a* suitable for schematic visualization and compilation. The resulting grid may have rows for courses and columns for vertical adjacency, and each pixel of the grid may correspond one-to-one to a quantization point and carry its category.

In step 216, the system may generate machine instructions for fabrication of the knitted article based on the 2D knitmap and the category assigned to each stitch location. In one embodiment, the knitcode compiler 112 may compile the abstract knitmap into machine-agnostic knit code, and the converter 114 may convert that machine-agnostic knit code to one or more machine-specific formats for execution by supported knitting systems. Feeder assignments, yarn paths, and bed operations executed on the machine may correspond directly to the validated knit code produced by the pipeline, enabling a "what-you-design-is-what-you-knit" workflow with minimal manual intervention. In one embodiment, a simulator may validate the machine-agnostic knit code prior to transpilation by stepping through course-time, tracking per-needle loop states for each bed, enforcing transfer limits, modeling carrier occupancy and collision rules, and emitting diagnostics such as "transfer beyond bed limit," "adjacency violation," and "feeder conflict." The simulation may halt upon detection of a hard constraint violation, or may proceed with warnings in the case of soft constraint violations.

Figure 3:
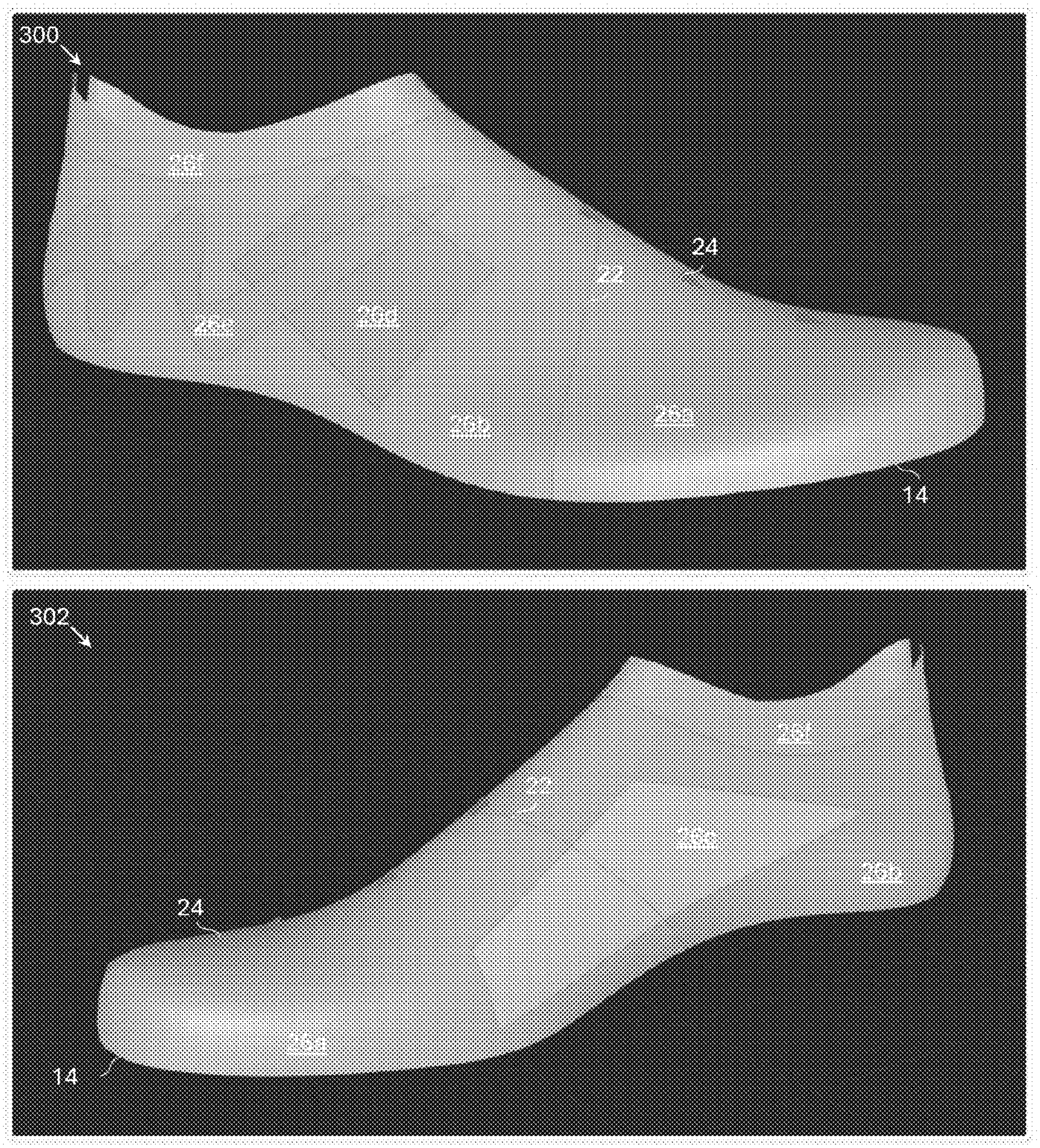
FIG. 3 depicts an example of an input surface after user directives, such as knitting direction and zone partitioning, have been specified, with the top half showing the right side and the bottom half showing the left side of the input surface, in accordance with one embodiment of the invention.

FIG. 3 illustrates an example input surface 14 configured as a shoe upper after user directives have been authored to guide downstream processing. The figure presents a right-side view 300 and a left-side view 302 of the input surface. A knitting direction 24 is depicted, extending from the heel collar toward the toebox in this example. One or more user-drawn curves 22 are shown partitioning the surface into zones 26*a*, 26*b*, 26*c*, 26*d*, 26*e* and 26*f*. For visual conciseness, only the curve dividing zones 26*a* and 26*b* is explicitly labeled, while additional curves are depicted but not individually labeled. The visually distinct regions correspond to zones 26*a*-26*f*, and color is used merely to distinguish regions without limiting structure or function. The authored directives visible in FIG. 3 provide the design intent that subsequent stages of the system will consume.

Each of zones 26*a*-26*f* may be associated with a pattern, a stitch-density setting, and per-zone properties such as finished edges and no-goring rules. A zone's pattern may act as a category field whose elements specify, at stitch resolution, a category pairing a knit-cell type (e.g., front single jersey, rib, bind-off, or other must-stitch variants) with a yarn-feeder assignment drawn from predefined repositories. Stitch-density values may be selected from a database or overridden by the user on a per-zone basis to achieve the desired local behavior. These per-zone specifications are authored in the frontend and are designed to be consumed in the downstream pipeline for discretization, optimization, and compilation. Zone assignments, category maps, and stitch-density values may be stored either as constants tied to the corresponding zone or as spatial fields over the mesh when non-uniform variation is needed across a region.

Although not depicted in FIG. 3, other embodiments may include additional user directives such as goring curves and course-direction curves. Goring curves can be authored by the user to specify regions toward which goring is to be attracted, for example, permitting short rows or skips in designated areas. Conversely, no-goring zones may be defined to inhibit such operations and maintain continuous fabric in specified regions. Course-direction curves, when present, provide auxiliary constraints that can influence the orientation of courses and the discretization process. These additional directives offer further flexibility and control over the resulting knit structure and may be particularly useful in more complex or customized designs.

Figure 4A:
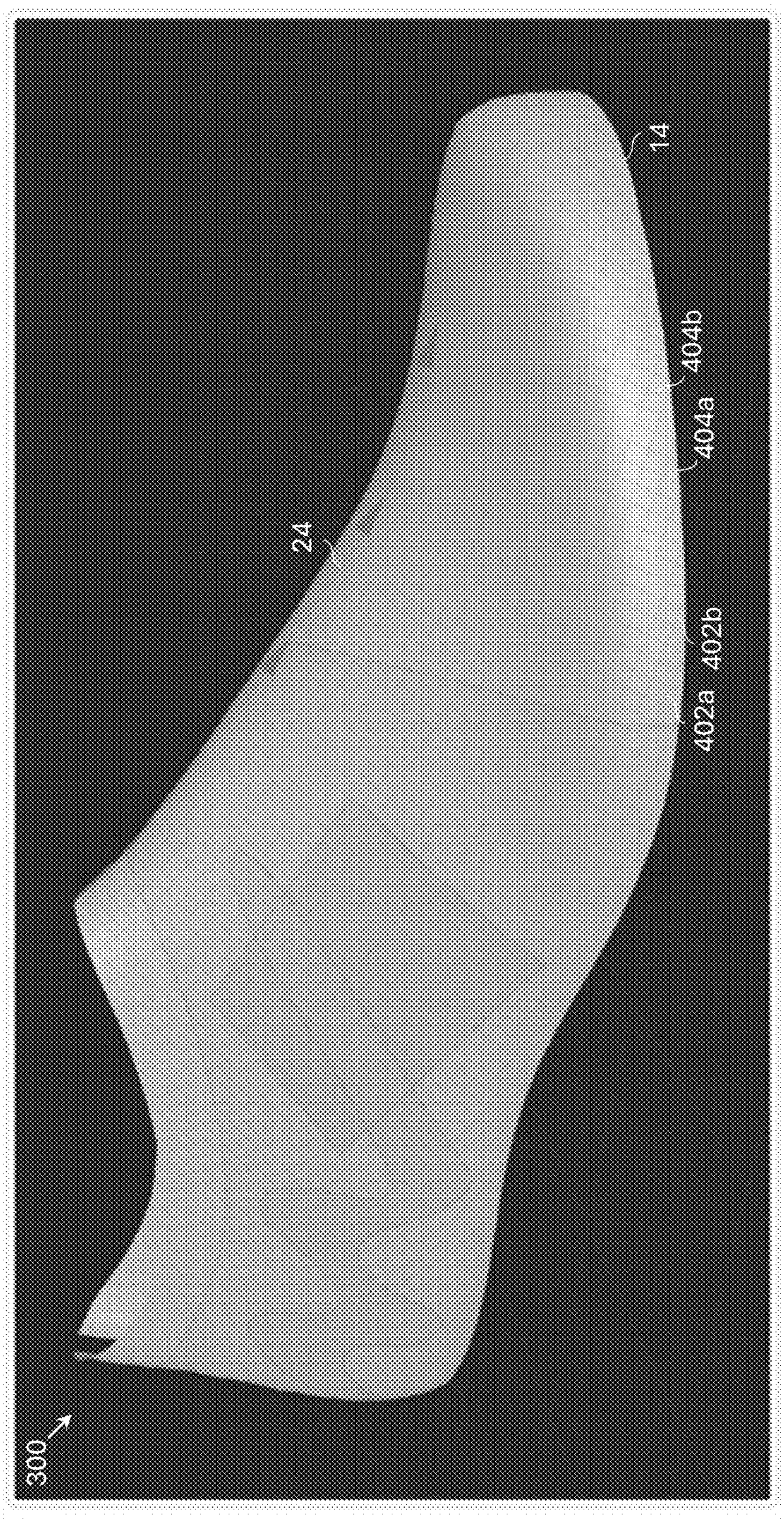
FIGS. 4A and 4B depict the generation of a UV field on the right-side and left-side of the input surface, respectively, showing the knitting direction and corresponding field elements, in accordance with one embodiment of the invention.
Figure 4B:
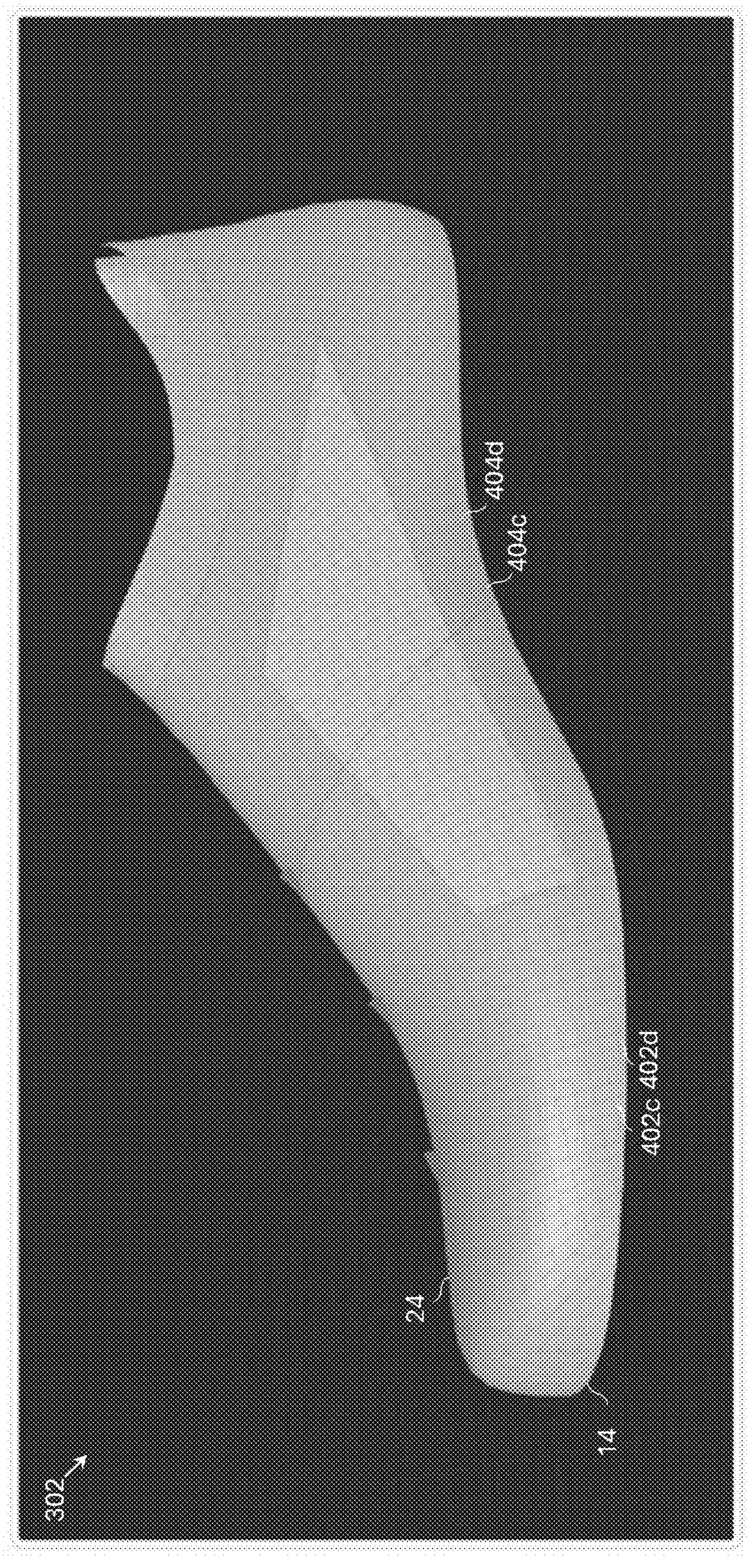

FIGS. 4A and 4B depict the generation of a UV field on an input surface 14, shown as a shoe upper. FIG. 4A shows the view of the right side 300 of the input surface 14, and FIG. 4B shows the view of the left side 302, with the knitting direction indicated by curve 24. The process may operate on the input surface and may utilize user-specified directives, including the knitting direction curve 24, and, in some embodiments, course direction and goring curves defined on the surface. To generate the UV field, the system may employ a computational module—referred to herein as the "solver"—which may be configured to compute scalar and vector fields over the surface based on the provided user directives. The solver may use the knitting direction 24 as a source for propagating a distance field across the surface. This distance field may be converted into a signed distance field, referred to as the U field, and may be visualized in FIGS. 4A and 4B as elements 404*a*, 404*b*, 404*c* and 404*d*. The U field may assign a scalar value to each point on the surface, with contours (lines of constant U) running parallel to the knitting direction. As a result, the U value may remain constant as one moves along the knitting direction and may vary as one moves perpendicular to it. The sign and magnitude of the U value may indicate the relative position across the knitting direction, establishing a directional gradient that encodes lateral offset from the knitting direction curve.

The solver may then integrate the distance field to generate a transverse field, known as the V field, which may be perpendicular to the U field and locally parallel to the knitting direction. The V field may be depicted in FIGS. 4A and 4B as elements 402*a*, 402*b*, 402*c* and 402*d*. In embodiments where a course direction curve is defined, the solver may incorporate this curve as a constraint during the integration process, allowing the user to locally influence the orientation of courses on the surface. This may provide additional flexibility, enabling the user to override the default propagation and tailor the course direction to specific design requirements.

In certain variations, if a goring curve is present, the solver may cut the mesh along the goring curve, introducing a discontinuity in the solution of the field. Similarly, the solver may introduce discontinuities in regions of the surface that are non-integrable, such as areas with topological complexity or where the field cannot be smoothly defined. These discontinuities are not depicted in the present embodiment but may be present in other examples. The result of this process may be a UV field on the mesh surface, where each point may be assigned a coordinate pair (U, V), with V locally parallel to the knitting direction and U orthogonal to V, in accordance with one embodiment of the invention.

Figure 5A:
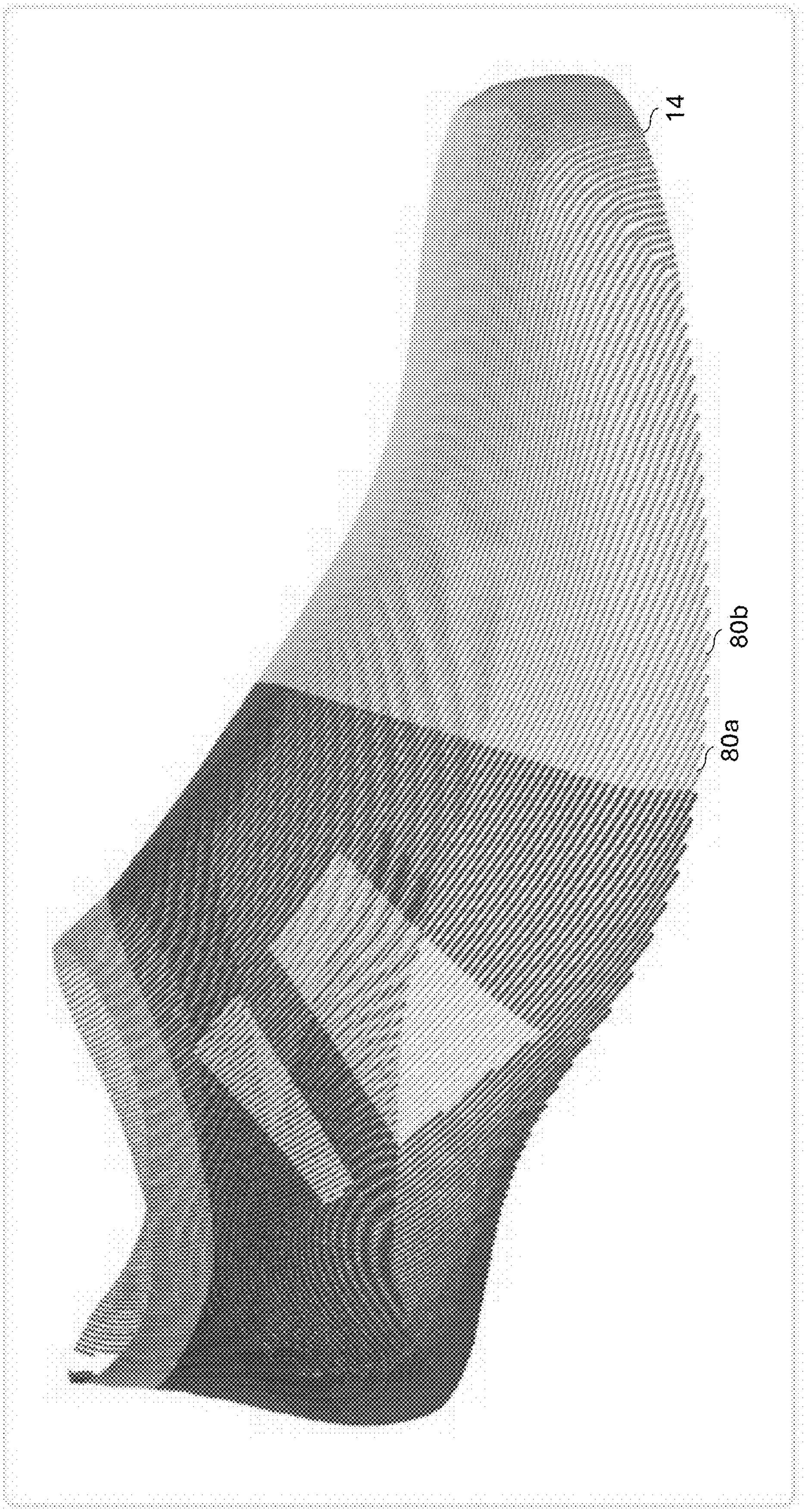
FIGS. 5A and 5B depict isolines extracted and rendered on the right-side and left-side of the input surface, respectively, reflecting constant values of the U field, in accordance with one embodiment of the invention.
Figure 5B:
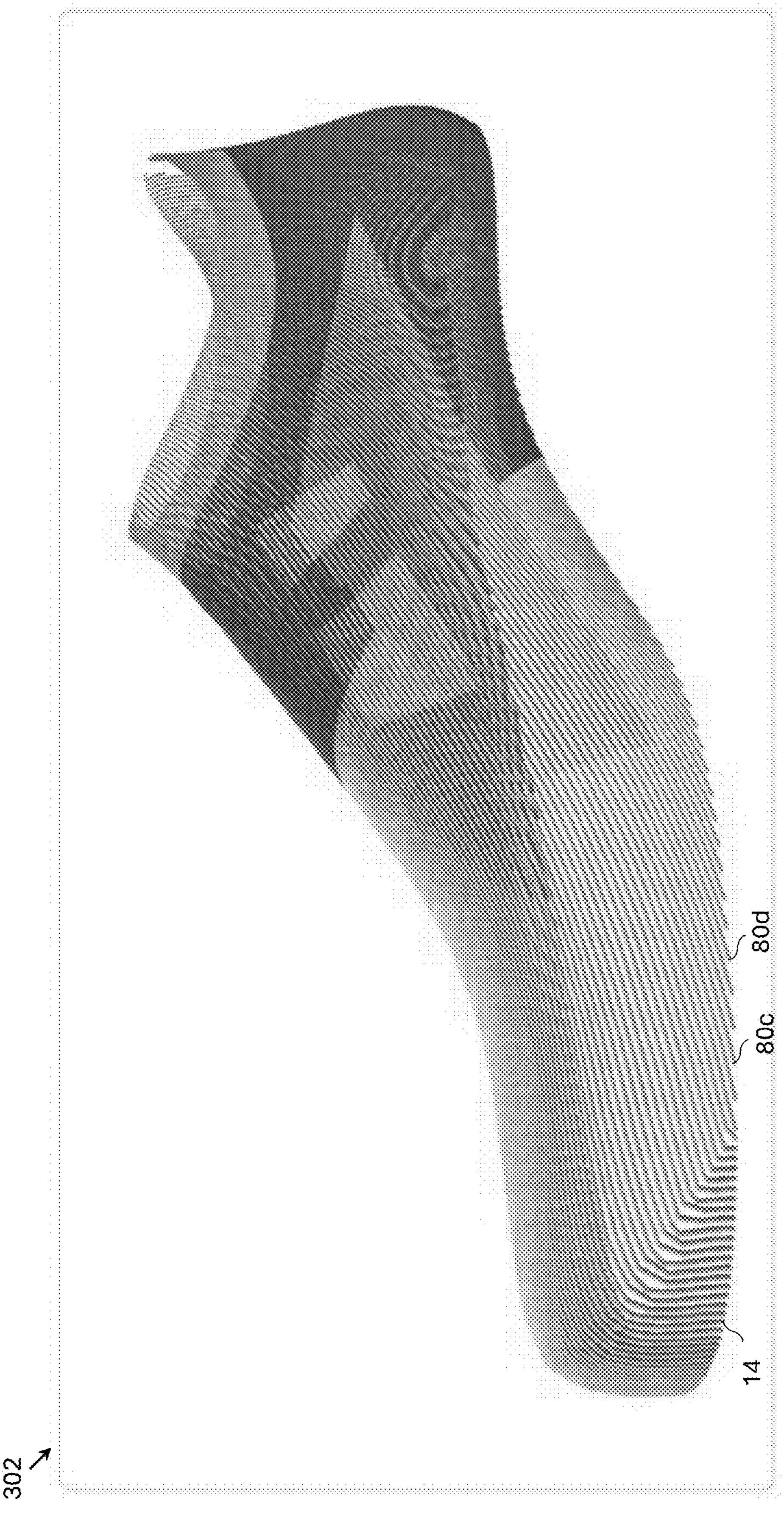

FIGS. 5A and 5B depict the extraction and rendering of isolines on the input surface 14, shown as a shoe upper. FIG. 5A shows the view of the right side 300 of the input surface 14, and FIG. 5B shows the view of the left side 302. All isolines generated by the generate isolines module 79 of kernel 86 are rendered for visual completeness, although only four isolines are explicitly labeled as 80*a*, 80*b*, 80*c*, and 80*d* for clarity. Each isoline may correspond to a constant value of the U field, which may be orthogonal to the knitting direction 24, and their spacing may reflect the local stitch density assigned to the surface or its zones. In some variations, stitch density may be specified as a pair of values associated with each zone, such as wale/cm and course/cm; in other variations, stitch density may be defined as two scalar fields on the triangulated mesh, representing a wale count field and a course count field. Higher density may yield tighter spacing, while lower density may yield wider spacing. The UV field parameterization may ensure that the V field is locally parallel to the knitting direction 24, defining wales, and the U field is orthogonal to the V field, defining courses. As described in connection with FIG. 1B, the generate isolines module 79 may receive the U field of the UV field 52 and the stitch density field 54, and may output isolines 80 at constant U values; in the UV map, these isolines may run parallel to the V axis and may correspond to wales. Kernel 86 may identify iso-contours of the distance field at intervals determined by the assigned stitch width. In some embodiments, isolines may be constrained not to branch or merge, producing monotonic wales; in other embodiments, branching and merging may be permitted to accommodate more complex knit structures. The rendered isolines in FIGS. 5A and 5B may serve as the foundation for discretization into packets and the construction of coursewise connections in the knitgraph, as described in subsequent figures.

Figure 6A:
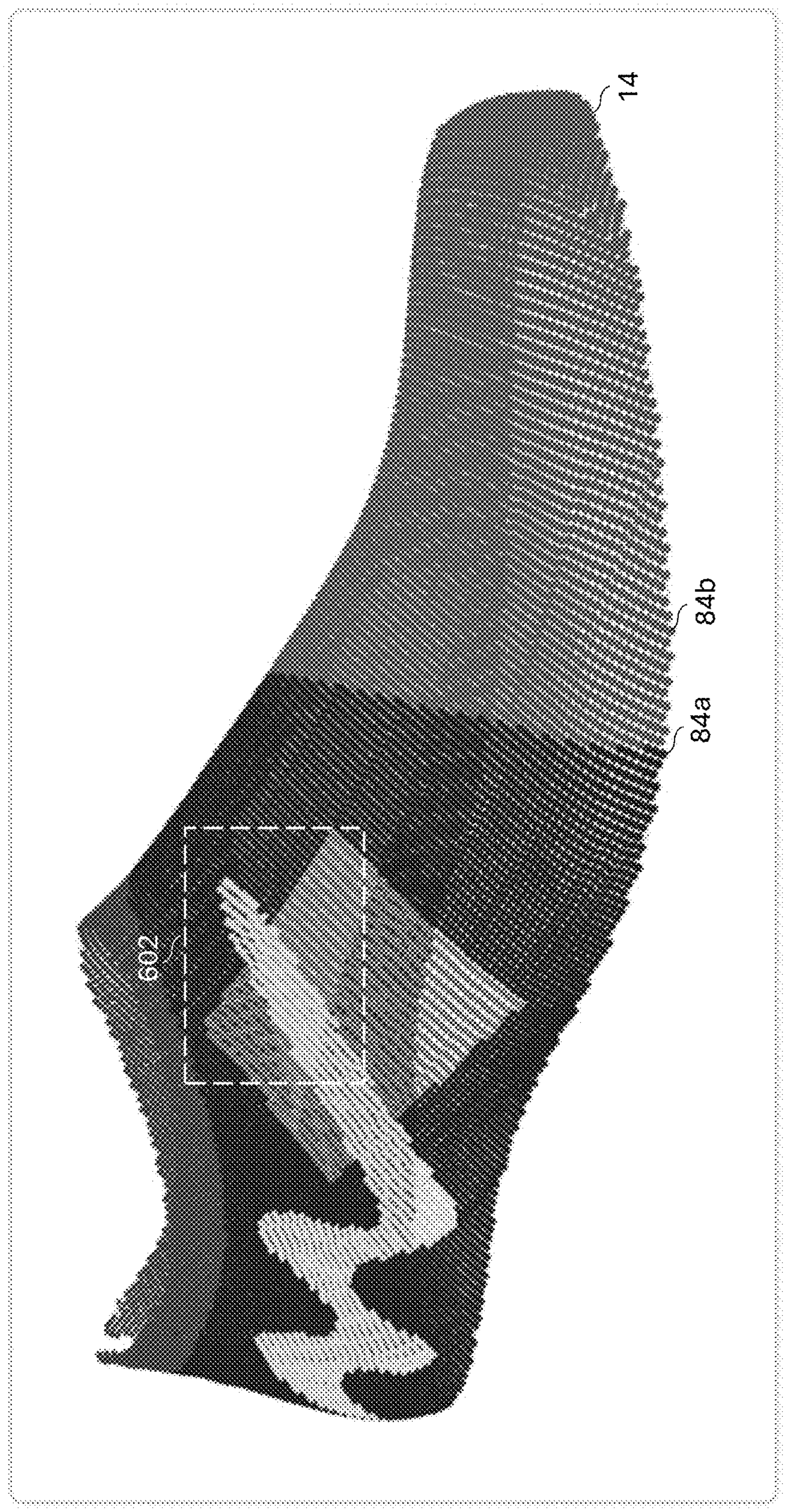
FIG. 6A depicts packets distributed along isolines on the right-side of input surface, reflecting local stitch density, in accordance with one embodiment of the invention.
Figure 6B:
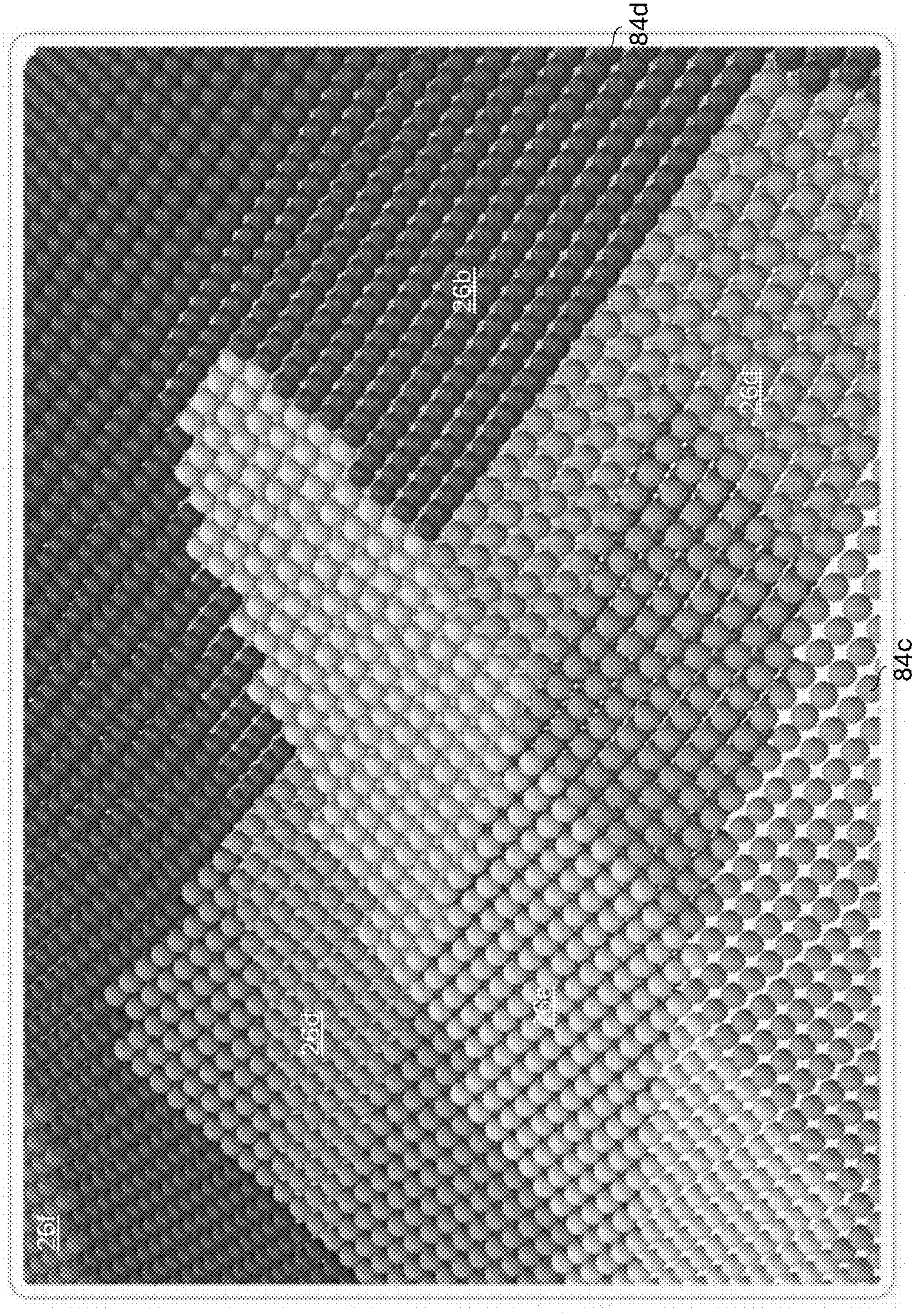
FIG. 6B depicts a zoomed-in portion of FIG. 6A highlighting packets within specific zones of the surface, in accordance with one embodiment of the invention.
Figure 6C:
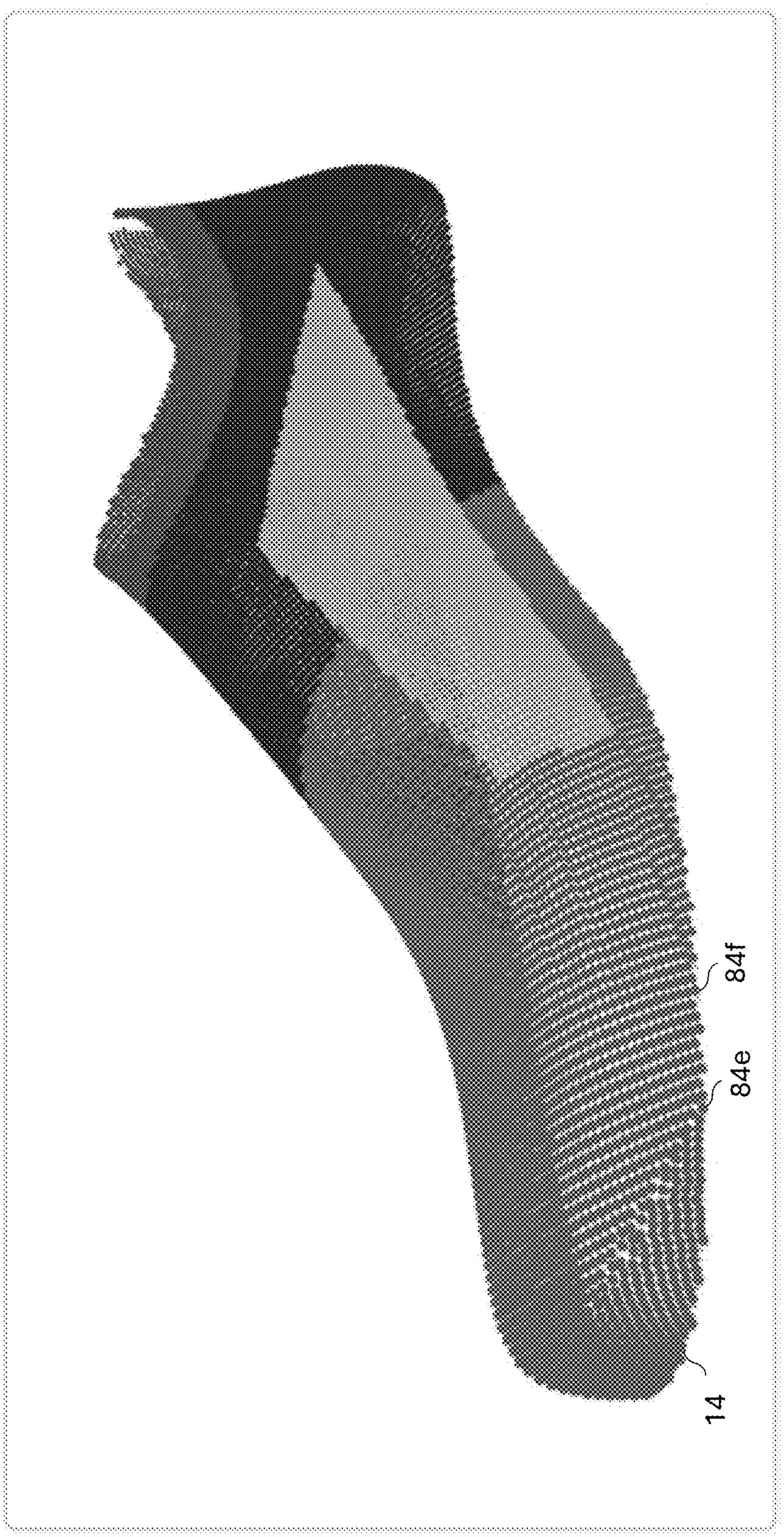
FIG. 6C depicts packets distributed along isolines on the left-side of input surface, reflecting local stitch density, in accordance with one embodiment of the invention.

FIGS. 6A-6C depict the distribution of packets on isolines across the input surface 14, shown as a shoe upper. FIG. 6A shows the right side 300 of the input surface 14, with packets 84*a* and 84*b* illustrated within the corresponding zones. FIG. 6B presents a zoomed-in portion 602 of the right side 300 of the input surface 14, highlighting packet 84*c* within zone 26*d* and packet 84*d* within zone 26*b*. FIG. 6C shows the left side 302 of the input surface 14, with packets 84*e* and 84*f* labeled. As described in connection with FIG. 1B, the generate packets module 82 may use the V field of the UV field 52, together with the stitch density field 54, the pattern (category) field 56, and the isolines 80, to produce packets 84 that may lie on each isoline at various values of V. The density of packets in zones 26*d* and 26*e* may be the same, while the density of packets in zone 26*b* may be greater than in zones 26*d* and 26*e*, resulting in a tighter spacing of packets in zone 26*b*. In some embodiments, the user may define different stitch densities for different regions, resulting in non-uniform packet distribution along the isolines. The rendered packets in FIGS. 6A-6C may serve as the basis for subsequent quantization and knitgraph construction.

Figure 7A:
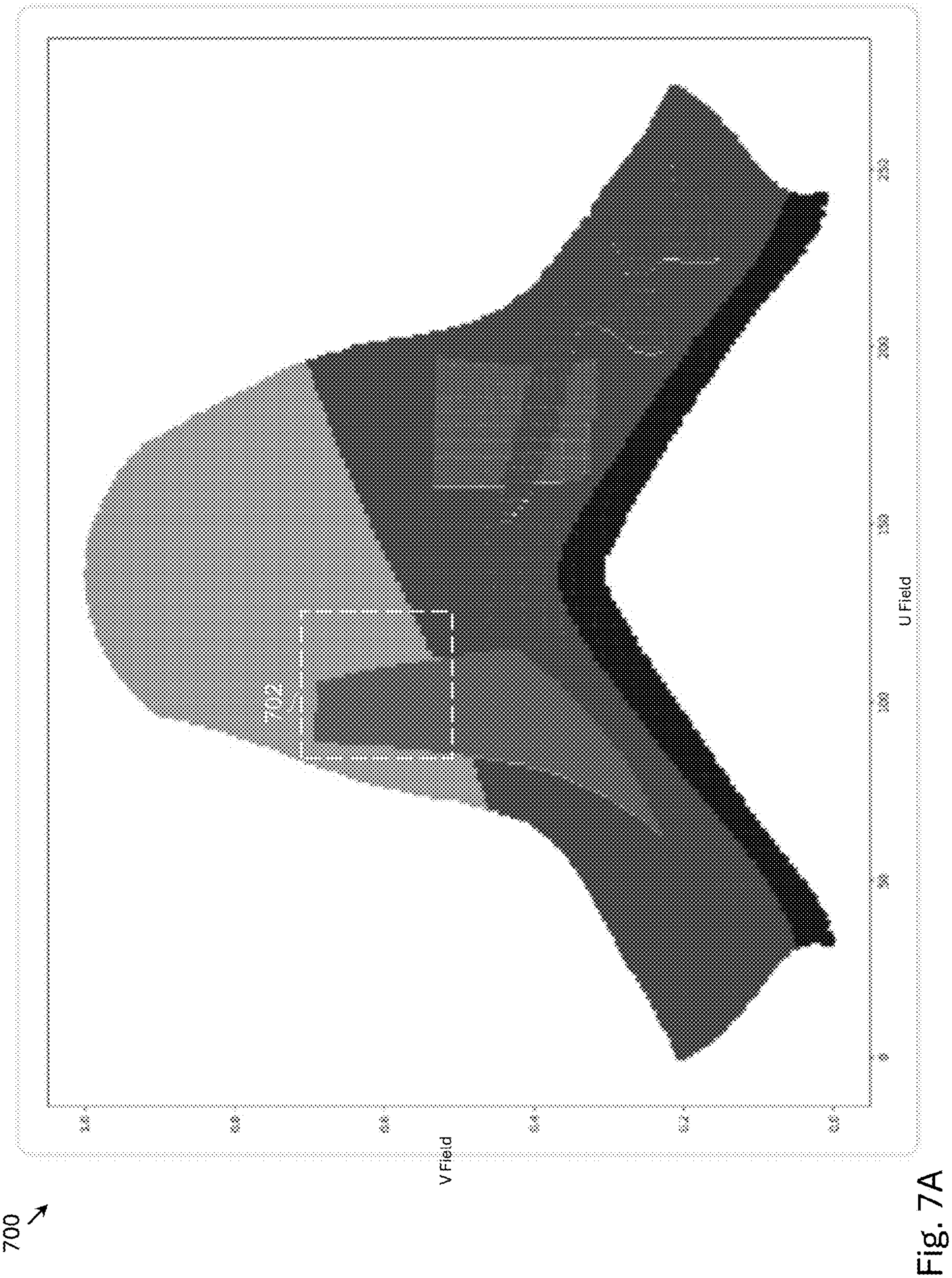
FIG. 7A depicts a UV-space visualization of packets associated with isolines of the input surface, in accordance with one embodiment of the invention.
Figure 7B:
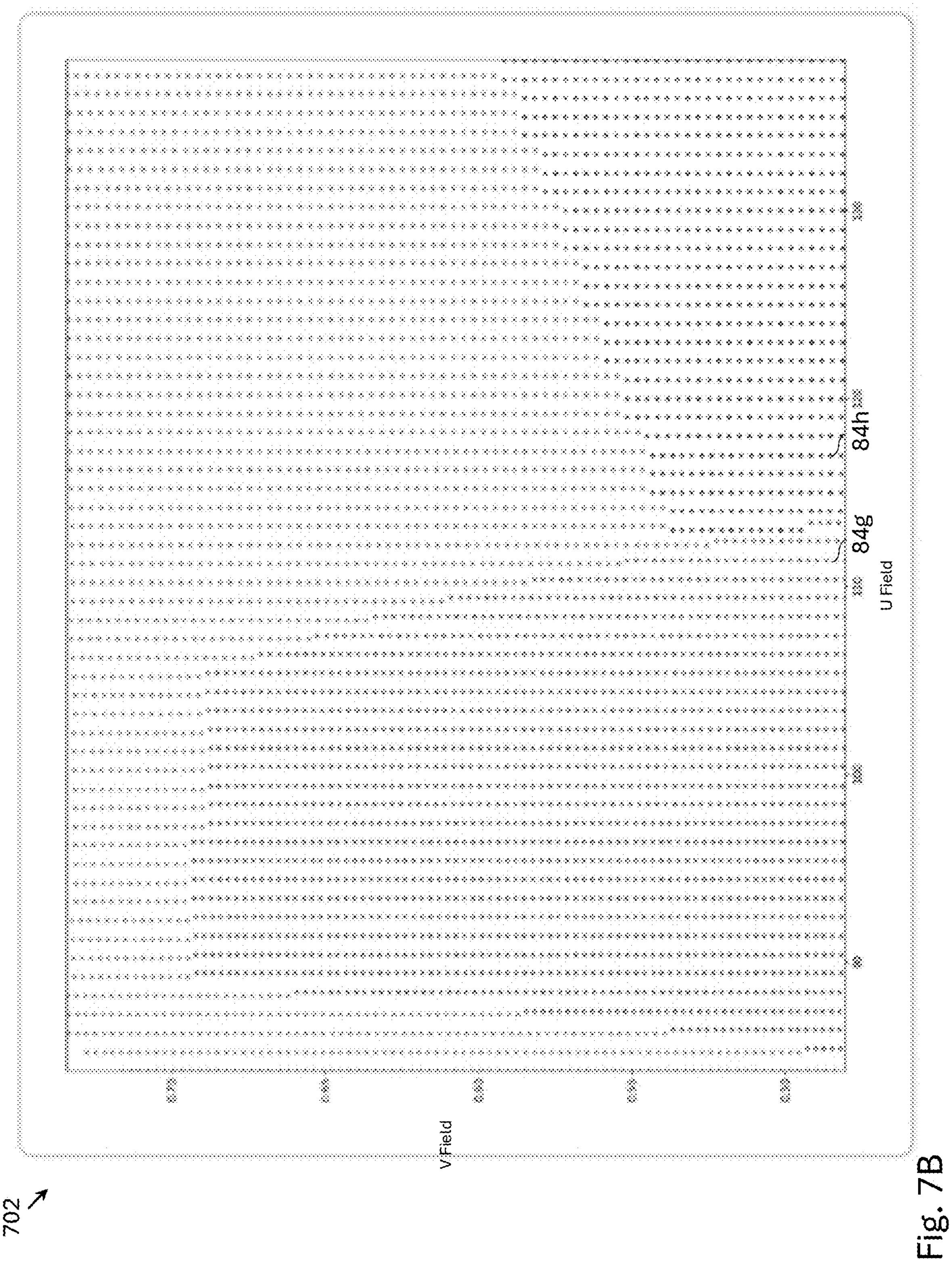
FIG. 7B depicts a zoomed-in portion of the UV-space visualization of FIG. 7A highlighting differences in packet spacing among zones, in accordance with one embodiment of the invention.

FIGS. 7A and 7B depict a UV-space visualization of packets 84 associated with isolines of the input surface 14. In FIG. 7A, scatter plot 700 may represent packet locations in a two-dimensional plane whose horizontal axis corresponds to the U field and whose vertical axis corresponds to the V field; representative packets 84*g* and 84*h* are plotted at their respective U-V coordinates, and the color of each packet may indicate the zone to which the packet corresponds. FIG. 7B shows a zoomed-in portion 702 that highlights spacing differences among packets (along the V direction) that may arise from stitch-density and pattern assignments. As described in connection with FIG. 1B, the generate packets module 82 may use the V field of the UV field 52, together with the stitch density field 54, the pattern (category) field 56, and the isolines 80 (each corresponding to a U value), to produce packets 84 that lie on each isoline at various values of V, and mapping these packets into UV coordinates may provide the visualization shown in FIGS. 7A and 7B. Although FIG. 7B illustrates quantization points sampled along isolines, the points are not depicted in perfect vertical alignment due to an artifact in the current rendering. In a correct embodiment, since quantization points are derived from isolines that run at constant U values, the points should appear vertically aligned, with variable vertical spacing reflecting local stitch density.

Figure 8A:
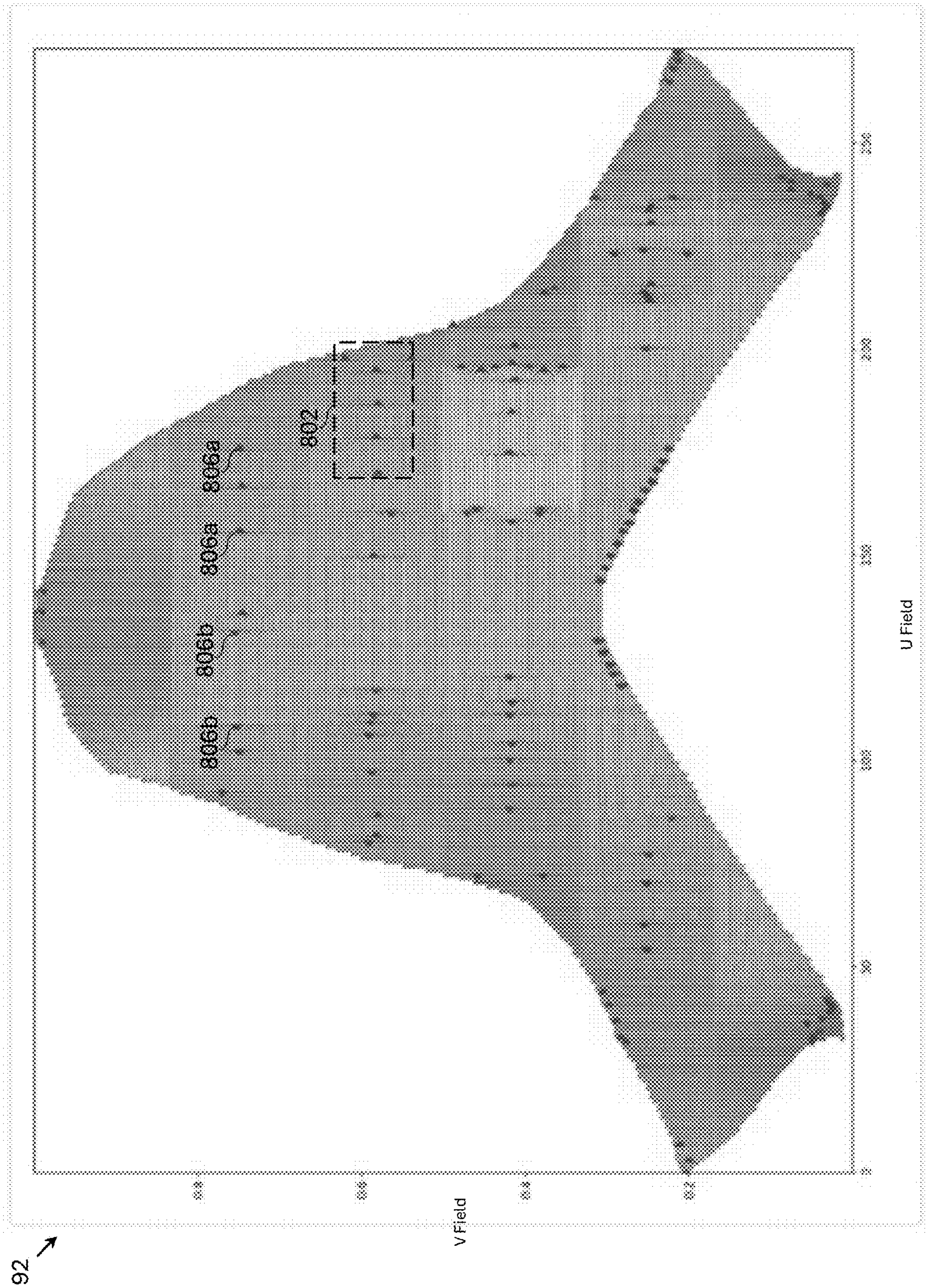
FIG. 8A depicts a two-dimensional (2D) knitgraph in UV space with directed edges between (implied) quantization points and short-row terminations indicated by callouts, in accordance with one embodiment of the invention.

FIG. 8A depicts an example of a two-dimensional (2D) knitgraph 92 plotted in UV space, with the U axis arranged horizontally and the V axis arranged vertically to represent courses and wales, respectively. At this overview scale, the figure depicts only the directed edges between (implied) quantization points, which encode both horizontal (coursewise) and vertical (wale-adjacent) connectivity, but the quantization points themselves are not shown. These directed edges are the result of an energy-minimization process that favors short, near-straight pairings and enforces a non-crossing topology in UV space, while also incorporating designer policies such as finished edges, goring regions, and no-goring zones. The ends of short rows are identified with callouts 806*a* at the left and 806*b* at the right; in this embodiment, callouts 806*a* are rendered with green arrowheads in FIG. 8A, while callouts 806*b* are rendered with red arrowheads, although the particular color is not limiting. It is also noted that not all of the short row ends have been annotated for ease of depiction. Short rows, or goring, may be understood as localized skips of horizontal connections between neighboring stitch candidates, and their terminations are indicated by these callouts. The underlying stitch candidates derive from discretization along isolines and are organized as packets prior to expansion into quantization points, but these elements are not depicted at this scale.

Figure 8B:
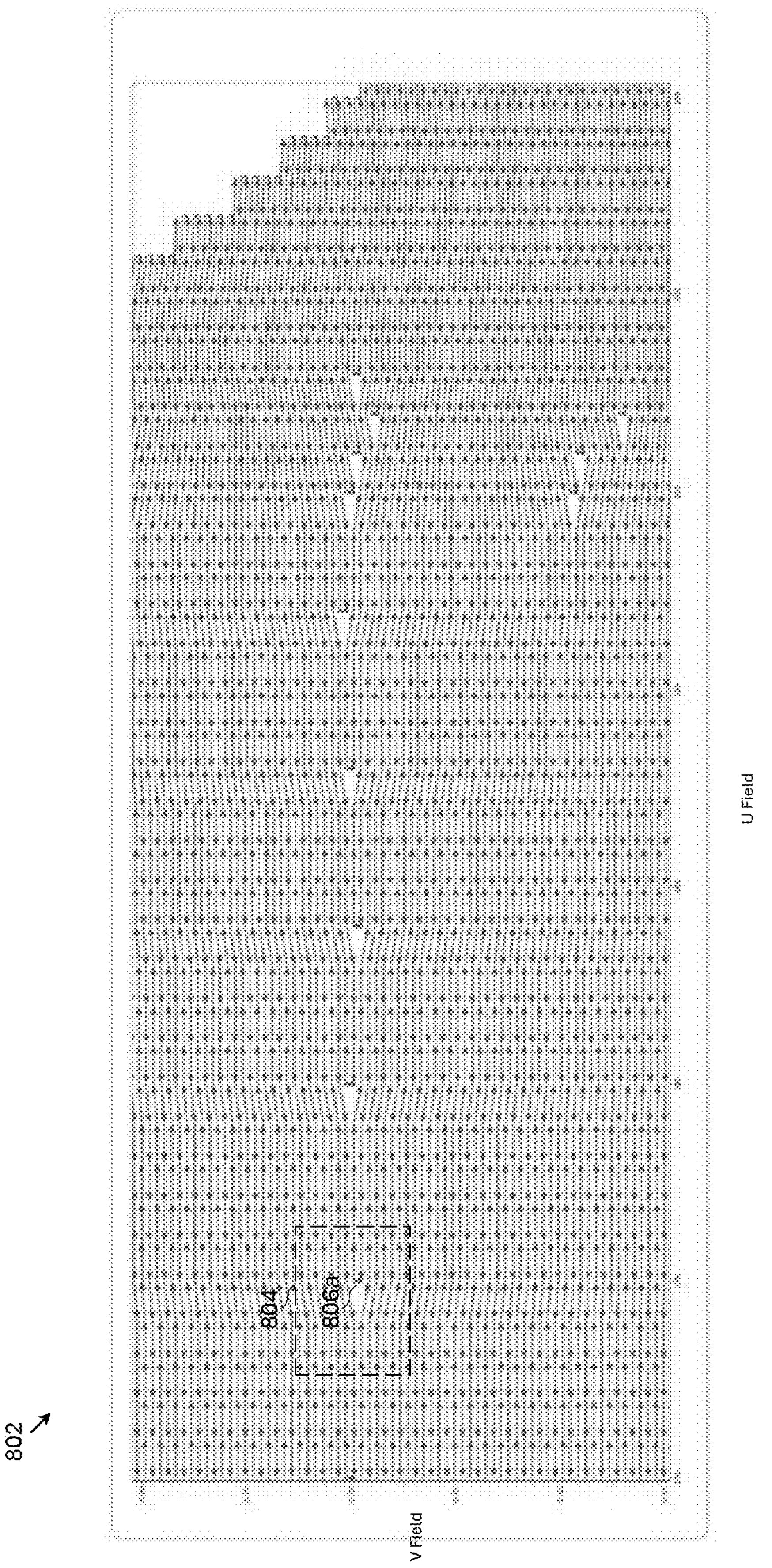
FIG. 8B depicts a zoomed-in portion of the 2D knitgraph of FIG. 8A to show the directed edges in more detail, in accordance with one embodiment of the invention.

FIG. 8B depicts a zoomed-in portion 802 of FIG. 8A to show the directed edges in more detail, but the quantization points and packets themselves remain unshown. The short-row end marker 806*a* is present in this zoom, consistent with its appearance in the overview, but without the green arrowhead indicator.

Figure 8C:
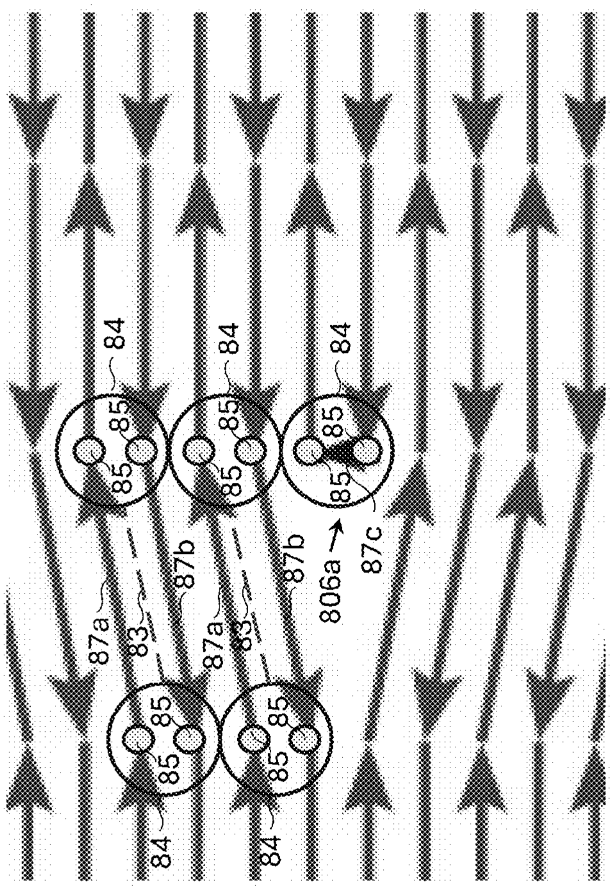
FIG. 8C depicts a zoomed-in portion of the 2D knitgraph of FIG. 8B to explicitly show selected packets, their associated quantization points, the connections between respective pairs of packets, and directed edges between respective pairs of quantization points, in accordance with one embodiment of the invention.

FIG. 8C depicts a zoomed-in portion 804 of FIG. 8B that explicitly depicts some of the packets 84 and their constituent quantization points 85, along with the connections 83 between respective pairs of packets 84 found through the energy minimization module 90. In this view, some of the packets and quantization points have been manually inserted for clarity, making explicit the relationship between packet-level connections and the quantization points that realize them. Each packet is positioned on an isoline and corresponds to one or more discretized stitch-location candidates distributed along V according to local stitch density. In the illustrated embodiment, each packet 84 spawns two quantization points 85, although other cardinalities are compatible with the framework, and each quantization point 85 inherits the U coordinate of its parent packet 84. In one embodiment, the cardinality is tunable (e.g., $k \in \{1 \ldots n\}$).

The V coordinates of the quantization points 85 may be offset from the parent packet's V by ±0.25 of the vertical spacing between adjacent packets, yielding two vertically separated points per packet that facilitate explicit coursewise pairing. After packet-level connections are fixed, heuristics may expand each packet connection 83 into one or more directed quantization-point edges 87*a*, 87*b* that respect feeder alternation and manufacturability constraints. Horizontal directed edges pointing left are indicated as 87*b* (depicted in red), horizontal directed edges pointing right are indicated as 87*a* (depicted in green), and vertical directed edges indicating respective short-row ends are indicated as 87*c* (depicted in blue), with colors used for clarity and not limiting. Each quantization point may receive a category by UV-based lookup into upstream fields, pairing a knit-cell type with a yarn-feeder assignment, and these assignments may later be rewritten by policy and compiler stages to ensure physical knittability. The aggregate of horizontal and vertical edges across the knitgraph defines a locally non-crossing, policy-compliant subgraph whose structure is suitable for simulation, compilation, and machine-specific conversion. The short-row end marker 806*a* is present in this zoomed-in view, consistent with its appearance in FIGS. 8A and 8B, but again without the green arrowhead indicator.

Figure 9A:
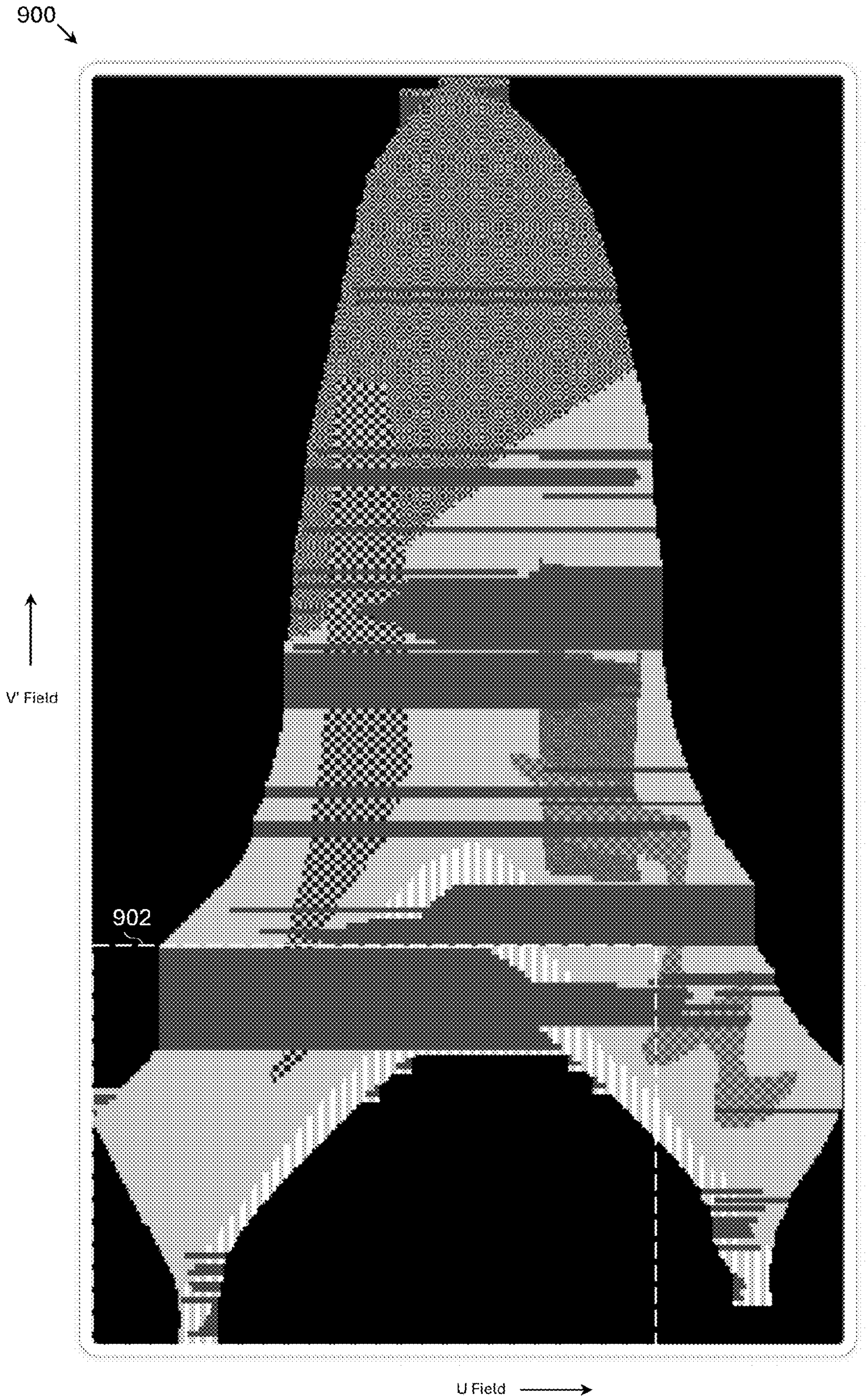
FIG. 9A depicts a 2D abstract knitmap constructed from the 2D knitgraph of FIG. 8A using a row straightening operation, in accordance with one embodiment of the invention.

FIG. 9A illustrates a 2D abstract knitmap 900 that results from the row-straightening operation applied to the knitgraph constructed in UV space, as detailed in FIG. 8C. In this process, each set of quantization points connected by directed horizontal edges that point in the same direction is assigned to a single row in the 2D abstract knitmap 900. This ensures that each course (row) in the grid corresponds to a set of quantization points with a consistent horizontal connectivity direction, while columns preserve vertical (wale) adjacency. Where skips or short-row behavior are present in the knitgraph, the row-straightening operation inserts empty positions into the grid, producing a regular structure with gaps that faithfully reflect the underlying topology. The horizontal axis of the 2D abstract knitmap 900 corresponds to the U parameter, and the vertical axis corresponds to a discrete index V' aligned with the V parameter of the UV field.

Figure 9B:
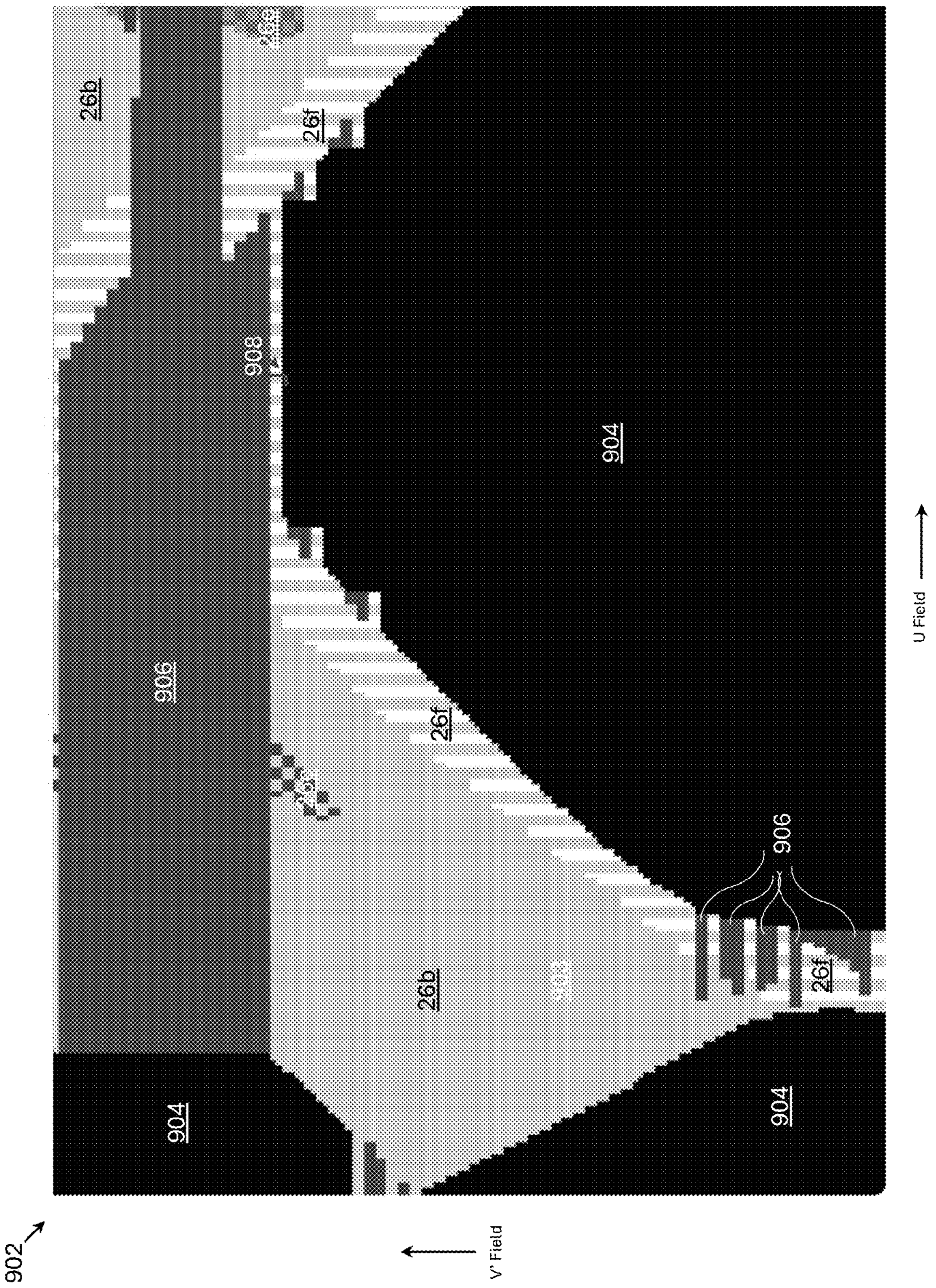
FIG. 9B depicts a zoomed-in portion of the 2D abstract knitmap FIG. 9A, in which pixels (which have a one-to-one correspondence to the quantization points from the knitgraph) are more clearly shown, along with different fill patterns to represent each pixel's membership in a corresponding zone of the input surface, in accordance with one embodiment of the invention.

FIG. 9B presents a zoomed-in view of region 902 from FIG. 9A, showing the 2D abstract knitmap 900 at stitch resolution. Each pixel 903 represents a stitch location corresponding one-to-one with a quantization point from the 2D knitgraph 92, and each carries a category that encodes both knitcell type and yarn-feeder assignment. Empty areas 904, depicted as a black background, indicate positions where no stitch is present. Goring regions 906, rendered in dark gray and visually distinct from the empty areas 904, arise from the gaps inserted during row-straightening to accommodate skips or short rows. Zone membership is indicated by non-limiting fill patterns: for example, pixels within zone 26*b* have a beige fill, those in zone 26*c* have a blue-beige checkered fill, zone 26*e* uses a red-green checkered fill, and zone 26*f* uses a white-beige vertical-column fill. Bracket 908 highlights two adjacent rows of pixels, each corresponding to a course in the knitted article. The structured layout of the 2D abstract knitmap 900 preserves the coursewise and wale-wise relationships established in the knitgraph 92, while making explicit the effects of skips and short rows at the stitch level.

Figure 10A:
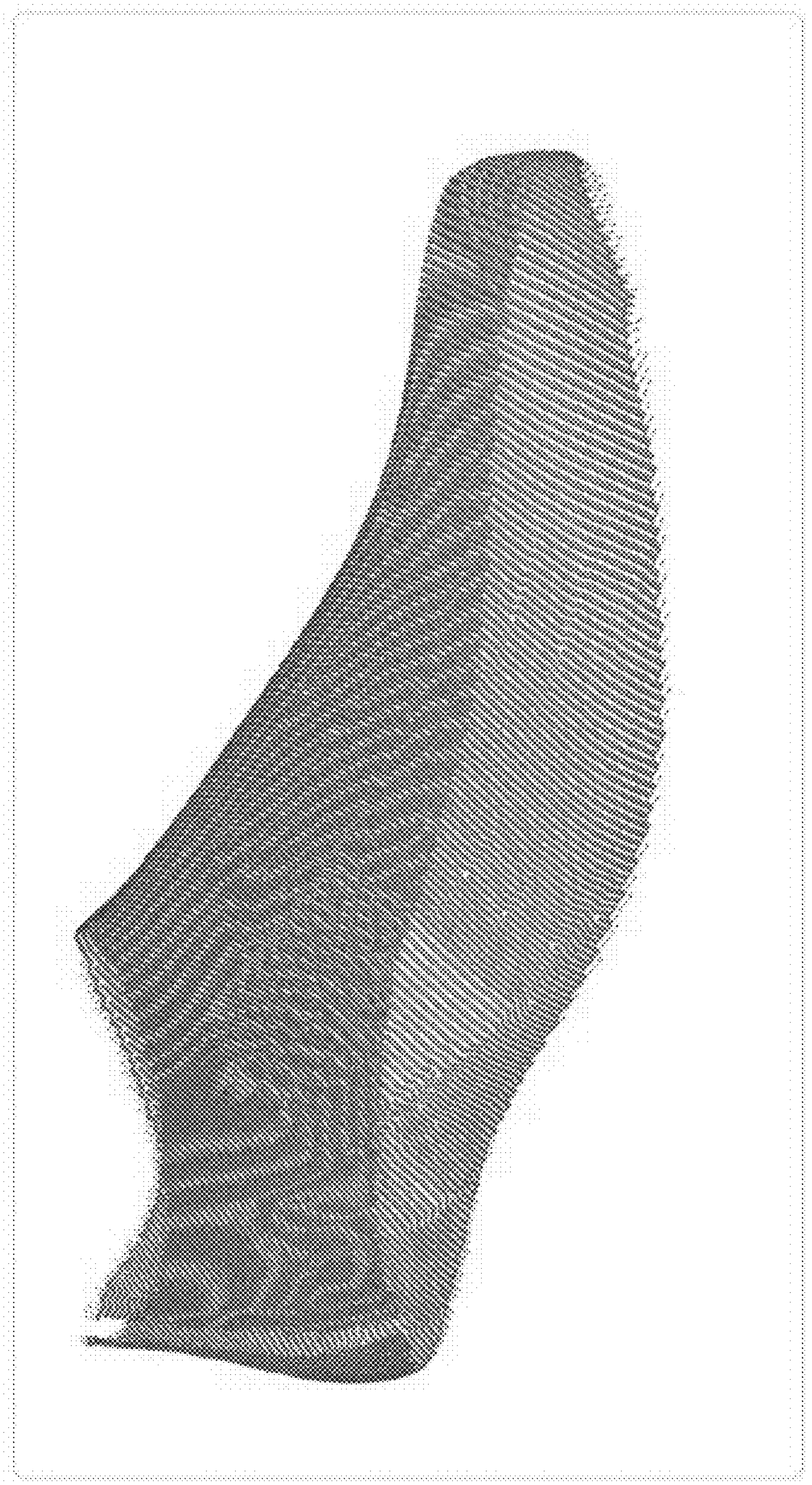
FIG. 10A depicts a right-side view of a 3D knitgraph (after the 2D knitgraph was mapped onto the input surface), illustrating the spatial arrangement of stitch locations and connections, in accordance with one embodiment of the invention.
Figure 10B:
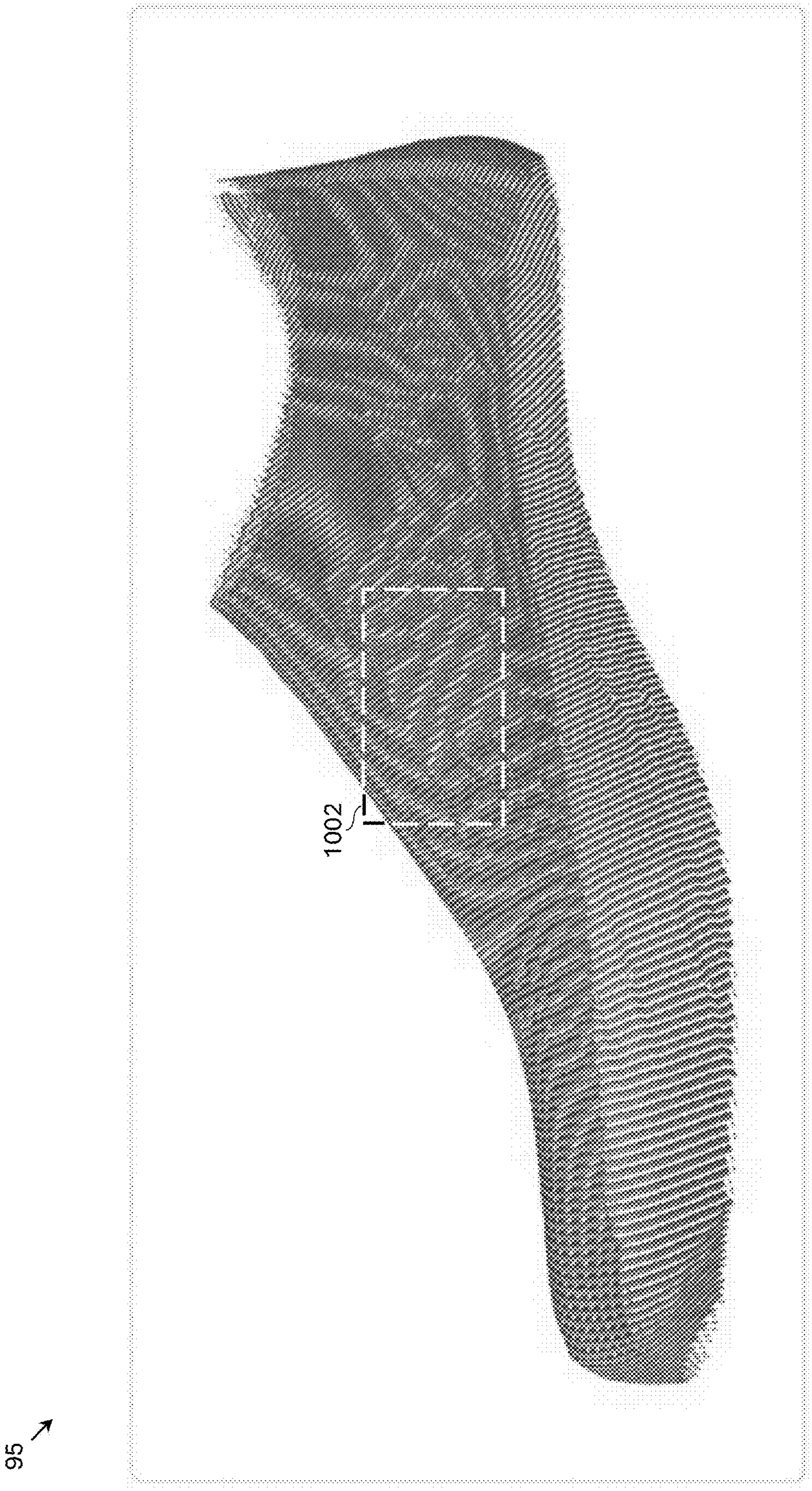
FIG. 10B depicts a left-side view of the 3D knitgraph depicted in FIG. 10A, in accordance with one embodiment of the invention.
Figure 10C:
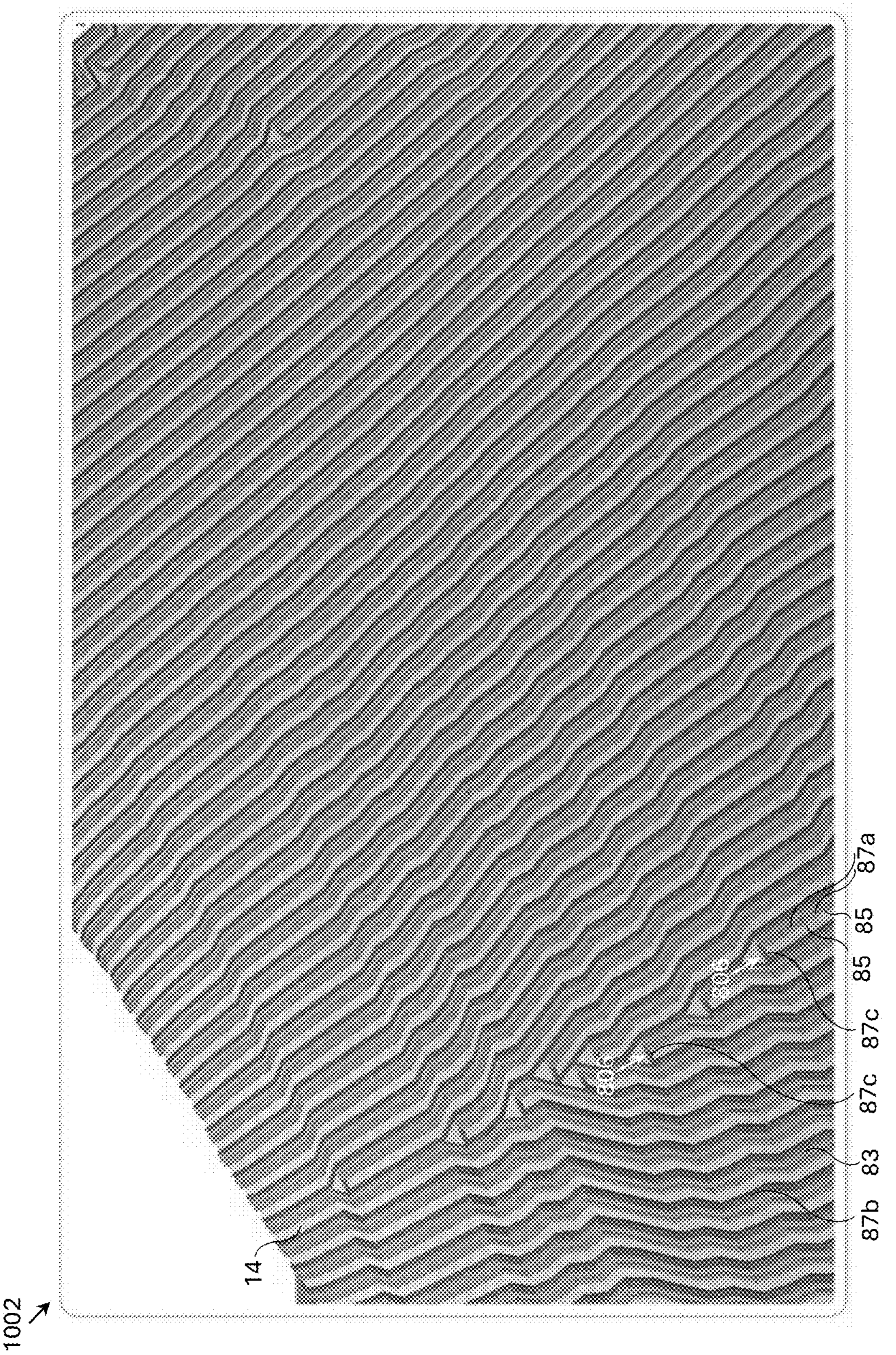
FIG. 10C depicts a zoomed-in portion of the 3D knitgraph depicted in FIG. 10B, in accordance with one embodiment of the invention.

FIGS. 10A-10C depict an example of a three-dimensional knitgraph mapped onto the input surface 14. FIG. 10A depicts the right-side view of the 3D knitgraph 95; FIG. 10B depicts the left-side view of the 3D knitgraph 95; and FIG. 10C depicts a zoomed-in portion 1002 in which quantization points 85 appear as small breaks along connections 87*a*, 87*b*, vertical connections 87*c* are visible between adjacent course rows, and short-row end indicators 806 mark the terminations of short rows.

The figures may illustrate the output of a generate-3D-knit-graph operation that receives the 2D knitgraph 92 and, using the stored parameterization derived from the UV field, maps each stitch location and its edges to corresponding three-dimensional coordinates on the input surface so that graph connectivity is preserved while conforming to the surface geometry. The resulting structure may be a 3D knitgraph labeled 95 in the drawings and may correspond to the 3D knitgraph 95 produced by the generate 3D knitgraph module 91.

In the right-side view (FIG. 10A) and the left-side view (FIG. 10B), the mapping may respect a parameterization in which the V parameter is locally parallel to the knitting direction and the U parameter is orthogonal to V. Under this correspondence, wales may follow the V field and courses may follow U when realized on the three-dimensional article, providing a geometric drape of the knit-graph connectivity over the surface without altering the underlying adjacency relationships established in the 2D knitgraph 92.

FIG. 10C illustrates the zoomed-in portion 1002 of the 3D knitgraph 95, where the connectivity of the 2D knitgraph 92 is mapped onto the three-dimensional input surface 14 using the UV field parameterization. The gray regions in the figure represent the input surface 14, providing a visual context for the placement of quantization points and their connections. Quantization points 85 are nearly invisible and appear as subtle breaks between the connections 87*a*. The connections between quantization points are differentiated by color and function: green connections 87*a* correspond to the primary links between quantization points, red connections 87*b* also connect quantization points but the breaks in these segments are not visible due to the use of red for both the segments and the breaks, resulting in the appearance of continuous lines, and purple connections 87*c* connect adjacent quantization points from two neighboring rows of courses, in contrast to the blue depiction of these connections in FIG. 8C.

Connections 83 between packets are shown as solid blue lines in FIG. 10C, which is a deviation from the dashed blue lines used in FIG. 8C. These solid blue lines represent connections between packets, though the packets themselves are omitted in FIG. 10C to maintain clarity and focus on the connectivity structure. The ends of short rows 806 are indicated in FIG. 10C, consistent with their depiction in FIGS. 8B and 8C.

The generation of the 3D knitgraph 95 involves mapping the connectivity information from the 2D knitgraph 92 onto the three-dimensional representation of quantization points by leveraging the correspondence established by the UV field. This mapping preserves the connectivity of the original 2D knitgraph 92 while conforming to the geometry of the input surface 14. Although the connections in FIGS. 8A through 8C are depicted as directed edges, for ease of illustration in FIG. 10C these edges are shown without arrows, simplifying the visualization while maintaining the structural relationships.

FIG. 10C provides a detailed view of how the connectivity of the 2D knitgraph 92 is realized in three dimensions, highlighting the technical process of mapping stitch locations and their connections onto a complex surface. The UV parameterization enables this mapping, resulting in a 3D knitgraph 95 that is both topologically faithful to the original design and geometrically adapted to the input surface 14, supporting advanced modeling and analysis of knitted structures.

Figure 11A:
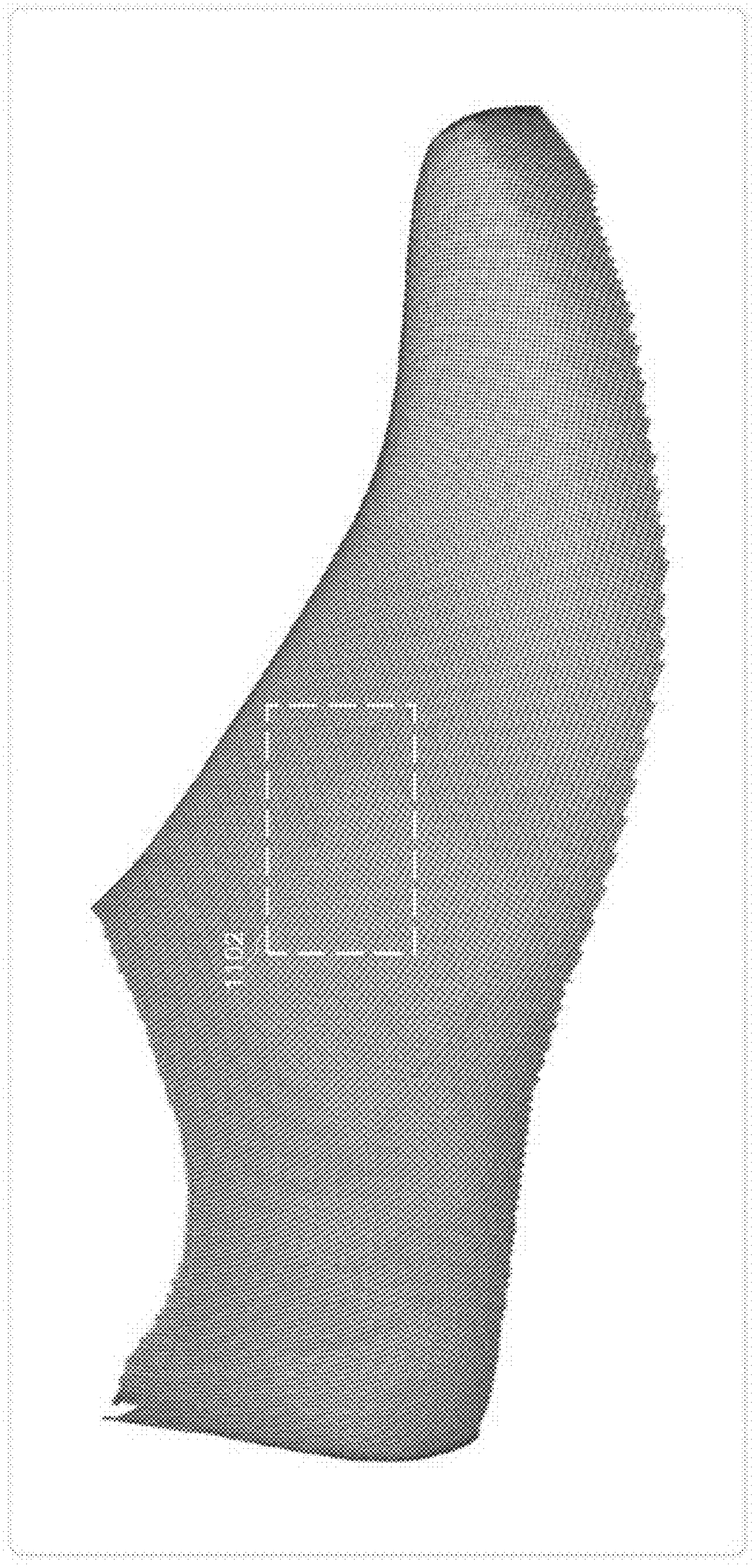
FIG. 11A depicts the right-side view of a quad-dominant 3D knitmesh generated from a three-dimensional knitgraph, in accordance with one embodiment of the invention.
Figure 11B:
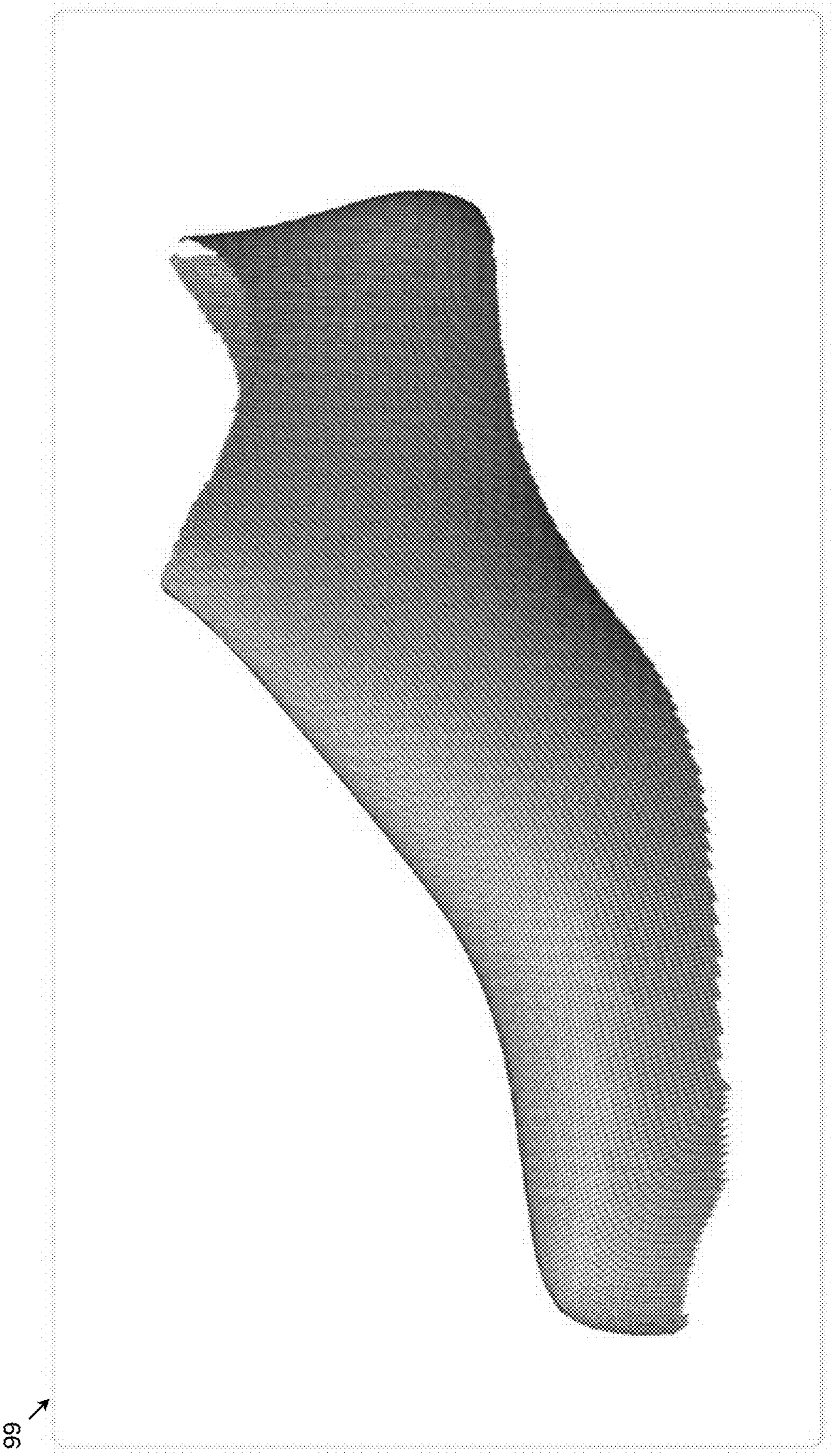
FIG. 11B depicts the left-side view of the quad-dominant 3D knitmesh depicted in FIG. 11A, in accordance with one embodiment of the invention.
Figure 11C:
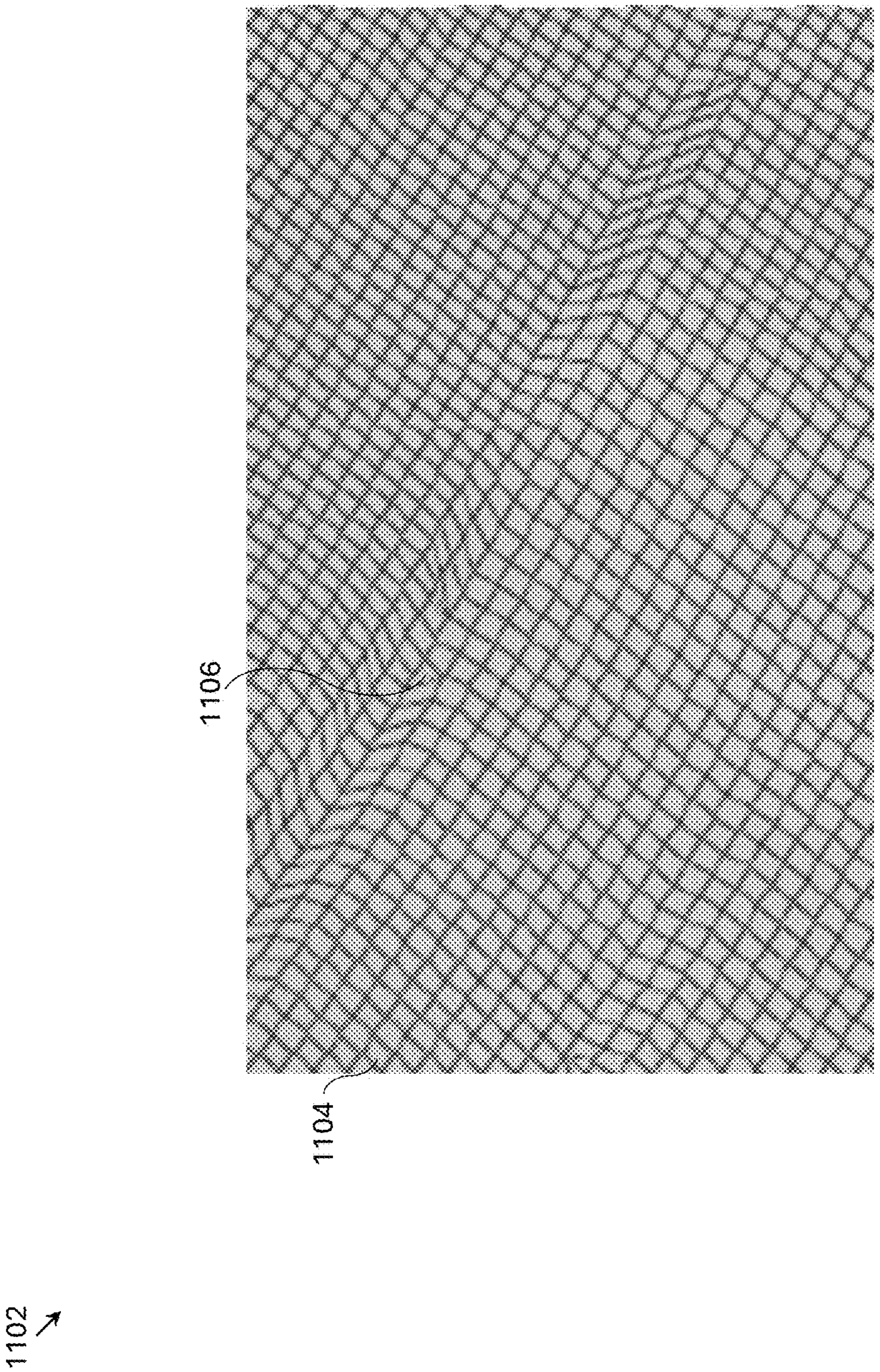
FIG. 11C depicts a zoomed-in view of a portion of the 3D knitmesh depicted in FIG. 11A, in accordance with one embodiment of the invention.

FIGS. 11A, 11B, and 11C illustrate the results of converting a three-dimensional knitgraph 95 into a quad-dominant 3D knitmesh 99 with a UV map, in accordance with one embodiment of the invention. FIGS. 11A and 11B show the right-side and left-side views, respectively, of 3D knitmesh 99. In both figures, the 3D knitmesh 99 is comprised of polygons including quadrangles (quads) and triangles. Each quad represents a quantization point in the mesh, while triangles are used to complement regions associated with goring or short-row features. Each polygonal unit—whether quad or triangle—can be understood as a knitcell, representing a discrete stitch location or a group of stitches in the knitted article. The arrangement of quads and triangles across the surface reflects the underlying quantization and connectivity established by the 3D knitgraph 95, as well as the assignment of knitcell types and yarn feeders. The mesh structure is generated so that the UV map of the 3D knitmesh 99 is consistent with the abstract knitmap 94*a*, preserving the correspondence between schematic stitch locations and their geometric realization on the article surface. FIG. 11C depicts portion 1102 of FIG. 11A in a zoomed-in manner, providing additional detail of the 3D knitmesh 99 and highlighting the arrangement and geometry of quads 1104 and triangles 1106 within the mesh. While only quads and triangles are depicted in 3D knitmesh 99, it is understood that polygons with other number of sides may be present in other embodiments.

Figure 12A:
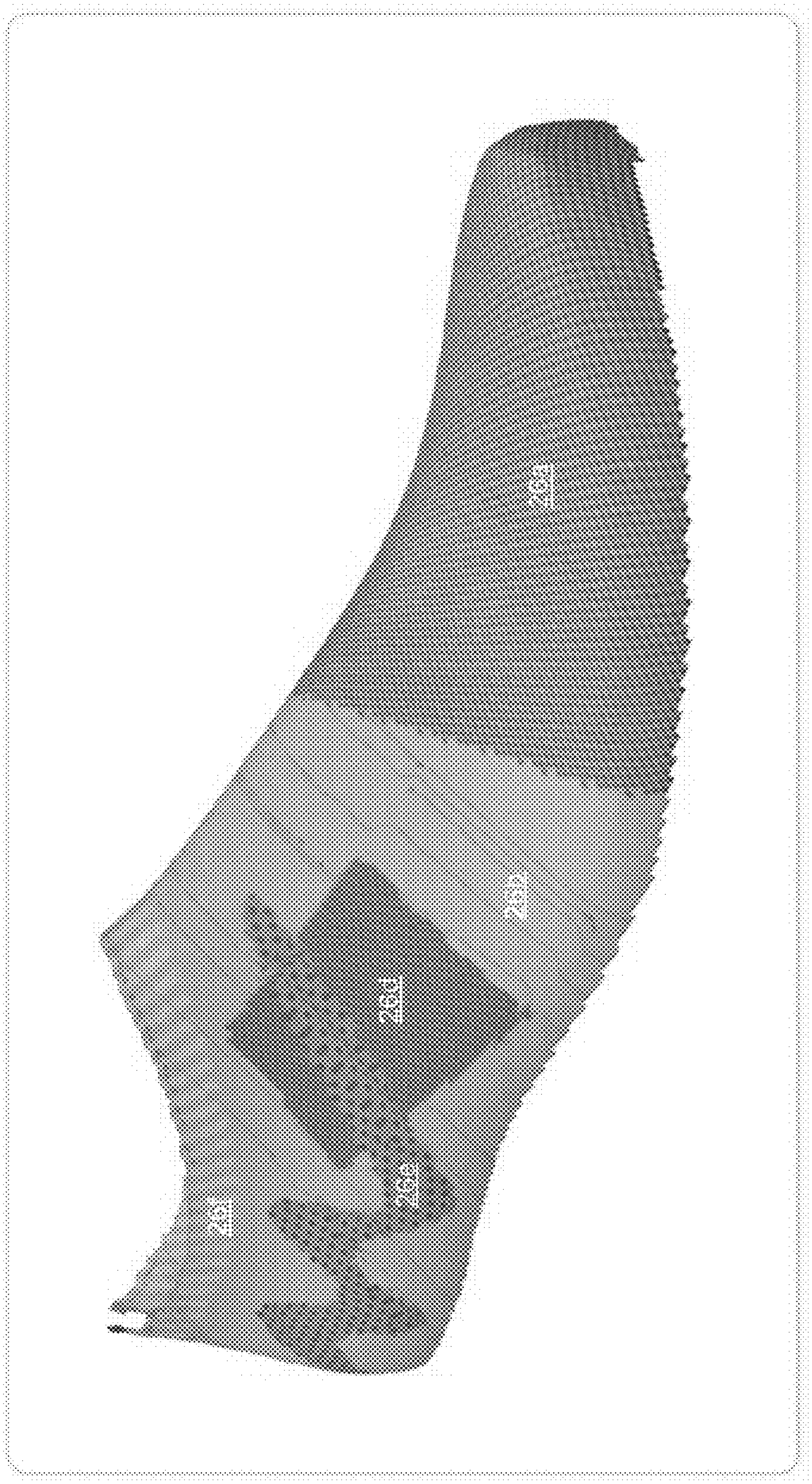
FIGS. 12A and 12B illustrate the right-side and left-side views, respectively, of a knitmesh visualization, in accordance with one embodiment of the invention.
Figure 12B:

FIGS. 12A and 12B illustrate the right-side and left-side views, respectively, of a knitmesh visualization 1200, which is an example output of knitmesh visualization module 124. Knitmesh visualization 1200 may be generated by texture mapping the two-dimensional abstract knitmap 94*c* onto the three-dimensional knitmesh 99 using its UV coordinates. This visualization enables the category associated with each face on the knitmesh to be displayed, allowing rapid assessment of how schematic intent and zone assignments are realized on the garment surface.

Distinct regions of knitmesh visualization 1200 correspond to different zones, each indicated by a unique fill pattern or coloration:

The portion depicted with a gray column-light gray column pattern corresponds to zone 26*f* (indicated in FIGS. 12A and 12B).

The portion depicted with a blue and gray small, checkered pattern corresponds to zone 26*a* (indicated in FIGS. 12A and 12B).

The portion depicted with a blue and gray large, checkered pattern corresponds to zone 26*c* (indicated in FIG. 12B).

The portion depicted with a gray solid pattern corresponds to zone 26*b* (indicated in FIGS. 12A and 12B).

The portion depicted with an orange and gray small, checkered pattern corresponds to zone 26*d* (indicated in FIG. 12A).

The portion depicted with a turquoise and magenta small, checkered pattern corresponds to zone 26*e* (indicated in FIG. 12A).

These patterns are not limiting and serve to visually distinguish the zones for clarity. The visualization may also display quad-dominant surfaces with triangular faces indicating goring or short-row features, and may support toggling of UV guides, isolines, and overlays to diagnose anomalies introduced during discretization or energy-based connection selection. By mapping the abstract knitmap 94*c* onto the three-dimensional knitmesh 99, knitmesh visualization 1200 enables designers and engineers to verify that zone boundaries, pattern assignments, and other design features are faithfully represented in both schematic and geometric domains. This supports manufacturability and advanced design features, including localized goring, short rows, and per-zone pattern assignments.

Figure 13A:
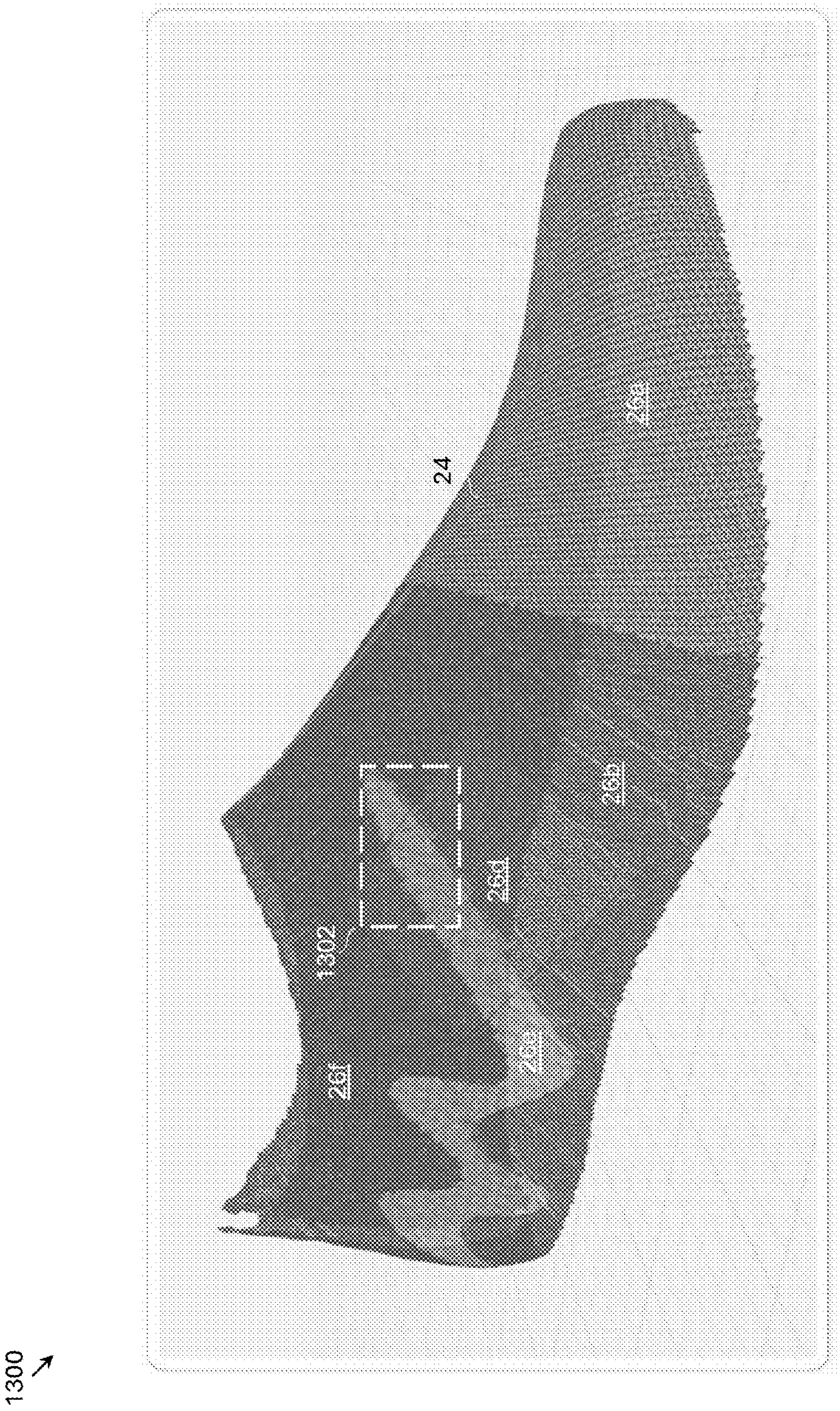
FIGS. 13A and 13B illustrate the right-side and left-side views, respectively, of a schematic visualization, in accordance with one embodiment of the invention.
Figure 13B:
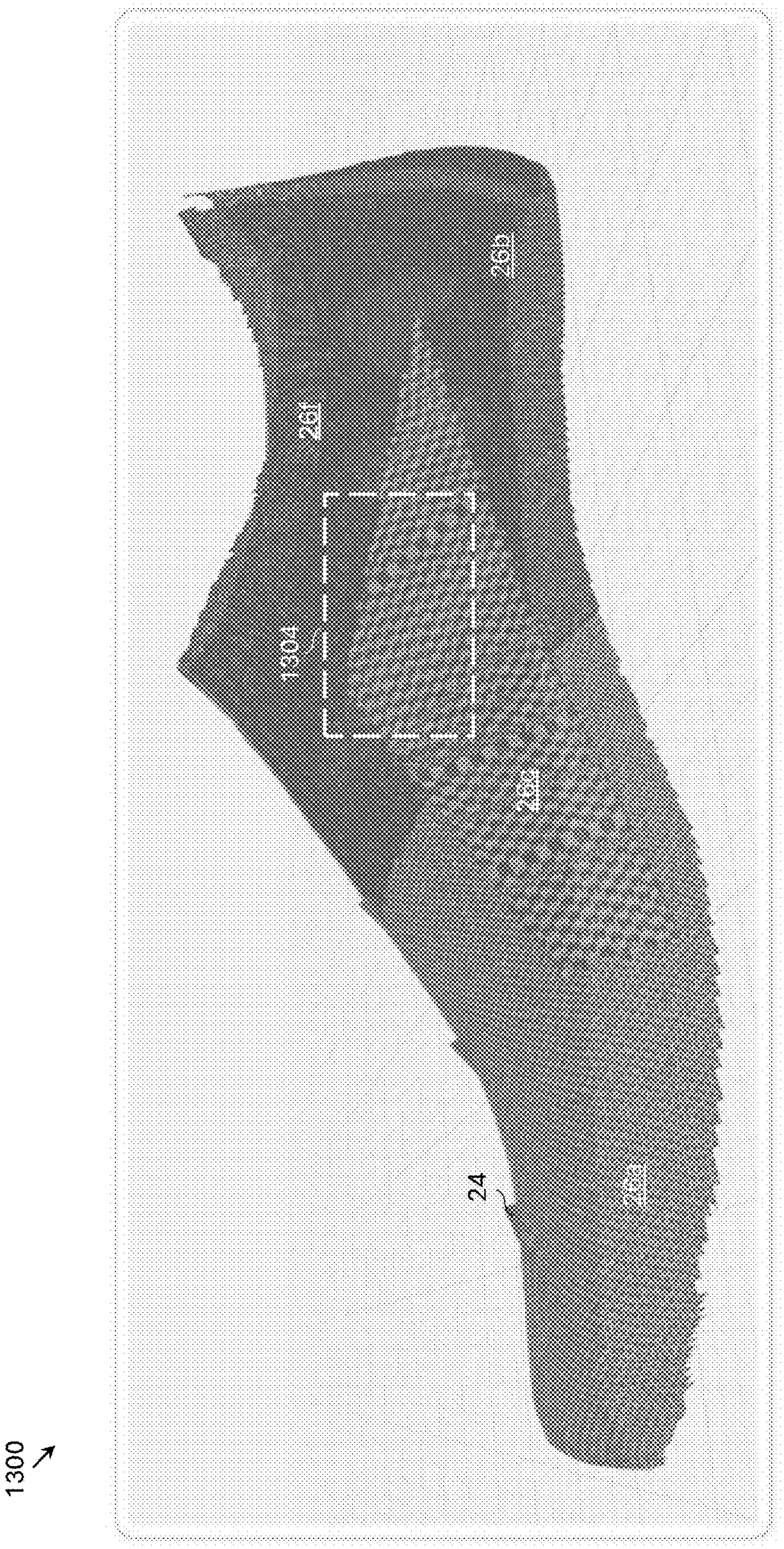

FIGS. 13A and 13B illustrate the right-side and left-side views, respectively, of a schematic visualization 1300, which is an example output of schematic visualization module 134. In this visualization, a simulated stitch is presented at the location of each polygon of the 3D knitmesh 99, with the type of simulated stitch—such as color, jersey, purl, or other knitcell types—determined from the knitcell data for GPU 128. The output is fully three-dimensional, matching the geometry of the 3D knitmesh 99, and provides a direct preview of how the intended stitch pattern and category assignments will appear on the fabricated article.

Distinct regions of schematic visualization 1300 correspond to different zones, each indicated by a unique color or stitch pattern:

The portion with gray (and touches of green) stitches corresponds to zone 26*f* (indicated in FIGS. 13A and 13B).

The portion with green and gray jersey stitches corresponds to zone 26*a* (indicated in FIGS. 13A and 13B).

The portion with green and gray checkered pattern stitches corresponds to zone 26*c* (indicated in FIG. 13B).

The portion with dark gray stitches corresponds to zone 26*b* (indicated in FIGS. 13A and 13B).

The portion with blue stitches corresponds to zone 26*d* (indicated in FIG. 13A).

The portion with light gray stitches corresponds to zone 26*e* (indicated in FIG. 13A).

Figure 13C:
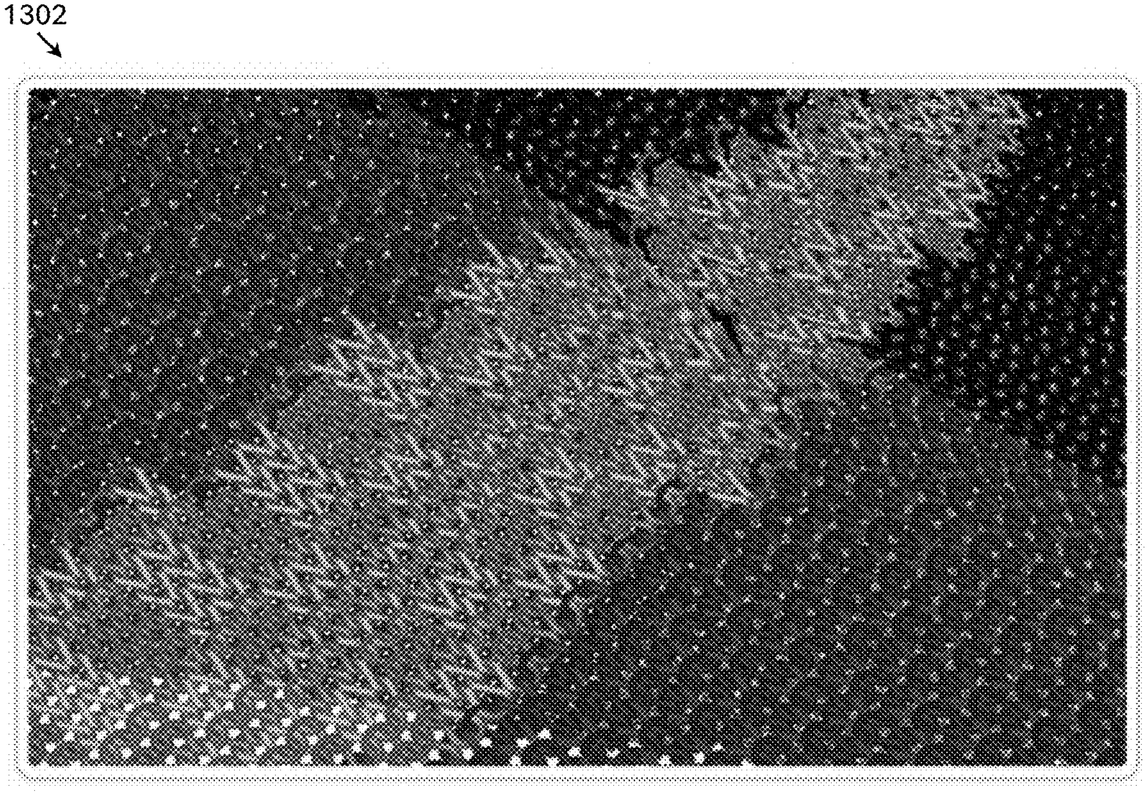
FIG. 13C presents a magnified view of a portion indicated in FIG. 13A, in accordance with one embodiment of the invention.
Figure 13D:
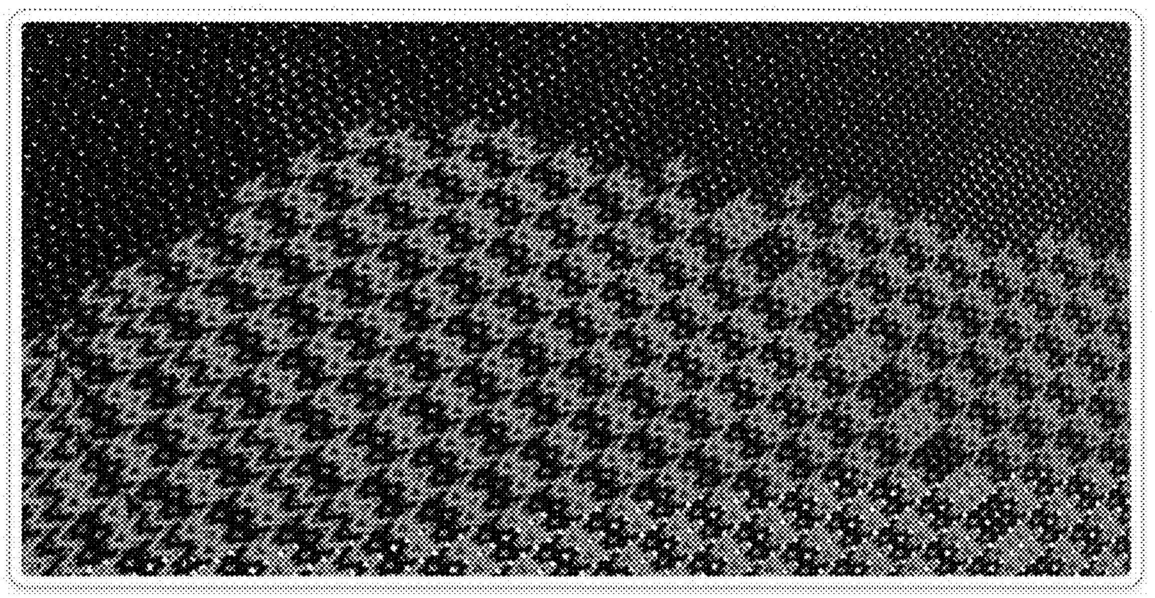
FIG. 13D presents a magnified view of a portion indicated in FIG. 13B, in accordance with one embodiment of the invention.

These patterns are not limiting and serve to visually distinguish the zones for clarity. FIGS. 13C and 13D present magnified views of portions 1302 and 1304 indicated in FIGS. 13A and 13B, respectively, providing additional detail of the simulated stitches and their arrangement within the corresponding zones. The schematic visualization generated by module 134 shows how a user's target design will look prior to topological correction by the yarn pather 108, serving as a direct preview of stitch-level intent in a machine-agnostic context. By presenting simulated stitches in 3D, designers and engineers can visually verify the target design before manufacturability corrections are applied by downstream modules such as the yarn pather 108 and structure compiler 110.

Figure 14A:
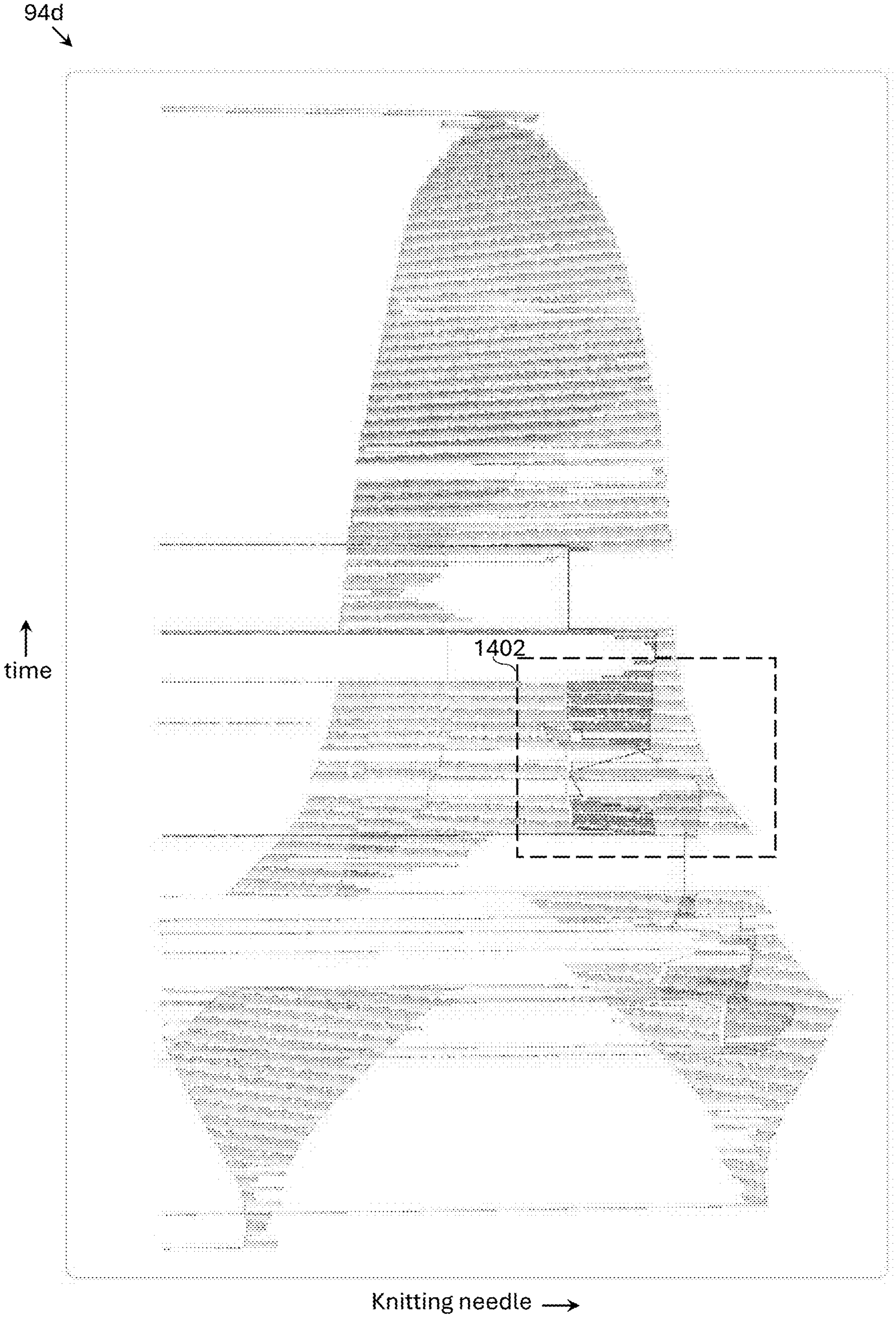
FIG. 14A depicts an optimized abstract knitmap, illustrating the actual paths of multiple yarn spools as they move across knitting needles over time, with horizontal and occasional vertical movements representing feeder actions and course transitions, in accordance with one embodiment of the invention.

FIG. 14A illustrates the optimized 2D abstract knitmap 94*d*, which is produced as the output of the yarn pather 108 and structure compiler 110 following policy-driven rewrites and manufacturability enforcement. The vertical axis represents time, corresponding to the progression of knitting courses, while the horizontal axis denotes discrete knitting needles across the machine bed. The figure visualizes the actual paths of multiple yarn spools (in this example 3 spools) as they traverse the needle bed during fabrication. Each colored path represents the movement of a distinct yarn feeder, with horizontal segments indicating the feeder's passage across adjacent needles within a single course, and vertical segments denoting transitions of the yarn from one course to the next. The system applies category policy and overwrite rules to the abstract knitmap 94*c*, updating stitch-level category assignments and yarn feeder assignments to ensure manufacturability and feeder continuity. The optimized knitmap 94*d* encodes explicit directionality for each yarn, reflecting the actual sequence of feeder movements and the resulting stitch structure. The visualization in FIG. 14A thus provides a time-resolved map of yarn traversal, showing both the horizontal knitting actions and the vertical course transitions required to realize the intended structure.

Figure 14B:
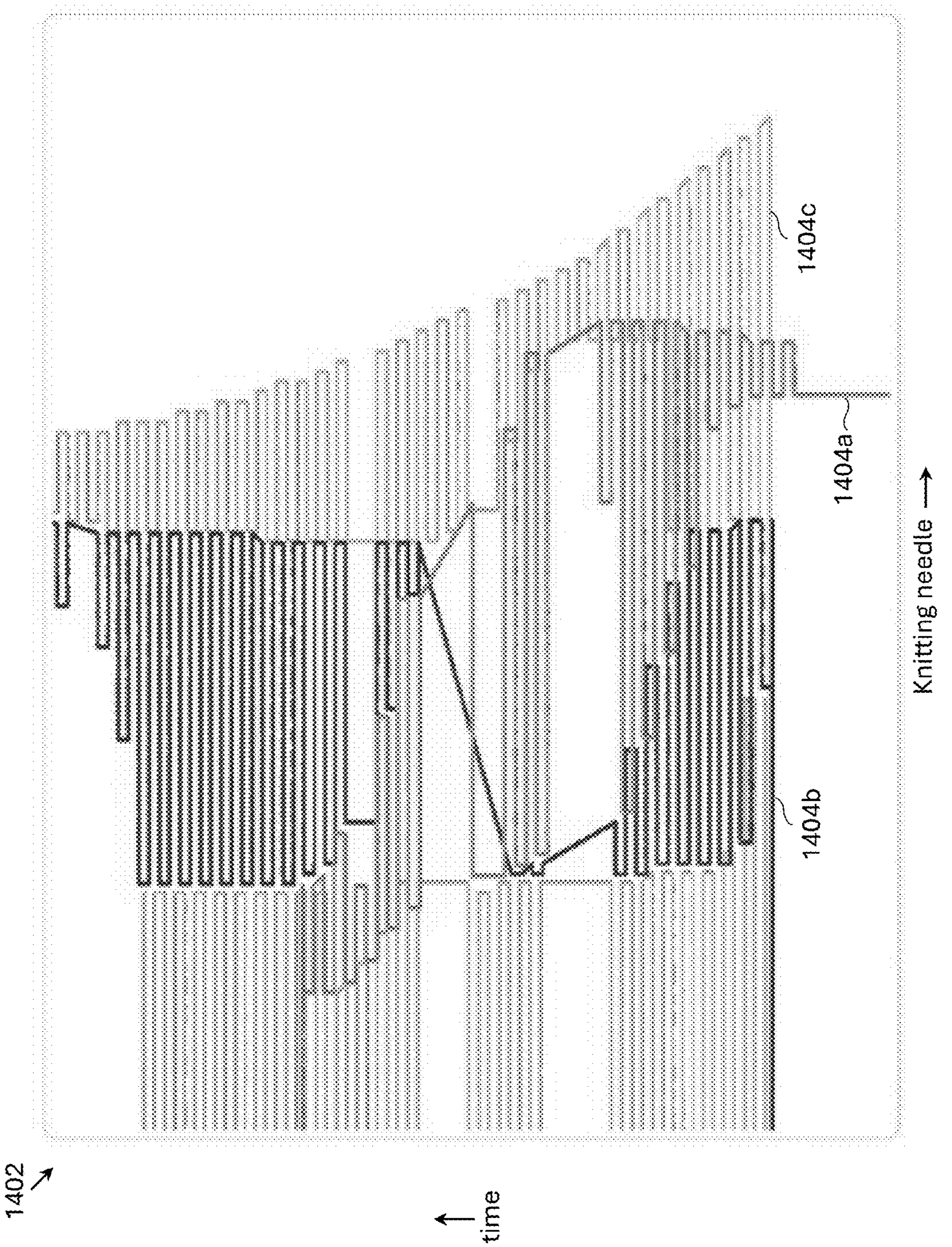
FIG. 14B depicts a zoomed-in portion of the optimized abstract knitmap of FIG. 14A, in accordance with one embodiment of the invention.

FIG. 14B presents a zoomed-in view of portion 1402 of the optimized knitmap 94*d* shown in FIG. 14A, enabling detailed inspection of the yarn paths and feeder assignments at the stitch level. The three yarn spools—1404*a* (green), 1404*b* (blue), and 1404*c* (gray)—are labeled, and their paths are rendered as continuous lines for clarity, though they are composed of discrete points corresponding to individual needles and time steps. This close-up reveals the discrete nature of the needle indices and the coursewise progression, with each yarn path comprising a sequence of feeder movements that may include horizontal traversals, vertical transitions, and occasional floats or skips as dictated by the structure compiler 110. The figure highlights how the system determines the actual sequence of feeder actions required for each yarn, including the enforcement of adjacency rules, feeder-safe traversal, and policy-driven boundaries such as Intarsia separation. The explicit assignment and directionality of each yarn are shown in relation to the underlying stitch structure, providing a manufacturable plan that integrates both the optimized yarn pathways and the stitch-level category assignments. The yarn path does not indicate whether or not a stitch is performed at the given time and needle number, only that the yarn is present at that given time and needle number.

Figure 15:
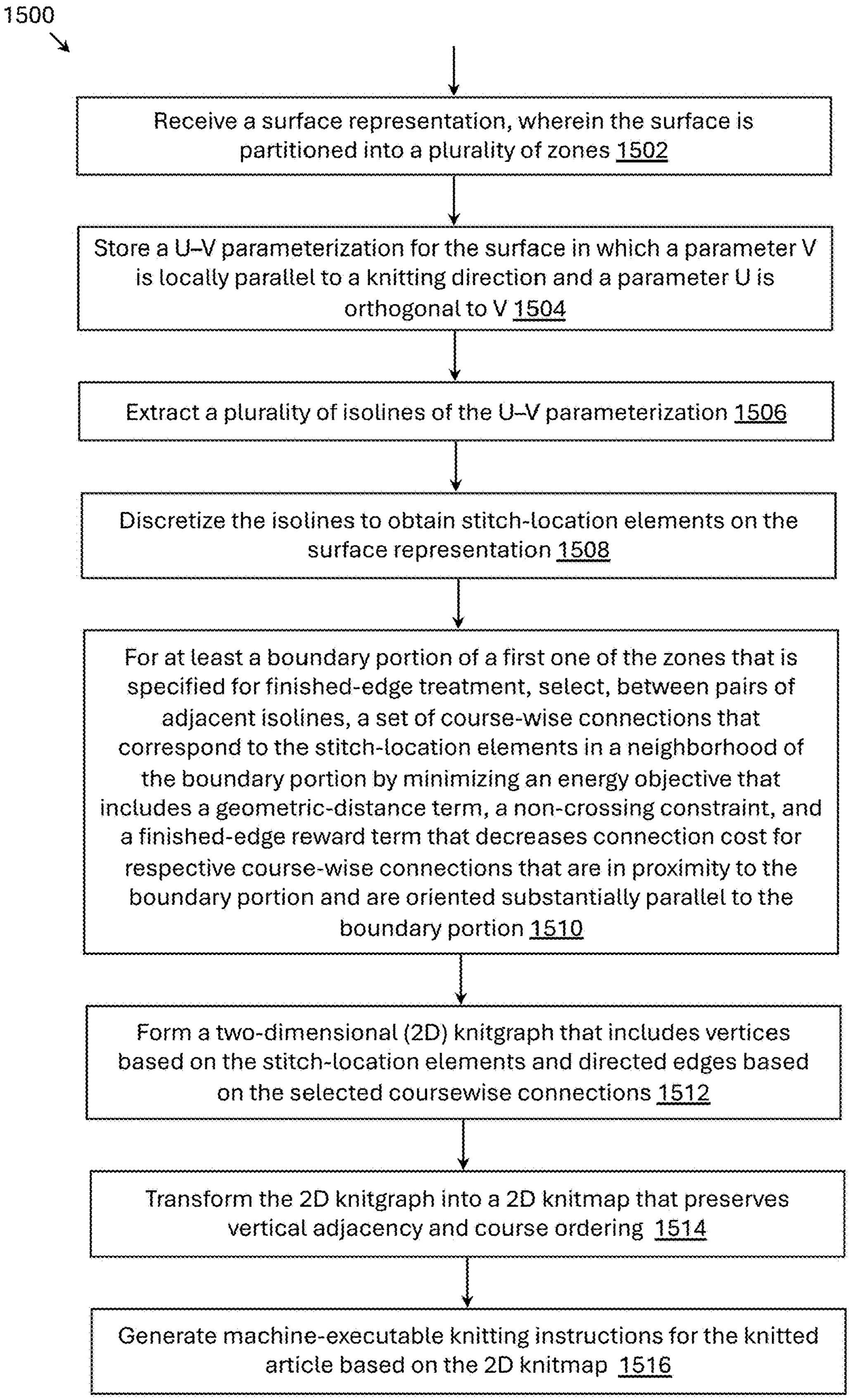
FIG. 15 depicts a flow chart of a process for generating knitting instructions that apply finished-edge treatment to a boundary (or boundary segment(s)) of a zone on a surface representation, in accordance with one embodiment of the invention.

FIG. 15 depicts a flow chart 1500 of a computer-implemented process for generating knitting instructions that apply finished-edge treatment to a boundary (or boundary segment(s)) of a zone on a 3D surface. A finished edge refers to a boundary along which the system promotes smoother, more continuous coursewise stitch alignment, rather than the stepped appearance that would naturally arise from an unmodified knit structure. The system achieves this by influencing coursewise connections between stitch-location elements on adjacent isolines (which have constant values of U) so that connections near the boundary follow the direction of that boundary. The depicted flow may be executed by software running on one or more processors and may operate on a surface representation that carries user-authored zones and boundary selections for edge finishing.

In step 1502, the system may receive the surface representation, in which the surface representation is partitioned into a plurality of zones. The received data may include a knitting-direction indication and boundary annotations that specify a boundary portion of a first zone for finished-edge treatment. In some embodiments, the surface representation may be a user-defined digital surface acquired through a modeling interface and stored for downstream parameterization and discretization. The finished-edge treatment may be specified for an entire boundary of the first zone or for one or more selected boundary segments of the first zone.

In step 1504, the system may store a U-V parameterization for the surface representation in which Vis locally parallel to a knitting direction and U is orthogonal to V. The parameterization may be produced by numerical solvers that compute a distance-like field aligned with the knitting direction together with a transverse field integrated under boundary conditions. The parameterization may provide a stable correspondence between the surface representation and a parameter domain and may honor seam cuts, non-integrable regions, or auxiliary course-direction curves as constraints for later discretization and mapping.

In step 1506, the system may extract a plurality of isolines of the U-V parameterization. The isolines may be aligned to V and may correspond to wales of the knit structure. In step 1508, the system discretizes the isolines to obtain stitch-location elements on the surface representation. As used herein, a stitch-location element refers to the discrete stitch-position representation produced when an isoline is discretized, without requiring any particular internal structure. In one embodiment, a stitch-location element corresponds to a packet, where each packet represents one or more stitch positions determined according to local stitch density. In another embodiment, a stitch-location element corresponds directly to a quantization point, where each quantization point represents a stitch location derived from the underlying fields.

In step 1510, for at least a boundary portion of a first zone that is specified for finished-edge treatment, the system may select, between pairs of adjacent isolines, a set of coursewise connections that correspond to stitch-location elements in a neighborhood of the boundary portion by minimizing an energy objective. For clarity, it is noted that the coursewise connections do not necessarily each correspond to a single course; rather they run in the direction of courses. In the embodiment where stitch-location elements are represented by packets, and each packet is decomposed into two quantization points (and each quantization point corresponds to a single stitch), coursewise connections may correspond to two courses.

The energy objective may include a geometric-distance term, a non-crossing constraint, and a finished-edge reward term that decreases connection cost for coursewise connections that are in proximity to the boundary portion and oriented substantially parallel to the boundary portion. The geometric-distance term may measure distance in the U-V parameterization or may measure a geodesic distance along the surface representation. For clarity, it is noted that a coursewise connection is oriented substantially parallel to the boundary portion when an angular deviation between the connection and a tangent to the boundary portion does not exceed a predetermined tolerance, and a coursewise connection is in proximity to the boundary portion when a shortest distance from the connection to the boundary portion does not exceed a predetermined threshold. The non-crossing constraint may require pairwise non-intersection of selected connections and may preserve order along V across adjacent isolines while still permitting a connection to cross a boundary between zones.

The finished-edge reward term may act within a boundary band that is adjacent to the boundary portion and may be zero outside the band. The band width may be specified by a predetermined distance from the boundary portion or by a number of courses measured with respect to the U-V parameterization. The reward value may be user-tunable through a user interface and may be a constant value or a variable value that varies along the boundary portion according to a spatial weight function. Increasing reward may reduce a visual stepwise contrast between stitches of different properties across the boundary portion and may increase stitch length at short-row terminations near the boundary portion. Examples of stitch properties include yarn color, yarn feeder assignment, stitch type such as knit, purl, stockinette, rib, tuck, miss, or bind-off, and per-stitch structure or tension settings.

Candidate selection for the coursewise connections may be solved per adjacent-isoline pair as a linear assignment or may be solved across multiple isolines as a minimum-cost flow. Variations may apply boundary masks that require or forbid links to realize selvedge or bind-off and may enforce feeder-parity alternation across successive courses. In some embodiments, the assignment solver may be constrained to be order-preserving so that the resulting pairing is locally non-crossing in U-V space.

In step 1512, the system may form a two-dimensional (2D) knitgraph 92 that includes vertices based on the stitch-location elements and directed edges based on the selected coursewise connections. In various embodiments, the selected coursewise connections may be computed at a packet level between adjacent packets on neighboring isolines and then expanded or mapped to stitch-resolution edges. In such cases, the 2D knitgraph 92 may represent stitch-resolution vertices that correspond to stitch-location elements or to quantization points derived from packets together with directed edges that correspond to the selected coursewise connections while maintaining a non-crossing topology in the U-V parameterization. The 2D knitgraph 92 may also record vertical edges that mark short-row terminations so that localized goring behavior is preserved for downstream processing.

In step 1514, the system may transform the 2D knitgraph 92 into a 2D knitmap that preserves vertical adjacency and course ordering. The transformation may perform a row-straightening operation and may insert empty positions where short rows or skips occur so that a rectangular grid is maintained for course indices and wale adjacency. The 2D knitmap may carry per-stitch categories such as knitcell type and yarn-feeder assignment and the categories may be rewritten by policy to maintain manufacturability. The rewriting may insert Intarsia boundaries to maintain feeder separation or may adjust local structures to honor adjacency rules and device constraints. The transformation from a 2D knitgraph 92 into a 2D knitmap was previously described in step 214 of FIG. 2, so the reader can refer to the above-discussion for additional details of this transformation.

In step 1516, the process generates machine-executable knitting instructions for the knitted article based on the 2D knitmap. The system may compile the 2D knitmap into a machine-agnostic knit code and may convert the knit code into one or more machine-specific formats for execution by supported knitting systems. A simulation stage may validate the machine-agnostic knit code by stepping through course time and by tracking loop states, transfer limits, and feeder occupancy. The process may thereby yield instructions that implement the finished-edge treatment while maintaining non-crossing topology and machine feasibility. The generation of machine-executable knitting instructions for the knitted article based on the 2D knitmap was previously described in step 216 of FIG. 2, so the reader can refer to the above-discussion for additional details of this generation.

In some regions of a boundary, the tangent direction may be more closely aligned with a wale than with a course. In such cases, similar principles can be applied using transfer operations rather than coursewise connections. When the local boundary geometry suggests that a transfer-based adjustment would better maintain continuity along the finished edge, the system may preferentially introduce transfer instructions that realign stitch-location elements across beds to follow the boundary direction. This enables the finished-edge treatment to be applied consistently even when the local geometry favors wale-parallel adjustments rather than course-parallel adjustments.

FIGS. 16A-16B depict pseudocode of a process for selecting non-crossing coursewise connections between stitch-location elements on adjacent isolines of a U-V surface representation. The pseudocode illustrates the computational steps performed within the system's kernel to derive an intermediate 2D knitgraph and a parity-enforced 2D knitgraph based on stitch-location elements produced during isoline discretization.

The process begins by identifying, for each pair of adjacent isolines, the stitch-location elements positioned along the left isoline and the right isoline. For each pair of isolines, the pseudocode allocates an energy matrix sized according to the number of stitch-location elements on the left and right isolines. Each matrix entry corresponds to the difference of potential energy between a pair of stitch-location elements and is initialized using a distance-based measure or other potential-energy function defined by the system. The system identifies whether each stitch-location element is transitioning between zones and whether the stitch-location element lies within a zone marked for finished-edge treatment. When both elements of a pair satisfy these properties, the system subtracts a finished-edge reward term from the corresponding energy-matrix entry to encourage coursewise connections that support finished-edge continuity.

The system then derives candidate connections by selecting, for each stitch-location element on the left isoline, the corresponding element on the right isoline that yields the minimum energy value in its row of the matrix. The selected connections are then post-processed to ensure that the resulting set of coursewise connections between isolines is non-crossing. Aggregating the non-crossing connections across all isoline pairs yields an intermediate 2D knitgraph K'. Each stitch-location element is subsequently assigned leftward and rightward directed edges to form the final parity-enforced 2D knitgraph K, which maintains consistent traversal direction across courses and supports downstream compilation, mapping, and machine-instruction generation.

Figure 17A:
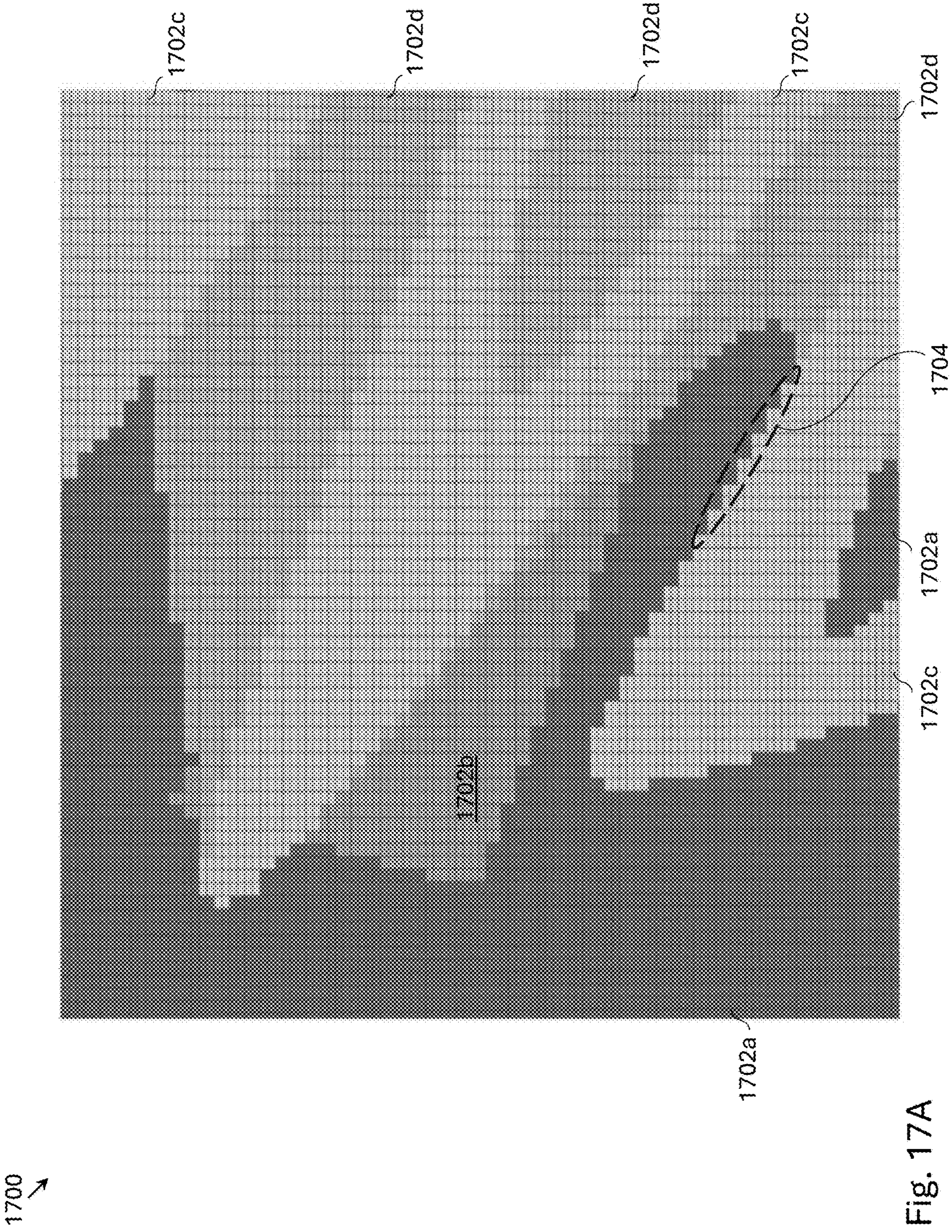
FIG. 17A illustrates a 2D knitgraph in which zone boundaries appear in a jagged, stair-stepped pattern, in accordance with one embodiment of the invention.

FIGS. 17A-17B and 18A-18B illustrate the effect of finished-edge processing on zone boundaries within a 2D knitgraph and on the resulting knitted representation. FIG. 17A depicts a 2D knitgraph 1700 represented as an array of rectangles, where each rectangle corresponds to a stitch and each zone 1702*a*-1702*d* is shown in a distinct grayscale value. Because no finished-edge treatment has been applied, the boundaries between zones exhibit a jagged or stair-stepped appearance. Boundary 1704 is indicated for purposes of discussion between zone 1702*a* and zone 1702*c* appears as a pixelated sequence of rectangular steps, reflecting the direct discretization of isolines into stitch-placement positions without boundary smoothing.

Figure 17B:
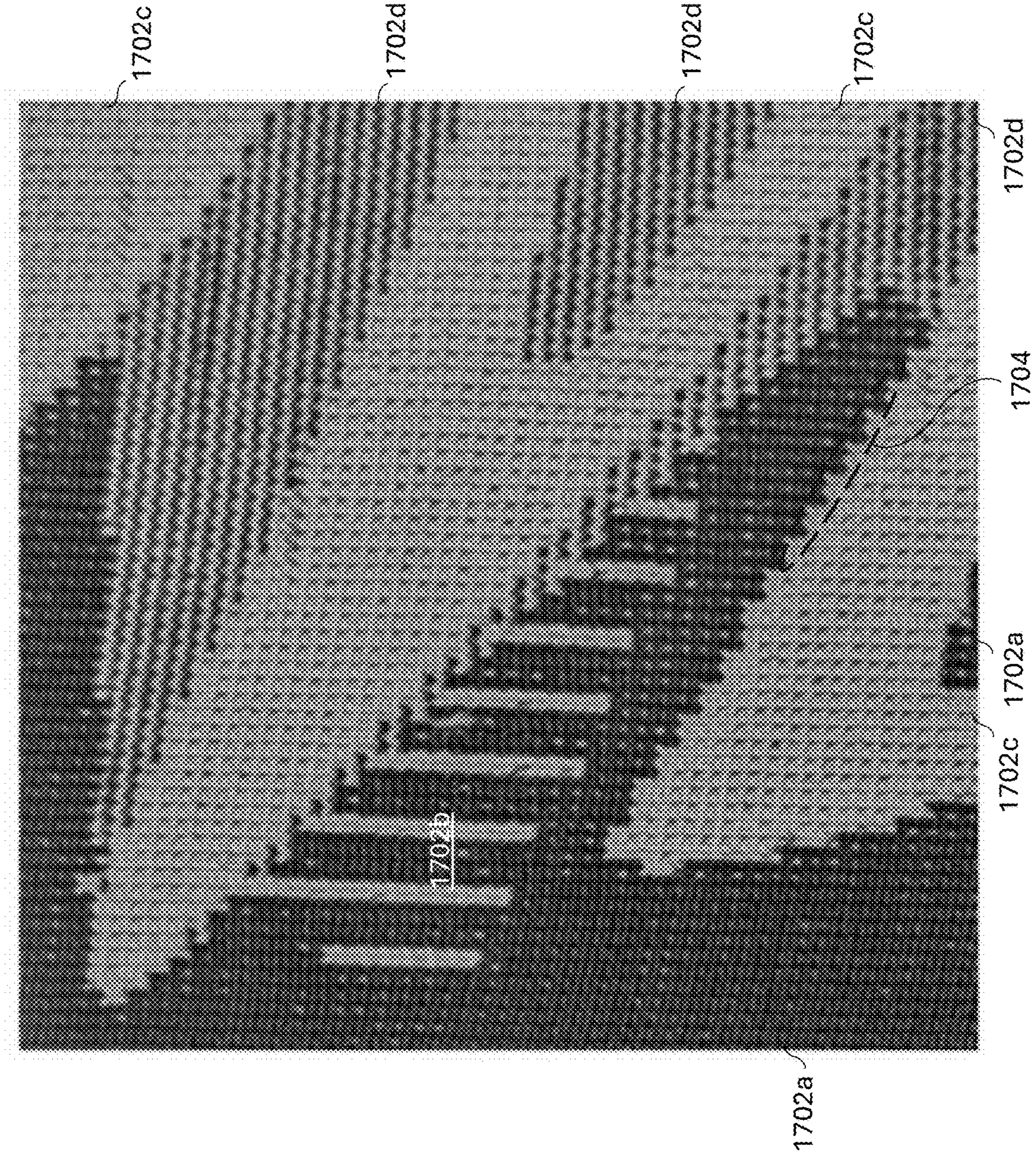
FIG. 17B illustrates a knitted representation corresponding to the 2D knitgraph of FIG. 17A, in which the jagged zone boundaries are reflected in the resulting stitch structure, in accordance with one embodiment of the invention.

FIG. 17B shows a knitted representation 1750 corresponding to the knitgraph 1700 of FIG. 17A. The same zones 1702*a*-1702*d* are present, with zone 1702*a* containing dark gray stitches, zone 1702*b* containing alternating columns of light gray and dark gray stitches, zone 1702*c* containing light gray stitches, and zone 1702*d* containing alternating rows of light gray and dark gray stitches. Boundary 1704 again illustrates the stair-stepped transition between zone 1702*a* and zone 1702*c*. The knitted view emphasizes that this jaggedness of the knitgraph 1700 propagates into the stitch structure of the knitted representation 1750 when no finished-edge correction is applied.

Figure 18A:
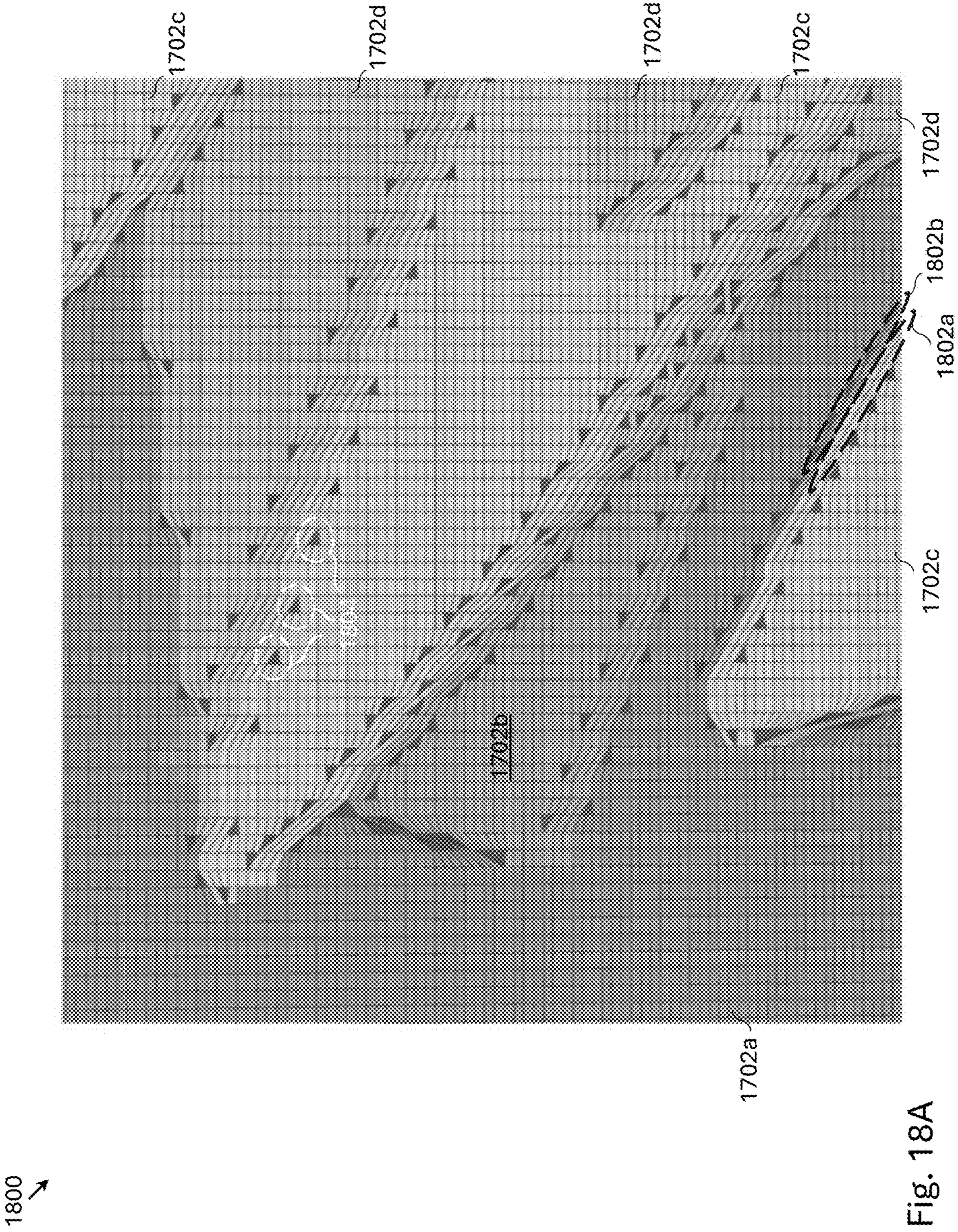
FIG. 18A illustrates a 2D knitgraph in which finished-edge processing has been applied, introducing short rows and apex structures that smooth the boundaries between zones, in accordance with one embodiment of the invention.

FIG. 18A depicts a two-dimensional knitgraph 1800 in which the finished-edge operation has been applied. Unlike the simpler rectangular array of FIG. 17A, knitgraph 1800 contains both rectangles and triangles, where the triangles represent apexes 1804 corresponding to the ends of short rows introduced by the finished-edge procedure. Each zone 1702*a*-1702*d* is again shown in a different grayscale value. In this example, the entire boundary of each zone has been designated for finished-edge treatment. Stitches 1802*a* correspond to a portion of the finished edge belonging to the boundary of zone 1702*c*, and stitches 1802*b* correspond to a portion of the finished edge belonging to the boundary of zone 1702*a*. These stitches appear as parallelograms or slanted rectangles, indicating that the system has shifted stitch-placement positions to better align with the boundary direction. The finished edges are visually situated between sequences of short rows, and it is the strategic placement of these short rows that enables the resulting boundary to appear smooth in the knitgraph.

Figure 18B:
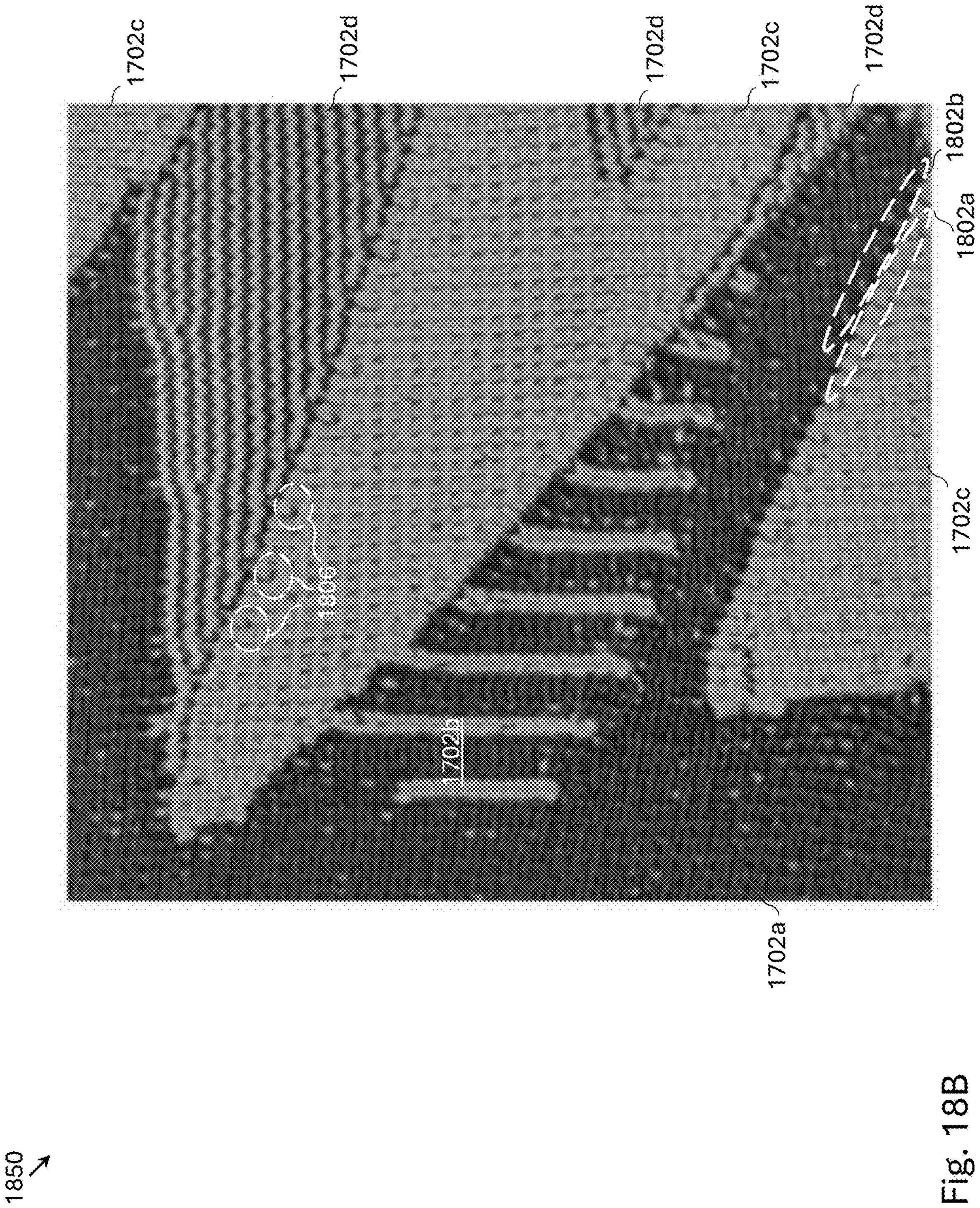
FIG. 18B illustrates a knitted representation corresponding to the 2D knitgraph of FIG. 18A, showing smoothed boundary transitions and small openings associated with short-row apexes, in accordance with one embodiment of the invention.

FIG. 18B presents a knitted representation 1850 corresponding to the knitgraph 1800 of FIG. 18A. Stitches 1802*a* and 1802*b* again indicate the portions of the finished edges associated with zones 1702*c* and 1702*a*, respectively. In contrast with the boundary 1704 in FIG. 17B, the previously jagged boundary regions have been smoothed, and the stair-stepped appearance is no longer present. Small holes

1806 in the knitted representation correspond to the apexes 1804 in the 2D knitgraph, revealing the tradeoff introduced by finished-edge processing: smoother boundary alignment achieved at the expense of small openings formed where short rows terminate. FIGS. 17A-17B and 18A-18B collectively illustrate how finished edges improve the boundary geometry and aesthetic continuity of knitted regions when transitioning between zones.

Figure 19A:
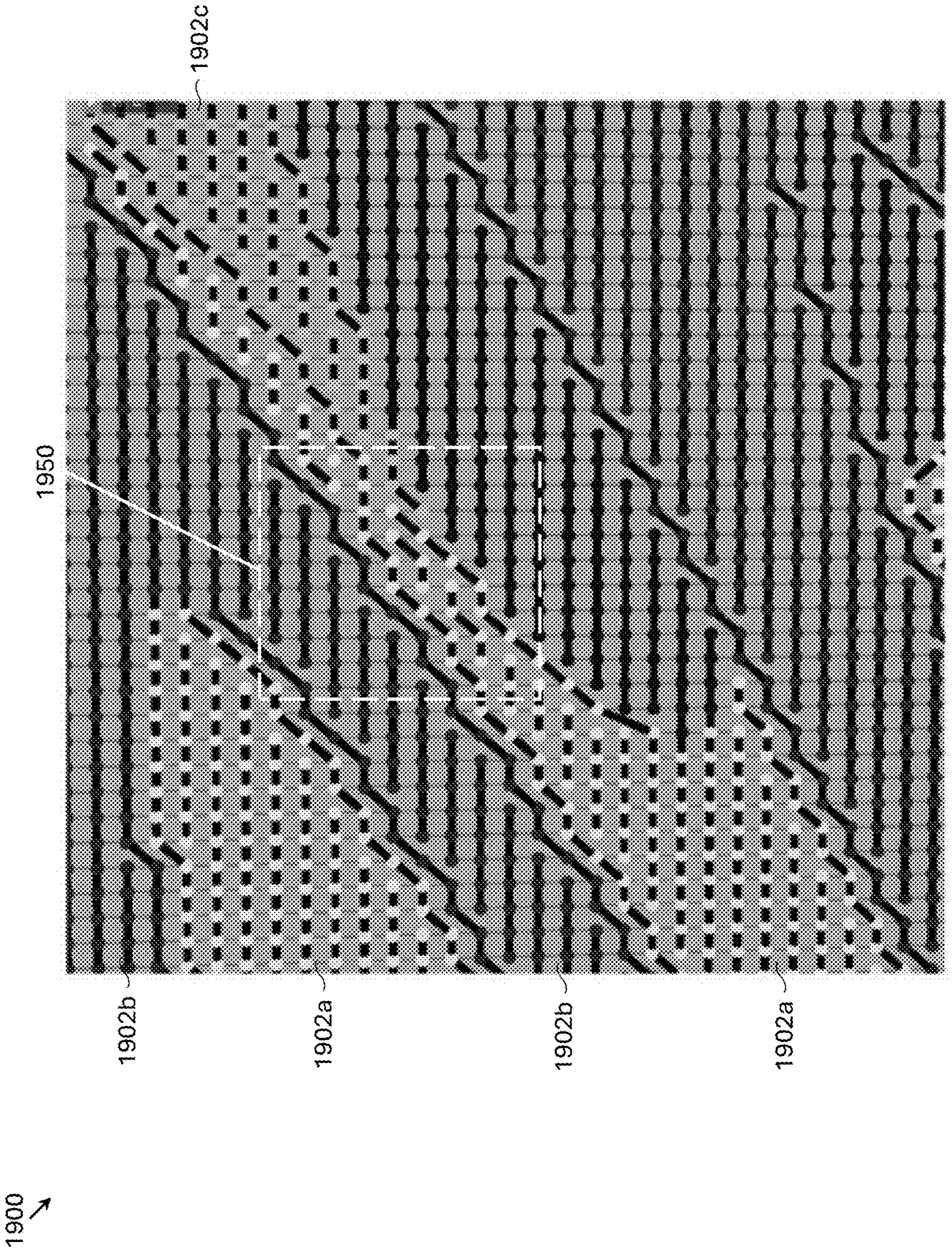
FIG. 19A illustrates a packet-level 2D knitgraph showing packets sampled along isolines and connected coursewise, in accordance with one embodiment of the invention.
Figure 19B:
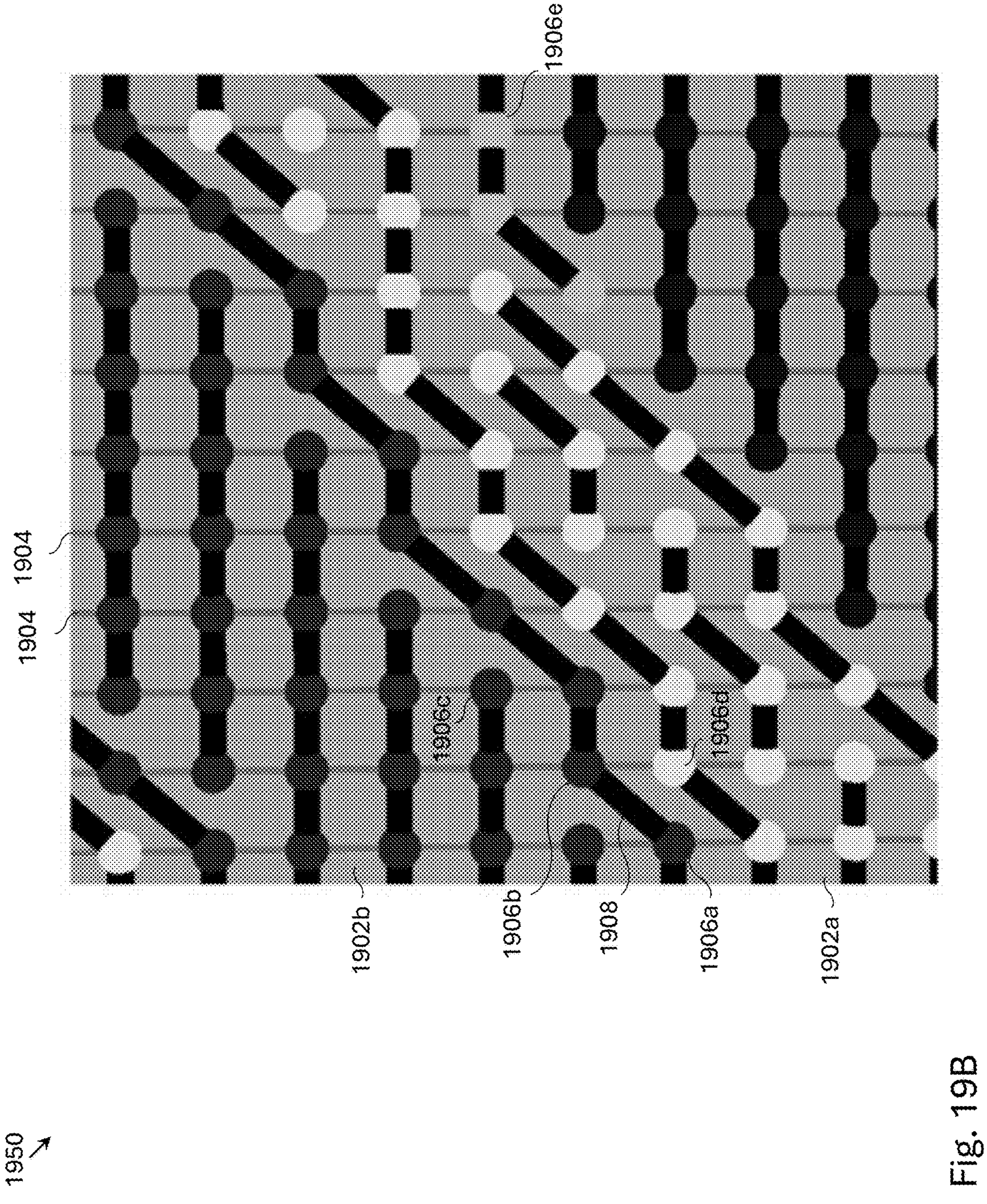
FIG. 19B illustrates a zoomed-in region of the packet-level knitgraph of FIG. 19A, showing packets arranged along adjacent isolines and coursewise connections selected through an energy-minimization process, in accordance with one embodiment of the invention.

FIGS. 19A and 19B illustrate a 2D knitgraph when finished-edge processing influences the selection of coursewise connections. More specifically, FIG. 19A depicts a packet-level knitgraph 1900 formed by sampling packets along respective isolines and establishing coursewise connections between packets located on adjacent isolines. The 2D knitgraph 1900 includes multiple zones 1902*a*, 1902*b* and 1902*c*. A selected portion of the packet-level knitgraph is identified as portion 1950, which is shown in greater detail in FIG. 19B.

FIG. 19B illustrates a zoomed-in view of portion 1950 of the packet-level knitgraph 1900. The packet-level knitgraph 1900 includes isolines 1904 and packets arranged along each isoline 1904. Five packets are labeled for explanatory purposes. Packets 1906*a*, 1906*b*, and 1906*c* are depicted in black and belong to zone 1902*b*. Packet 1906*d* is depicted in white and belongs to zone 1902*b*. Packet 1906*e* is shown in gray and belongs to zone 1902*c*. A coursewise connection 1908 extends between packets 1906*a* and 1906*b*. Although the shortest-distance connection from packet 1906*a* would have been to packet 1906*d*, the completed energy evaluation-modified by a finished-edge reward term-makes connection 1908 the lower-energy choice, and thus it is selected by the solver. The coursewise connection 1908 runs along a finished edge. The remaining coursewise connections have not been labeled for conciseness.

In this depiction, the explicit zone boundaries are omitted for visual clarity, but the boundary between zones 1902*a* and 1902*b* may be imagined as running diagonally from lower left to upper right. Finished edges, which are not labeled in this figure, generally follow these zone boundaries. Packet 1906*c* corresponds to an apex, representing the termination of a short row. FIGS. 19A and 19B collectively illustrate how packet-level energy decisions influenced by finished-edge policies guide coursewise connections, producing boundary-aligned behavior even when those connections are not the shortest geometric distance pairings.

Figure 20A:
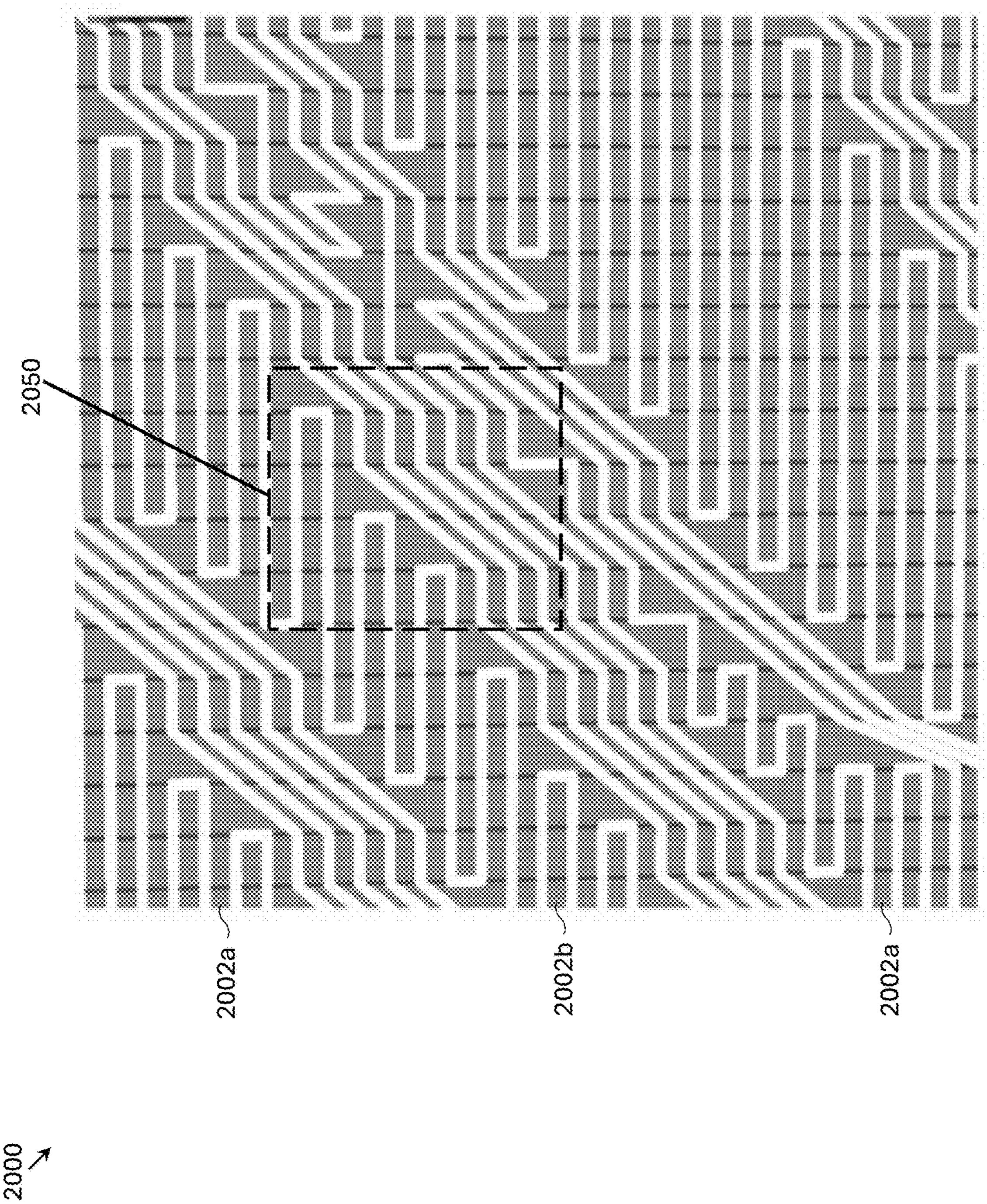
FIG. 20A illustrates a quantization-point-level 2D knitgraph generated by decomposing each packet into quantization points and forming edges between the quantization points, in accordance with one embodiment of the invention.
Figure 20B:
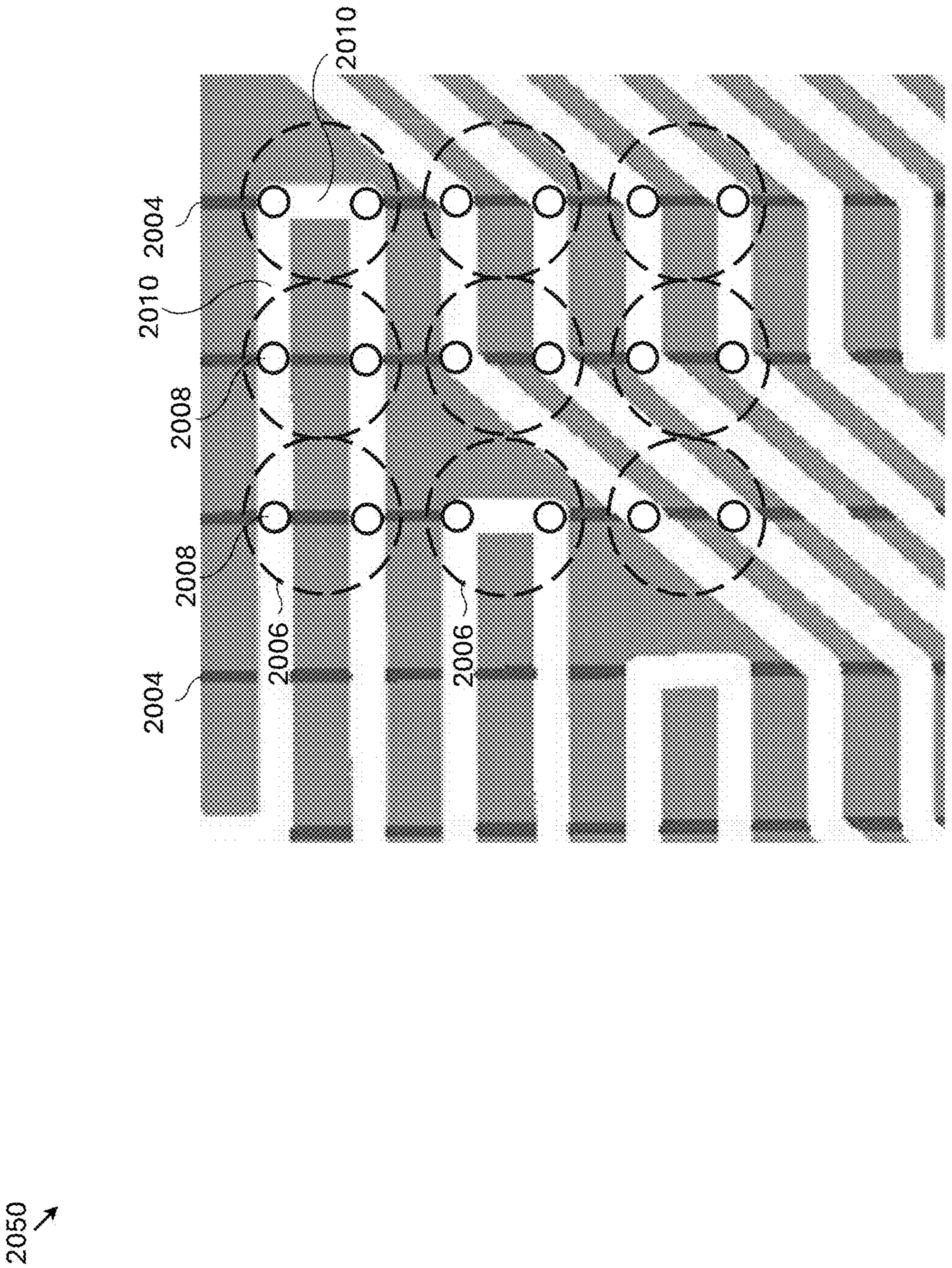
FIG. 20B illustrates a zoomed-in region of the quantization-point-level knitgraph of FIG. 20A, showing quantization points arranged along adjacent isolines together with corresponding quantization-point edges, in accordance with one embodiment of the invention.

FIGS. 20A and 20B illustrate a 2D knitgraph and explain how quantization points and their connecting edges relate to the packet-level structure. More specifically, FIG. 20A depicts a quantization point-level knitgraph 2000, which is formed by decomposing each packet into two quantization points and establishing edges between respective pairs of quantization points. The quantization point-level knitgraph (provided in this particular example) is not intended to correspond directly to the packet-level knitgraph 1900 of FIGS. 19A and 19B. The quantization point-level knitgraph includes a plurality of zones 2002*a*, 2002*b*. A selected region of the knitgraph is identified as portion 2050, which is shown in greater detail in FIG. 20B.

FIG. 20B illustrates the zoomed-in view of portion 2050 of the quantization point-level knitgraph 2000. Packets 2006 are arranged along each isoline 2004. Nine packets have been drawn for contextual reference (while the location of other packets has not been drawn for the sake of conciseness). In the embodiment depicted in FIG. 20B, each packet has been decomposed into two quantization points 2008, consistent with the representation used earlier in FIG. 8C. Quantization point edges 2010 appear as white lines and connect respective quantization points. Whereas FIG. 8C illustrated these quantization point edges as directed edges, the edges in this figure are undirected for simplicity of illustration. Except for the vertical quantization point edges that indicate short-row terminations, the other quantization point edges run parallel to the coursewise packet-level connections (not depicted), demonstrating how quantization point-level connectivity aligns with packet-level structure. Collectively, FIGS. 20A and 20B demonstrate how packets may be expanded into quantization points and packet-level connections may be expanded into quantization point edges, providing a finer-resolution stitch representation while preserving alignment with isolines and packet-level topology.

As should be apparent in the discussion of embodiments of the invention, various operations referred to herein are machine operations. Useful machines for performing the operations of the present invention include both the target fabrication machines which will produce the desired articles being constructed, and digital computer systems or other similar devices. The present invention involves, to some degree, the production of instructions for operating, that is controlling the operation of, the target fabrication machines to produce a desired result. Those instructions by which the target fabrication machine will produce the desired result are created, in part, using one or more programmed digital computer systems, which in some cases may intercommunicate with one another. For example, in one embodiment of the invention, a first computer system, referred to as a "client" is used to construct and/or customize a 3D model of the article to be fabricated, and that model is then passed to a second computer system, referred to as a "server" or "host," where the 3D model is converted to a 2D knitting map or other representation suitable for translation into instructions for the target fabrication machine. In other cases, a single digital computer system may be used for both aspects of the operation, for example in a service-as-a-platform based approach in which a client computer system is used merely as a visualization and human-interaction instrument to observe, direct, and control processes executing on a server.

Figure 21:
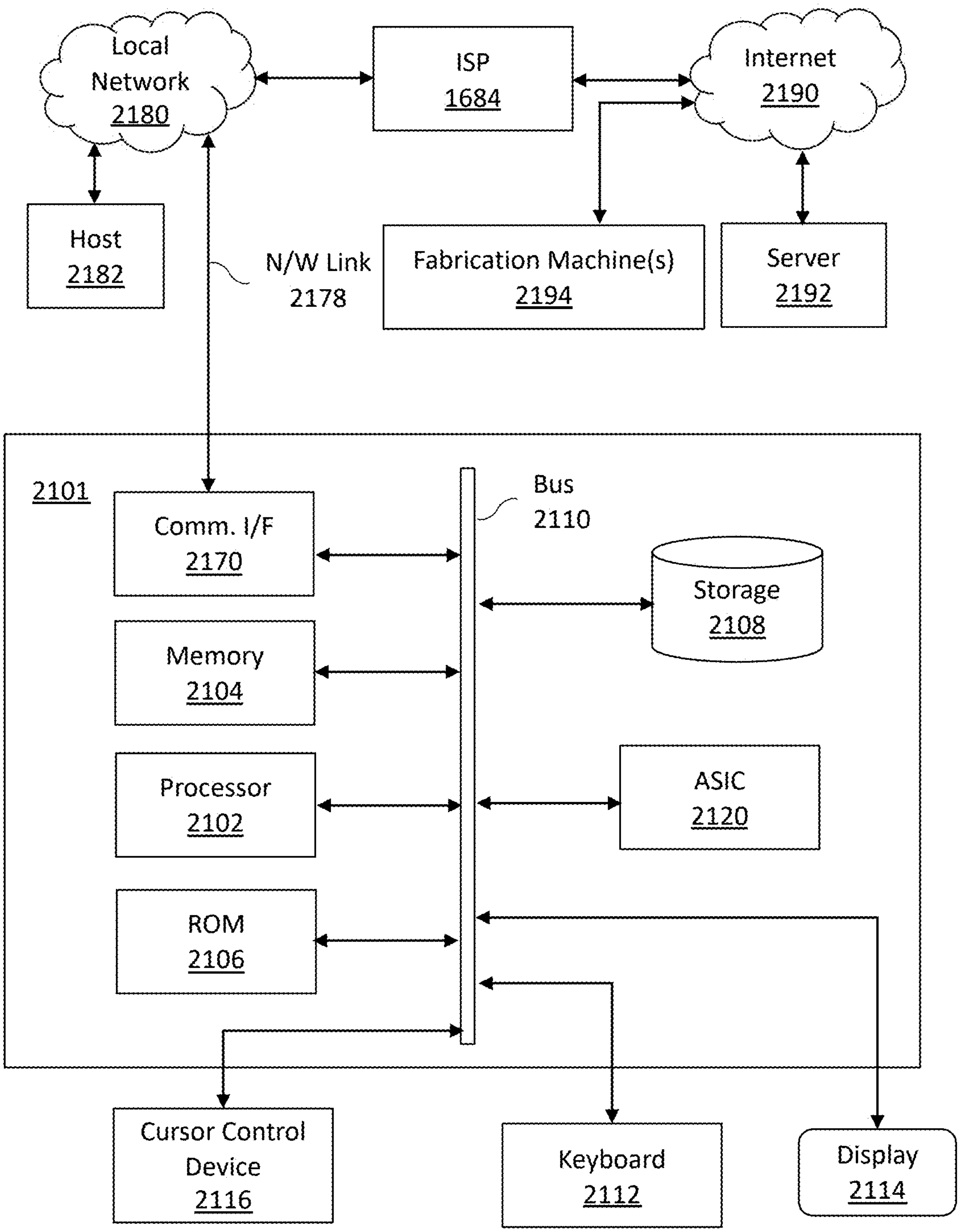
FIG. 21 illustrates an example of a networked computer system for executing computer-executable instructions for generating knitting instructions for controlling computer-controlled machines, including flatbed knitting machines, sewing machines and welding machines, in accordance with one embodiment of the invention.

FIG. 21 illustrates an example of the architecture described immediately above. In this arrangement, a computer system 2101 is programmed via stored processor-executable instructions to interact with a server 2192 in the production of instructions for operating, that is controlling the operation of, the target fabrication machine(s) 2194 (e.g., flatbed knitting machine, sewing machine, welding machine, etc.) to produce a desired result in accordance with the present invention. In one embodiment, computer system 2101 acts as a client to server 2192 and is programmed to allow a user to construct and/or customize a 3D model of the article to be fabricated, which model is then passed to server 2192 where the 3D model is converted to a 2D knitting map, 3D knitmesh or other representation suitable for translation into instructions for the target fabrication machine. In another embodiment, server 2192 is used by computer system 2101 for both aspects of the operation (e.g., as a service-as-a-platform), and allows a user to interact with programs running on server 2192 via a web browser or other client application. In the foregoing description, when an operation is described as being performed by an application running on a computer system, it should be understood that particular processor-executable instructions which make up such an application, when executed by one or more processors, such as processor(s) 2102 of computer system 2101 or similar processor(s) of the server, cause those processors to perform the described operations, in some cases by invoking other elements of the computer system to operate in accordance with the functions specified by the instructions.

As illustrated, computer system 2101 generally includes a communication mechanism such as a bus 2110 for passing information (e.g., data and/or instructions) between various components of the system, including one or more processors 2102 for processing the data and instructions. Processor(s) 2102 perform(s) operations on data as specified by the stored computer programs on computer system 2101, such as the stored computer programs for running a web browser and/or for constructing and/or customizing a 3D model of the article to be fabricated that make up the application described herein and/or visualizing results of server-based operations of such an application. The stored computer programs for computer system 2101 and server 2192 may be written in any convenient computer programming language and then compiled into a native instructions for the processors resident on the respective machines.

Computer system 2101 also includes a memory 2104, such as a random access memory (RAM) or any other dynamic storage device, coupled to bus 2110. Memory 2104 stores information, including processor-executable instructions, data, and temporary results, for performing the operations described herein. Computer system 2101 also includes a read only memory (ROM) 2106 or any other static storage device coupled to the bus 2110 for storing static information, including processor-executable instructions, that is not changed by the computer system 2101 during its operation. Also coupled to bus 2110 is a non-volatile (persistent) storage device 2108, such as a magnetic disk, optical disk, solid-state disc, or similar device for storing information, including processor-executable instructions, that persists even when the computer system 2101 is turned off. Memory 2104, ROM 2106, and storage device 2108 are examples of a non-transitory "computer-readable medium."

Computer system 2101 may also include human interface elements, such as a keyboard 2112, display 2114, and cursor control device (e.g., a mouse or trackpad) 2116, each of which is coupled to bus 2110. These elements allow a human user to interact with and control the operation of computer system 2101. For example, these human interface elements may be used for controlling a position of a cursor on the display 2114 and issuing commands associated with graphical elements presented thereon. In the illustrated example of computer system 2101, special purpose hardware, such as an application specific integrated circuit (ASIC) 2120, is coupled to bus 2110 and may be configured to perform operations not performed by processor 2102; for example, ASIC 2120 may be a graphics accelerator unit for generating images for display 2114.

To facilitate communication with external devices, computer system 2101 also includes a communications interface 2170 coupled to bus 2110. Communication interface 2170 provides bi-directional communication with remote computer systems such as server 2192 and host 2182 over a wired or wireless network link 2178 that is communicably connected to a local network 2180 and ultimately, through Internet service provider 2184, to Internet 2190. Server 2192 is connected to Internet 2190 and hosts a process that provides a service in response to information received over the Internet. For example, server 2192 may host some or all of a process that provides a user the ability to construct and/or customize a 3D model of an article to be fabricated, which 3D model is then converted to a 2D knitting map, 3D knitmesh or other representation suitable for translation into instructions for the target fabrication machine, in accordance with embodiments of the present invention. It is contemplated that components of an overall system can be deployed in various configurations within one or more computer systems (e.g., computer system 2101, host 2182 and/or server 2192).

Thus, the generation of knitting instructions for knitted articles with finished edges has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method for generating knitting instructions for fabricating a knitted article from a surface representation, the method comprising:

receiving the surface representation, wherein the surface representation is partitioned into a plurality of zones;

storing a U-V parameterization for the surface representation in which a parameter V is locally parallel to a knitting direction and a parameter U is orthogonal to V;

extracting a plurality of isolines of the U-V parameterization;

discretizing the isolines to obtain stitch-location elements on the surface representation;

for at least a boundary portion of a first one of the zones that is specified for finished-edge treatment, selecting, between pairs of adjacent isolines, a set of coursewise connections that correspond to the stitch-location elements in a neighborhood of the boundary portion by minimizing an energy objective that includes a geometric-distance term, a non-crossing constraint, and a finished-edge reward term that decreases connection cost for respective coursewise connections that are in proximity to the boundary portion and are oriented substantially parallel to the boundary portion;

forming a two-dimensional (2D) knitgraph that includes vertices based on the stitch-location elements and directed edges based on the selected coursewise connections;

transforming the two-dimensional knitgraph into a 2D knitmap that preserves vertical adjacency and course ordering; and generating machine-executable knitting instructions for the knitted article based on the 2D knitmap.

2. The method of claim 1, wherein the surface representation is a user-defined digital surface.

3. The method of claim 1, wherein extracting the plurality of isolines is based on stitch-density information for the surface representation.

4. The method of claim 1, wherein the non-crossing constraint requires that the selected coursewise connections be pairwise non-intersecting.

5. The method of claim 1, wherein the selected coursewise connections include at least one connection that crosses the boundary portion of the first zone.

6. The method of claim 1, wherein discretizing the isolines comprises distributing a plurality of packets along the isolines according to local stitch density, and wherein each stitch-location element comprises one or more quantization points derived from a corresponding packet.

7. The method of claim 6, wherein respective ones of the coursewise connections connect pairs of packets located on adjacent isolines.

8. The method of claim 1, wherein a coursewise connection is oriented substantially parallel to the boundary portion when an angular deviation between the coursewise connection and a tangent of the boundary portion does not exceed a predetermined tolerance.

9. The method of claim 1, wherein a coursewise connection is in proximity to the boundary portion when a shortest distance from the coursewise connection to the boundary portion does not exceed a predetermined threshold.

10. The method of claim 1, wherein the finished-edge reward term has a value that is user-tunable via a user interface.

11. The method of claim 1, wherein the finished-edge treatment applies to an entire boundary of the first zone.

12. The method of claim 1, wherein the finished-edge treatment applies to one or more selected boundary segments of the first zone.

13. The method of claim 1, wherein the finished-edge reward term is applied within a boundary band adjacent the boundary portion and having a width that does not exceed a predetermined distance from the boundary portion.

14. The method of claim 13, wherein the width of the boundary band is specified as a number of courses measured with respect to the U-V parameterization.

15. The method of claim 13, wherein the finished-edge reward term is zero outside the boundary band.

16. The method of claim 1, wherein increasing a value of the finished-edge reward term reduces a visual stepwise contrast between stitches of a first property and stitches of a second property along the boundary portion and increases a stitch length at short-row terminations adjacent to the boundary portion.

17. The method of claim 1, wherein a value of the finished-edge reward term varies along the boundary portion according to a spatial weight function.

18. The method of claim 1, wherein the geometric-distance term measures a distance between stitch-location elements in the U-V parameterization.

19. The method of claim 1, wherein the geometric-distance term measures a geodesic distance along the surface representation between the stitch-location elements.

20. A non-transitory computer-readable medium storing instructions that, when executed by one or more processors, cause performance of the method of claim 1.

* * * * *